US012319064B2

(12) United States Patent
Okushima et al.

(10) Patent No.: US 12,319,064 B2
(45) Date of Patent: Jun. 3, 2025

(54) LIQUID EJECTION HEAD, LIQUID EJECTION APPARATUS, AND METHOD OF SUPPLYING LIQUID

(71) Applicant: CANON KABUSHIKI KAISHA, Tokyo (JP)

(72) Inventors: Shingo Okushima, Kawasaki (JP); Seiichiro Karita, Saitama (JP); Takatsuna Aoki, Yokohama (JP); Noriyasu Nagai, Tokyo (JP); Eisuke Nishitani, Tokyo (JP); Yoshiyuki Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/726,232

(22) Filed: Apr. 21, 2022

(65) Prior Publication Data

US 2022/0250388 A1 Aug. 11, 2022

Related U.S. Application Data

(62) Division of application No. 17/132,840, filed on Dec. 23, 2020, now Pat. No. 11,511,544, which is a (Continued)

(30) Foreign Application Priority Data

Jan. 8, 2016 (JP) ................................ 2016-003078
Dec. 8, 2016 (JP) ................................ 2016-238891

(51) Int. Cl.
*B41J 2/14* (2006.01)
*B41J 2/045* (2006.01)
(Continued)

(52) U.S. Cl.
CPC ........... *B41J 2/175* (2013.01); *B41J 2/14024* (2013.01); *B41J 2/1404* (2013.01);
(Continued)

(58) Field of Classification Search
CPC ........ B41J 2/01; B41J 2/14024; B41J 2/1404; B41J 2/14072; B41J 2/175; B41J 2/18;
(Continued)

(56) References Cited

U.S. PATENT DOCUMENTS 5,087,930 A 2/1992 Roy et al.
5,818,485 A 10/1998 Rezanka
(Continued)

FOREIGN PATENT DOCUMENTS

CN 1293113 A 5/2001
CN 101544110 A 9/2009
(Continued)

OTHER PUBLICATIONS

Extended European Search Report dated Jul. 13, 2017, in European Patent Application No. 17000025.1.
(Continued)

*Primary Examiner* — Anh T Vo
(74) *Attorney, Agent, or Firm* — Venable LLP

(57) ABSTRACT

A liquid ejection head includes an ejection opening; a passage in which an energy generation element is disposed; an ejection opening portion that allows communication between the ejection opening and the passage; a supply passage for allowing the liquid to flow into the passage; and an outflow passage for allowing the liquid to flow out to the outside. An expression of $H^{-0.34} \times P^{-0.66} \times W > 1.7$ is satisfied when a height of the passage is set to H [μm], a length of the ejection opening portion is set to P [μm], and a length of the ejection opening portion is set to W [μm].

14 Claims, 54 Drawing Sheets

Related U.S. Application Data division of application No. 16/407,437, filed on May 9, 2019, now Pat. No. 10,919,301, which is a division of application No. 15/991,256, filed on May 29, 2018, now Pat. No. 10,363,747, which is a division of application No. 15/388,430, filed on Dec. 22, 2016, now Pat. No. 10,040,290.

(51) Int. Cl.

| | |
|---|---|
| ***B41J 2/175*** | (2006.01) |
| ***B41J 2/18*** | (2006.01) |
| ***B41J 29/393*** | (2006.01) |
| ***G01L 1/18*** | (2006.01) |
| ***G01L 1/22*** | (2006.01) |
| *B41J 2/01* | (2006.01) |

(52) U.S. Cl.

CPC ......... *B41J 2/14072* (2013.01); *B41J 2/1433* (2013.01); *B41J 2/18* (2013.01); *B41J 2002/012* (2013.01); *B41J 2002/14403* (2013.01); *B41J 2002/14475* (2013.01); *B41J 2202/11* (2013.01); *B41J 2202/12* (2013.01); *B41J 2202/20* (2013.01); *B41J 2202/21* (2013.01)

(58) Field of Classification Search

CPC .......... B41J 2002/14403; B41J 2202/21; B41J 2202/12; B41J 2202/20; B41J 2002/012; B41J 2202/11; B41J 2002/14475

See application file for complete search history.

(56) References Cited

U.S. PATENT DOCUMENTS

| | | | |
|---|---|---|---|
| 5,821,959 A | 10/1998 | Murakami et al. | |
| 6,152,559 A * | 11/2000 | Kojima | B41J 2/175 347/89 |
| 6,254,214 B1 * | 7/2001 | Murthy | B41J 2/14153 347/17 |
| 6,350,016 B1 | 2/2002 | Tachihara et al. | |
| 7,036,909 B2 | 5/2006 | Kubota et al. | |
| 7,850,290 B2 | 12/2010 | Nitta et al. | |
| 8,109,588 B2 | 2/2012 | Ozawa et al. | |
| 8,182,073 B2 | 5/2012 | Xie et al. | |
| 8,342,659 B2 | 1/2013 | Fujii et al. | |
| 8,353,584 B2 | 1/2013 | Yokoyama et al. | |
| 8,517,518 B2 | 8/2013 | Kashu et al. | |
| 8,540,355 B2 | 9/2013 | Govyadinov et al. | |
| 8,573,758 B2 | 11/2013 | Inoue et al. | |
| 8,652,767 B2 | 2/2014 | Watanabe et al. | |
| 8,794,745 B2 | 8/2014 | Yamane et al. | |
| 8,833,909 B2 | 9/2014 | Nishitani et al. | |
| 8,851,639 B2 * | 10/2014 | Arimoto | B41J 2/18 347/85 |
| 9,085,144 B2 | 7/2015 | Nakagawa et al. | |
| 9,133,356 B2 | 9/2015 | Yoshida et al. | |
| 9,162,453 B2 | 10/2015 | Cruz-Uribe et al. | |
| 9,724,926 B2 | 8/2017 | Keefe et al. | |
| 10,040,290 B2 | 8/2018 | Okushima et al. | |
| 2003/0058307 A1 | 3/2003 | Eguchi et al. | |
| 2007/0291082 A1 | 12/2007 | Baumer et al. | |
| 2008/0136860 A1 * | 6/2008 | Kyoso | B41J 29/38 347/19 |
| 2009/0002447 A1 | 1/2009 | Takei et al. | |
| 2010/0208010 A1 | 8/2010 | Inoue et al. | |
| 2010/0321443 A1 | 12/2010 | Xie | |
| 2011/0007117 A1 | 1/2011 | Bibl et al. | |
| 2011/0205303 A1 | 8/2011 | Pan et al. | |
| 2011/0242237 A1 | 10/2011 | Uezawa | |
| 2012/0007921 A1 | 1/2012 | Govyadinov et al. | |
| 2012/0098900 A1 | 4/2012 | Xie et al. | |
| 2016/0288499 A1 | 10/2016 | Sugahara et al. | |
| 2017/0259579 A1 | 9/2017 | Sugahara et al. | |
| 2022/0250388 A1 | 8/2022 | Okushima et al. | |

FOREIGN PATENT DOCUMENTS

| | | | |
|---|---|---|---|
| CN | 102218919 | A | 10/2011 |
| EP | 0 317 171 | A3 | 5/1989 |
| JP | 08-267758 | A | 10/1996 |
| JP | 2002-355973 | A | 12/2002 |
| JP | 2003-025577 | A | 1/2003 |
| JP | 2003-276189 | A | 9/2003 |
| JP | 2007-313884 | A | 12/2007 |
| JP | 2008-030361 | A | 2/2008 |
| JP | 2009-233945 | A | 10/2009 |
| JP | 2011-011383 | A | 1/2011 |
| JP | 2011-062867 | A | 3/2011 |
| JP | 2011-094075 | A | 5/2011 |
| JP | 6929639 | B2 | 9/2021 |
| RU | 2 427 470 | C1 | 8/2011 |
| RU | 2 507 073 | C2 | 2/2014 |
| WO | 2010/044775 | A1 | 4/2010 |
| WO | 2012/015397 | A1 | 2/2012 |
| WO | 2013/130039 | A1 | 9/2013 |
| WO | 2013/162606 | A1 | 10/2013 |
| WO | 2017/010996 | A1 | 1/2017 |

OTHER PUBLICATIONS

Office Action dated May 15, 2018, in Russian Patent Application No. 2016151769.

Office Action dated Sep. 10, 2018, in Russian Patent Application No. 2016151769.

Office Action dated Sep. 30, 2018, in Chinese Patent Application No. 20170008691.3.

Communication under Rule 71(3) dated May 9, 2019, in European Patent Application No. 17000025.1.

Notice of Allowance with Search Report dated Aug. 28, 2019, in Russian Patent Application No. 2018139533.

Office Action dated Sep. 20, 2019, in Indian Patent Application No. 201644045055.

Office Action dated Oct. 22, 2019, in Korean Patent Application No. 10-2017-0002207.

Extended European Search Report dated Jan. 30, 2020, in European Patent Application No. 19196259.6.

Office Action dated Aug. 26, 2020, in Chinese Patent Application No. 201911003119.3.

Office Action dated Dec. 1, 2020, in Japanese Patent Application No. 2016-238891.

Office Action dated Apr. 28, 2021, in Australian Patent Application No. 2016277746.

Office Action dated Jul. 23, 2021, in Chinese Patent Application No. 201911003119.3.

Office Action dated Jun. 28, 2022, in Japanese Patent Application No. 2021-128493.

Office Action dated Feb. 20, 2024, in Japanese Patent Application No. 2023-004333.

Office Action dated Jul. 2, 2024, in Japanese Patent Application No. 2023-004333.

* cited by examiner

LIQUID EJECTION HEAD, LIQUID EJECTION APPARATUS, AND METHOD OF SUPPLYING LIQUID

This application is a divisional application of U.S. patent application Ser. No. 17/132,840, filed Dec. 23, 2020, which is a divisional application of U.S. patent application Ser. No. 16/407,437, filed May 9, 2019, now U.S. Pat. No. 10,919,301, which is a divisional application of U.S. patent application Ser. No. 15/991,256, filed May 29, 2018, now U.S. Pat. No. 10,363,747, which is a divisional application of U.S. patent application Ser. No. 15/388,430, filed Dec. 22, 2016, now U.S. Pat. No. 10,040,290, which claims the benefit of Japanese Patent Application No. 2016-003078 filed Jan. 8, 2016, and No. 2016-238891 filed Dec. 8, 2016, which are hereby incorporated by reference herein in their entirety.

BACKGROUND OF THE INVENTION

Field of the Invention

The present invention relates to a liquid ejection head, a liquid ejection apparatus, and a method of supplying liquid, and specifically relates to a liquid ejection head that performs an ejection operation while allowing liquid to flow through a passage between a liquid ejection opening and an element generating ejection energy.

Description of the Related Art

Japanese Patent Laid-Open No. 2002-355973 describes this type of liquid ejection head that performs ink ejection operation while circulating ink in a passage between an ejection opening and a heating resistor that generates ejection energy, of the liquid ejection head, by causing ink circulation in the liquid ejection head. According to this configuration, it is possible to eject ink which is thickened when moisture, etc. of ink evaporates due to heat generated as a result of the ejection operation, and to supply new ink. As a result, it is possible to prevent clogging of the ejection opening due to the thickened ink.

However, in a configuration in which liquid is allowed to flow through a passage between an ejection opening and an energy generation element as described in Japanese Patent Laid-Open No. 2002-355973, quality of liquid existing adjacent to the ejection opening may vary depending on shapes of the passage or the ejection opening, even though liquid flows. For example, in a liquid ejection head that ejects ink, ink may be thickened or a color material concentration may be changed, which may result in ink ejection defect or an uneven density of a printed image.

SUMMARY OF THE INVENTION

An object of the present invention is to provide a liquid ejection head, a liquid ejection apparatus, and a method of supplying liquid capable of suppressing a change in quality of liquid adjacent to an ejection opening in a configuration in which liquid is allowed to flow through a passage between the ejection opening and an energy generation element.

In a first aspect of the present invention, there is provided a liquid ejection head comprising: an ejection opening for ejecting a liquid; a passage in which an energy generation element for generating energy used to eject the liquid is disposed; an ejection opening portion that allows communication between the ejection opening and the passage; a supply passage for allowing the liquid to flow into the passage from an outside; and an outflow passage for allowing the liquid to flow out to the outside from the passage, wherein an expression of $H^{-0.34} \times P^{-0.66} \times W > 1.7$ is satisfied when a height of the passage at an upstream side of a communication portion between the passage and the ejection opening portion in a flow direction of the liquid inside the passage is set to H, a length of the ejection opening portion in a direction in which the liquid is ejected from the ejection opening is set to P, and a length of the ejection opening portion in the flow direction of the liquid inside the passage is set to W.

In a second aspect of the present invention, there is provided a method of supplying a liquid in a liquid ejection head including an ejection opening for ejecting a liquid, a passage in which an energy generation element for generating energy used to eject the liquid is disposed, an ejection opening portion that allows communication between the ejection opening and the passage, a supply passage for allowing the liquid to flow into the passage from an outside, and an outflow passage for allowing the liquid to flow out to the outside from the passage, wherein when supplying the liquid is performed such that the liquid flows into the passage from the outside through the supply passage, and flows out to the outside through the outflow passage from the passage, a flow of the liquid is generated such that the liquid entering an inside of the ejection opening portion from the passage arrives at a position of a meniscus of the liquid formed in the ejection opening, and then returns to the passage.

In a third aspect of the present invention, there is provided a liquid ejection apparatus comprising: a liquid ejection head including an ejection opening for ejecting a liquid, a passage in which an energy generation element for generating energy used to eject the liquid is disposed, an ejection opening portion that allows communication between the ejection opening and the passage, a supply passage for allowing the liquid to flow into the passage from an outside, and an outflow passage for allowing the liquid to flow out to the outside from the passage; and supply means for allowing the liquid to flow into the passage from the outside through the supply passage, and flow out to the outside through the outflow passage from the passage, wherein an expression of $H^{-0.34} \times P^{-0.66} \times W > 1.7$ is satisfied when a height of the passage at an upstream side of a communication portion between the passage and the ejection opening portion in a flow direction of the liquid inside the passage is set to H, a length of the ejection opening portion in a direction in which the liquid is ejected from the ejection opening is set to P, and a length of the ejection opening portion in the flow direction of the liquid inside the passage is set to W.

In a fourth aspect of the present invention, there is provided a liquid ejection head comprising: an orifice plate including an ejection opening for ejecting a liquid; and a substrate, a passage for supplying the liquid from one end side to the other end side being formed between the orifice plate and the substrate, and the ejection opening being formed between the one end side and the other end side of the passage, wherein an expression of $H^{-0.34} \times P^{-0.66} \times W > 1.7$ is satisfied when a height of the passage in a communication portion between an ejection opening portion, which allows communication between the ejection opening and the passage, and the passage on the one end side is set to H, a length of the ejection opening portion in a direction in which the liquid is ejected from the ejection opening is set to P, and a length of the ejection opening portion in a direction from the one end side toward the other end side is set to W.

In a fifth aspect of the present invention, there is provided a liquid ejection head comprising: an ejection opening for ejecting a liquid; a passage in which an energy generation element for generating energy used to eject the liquid is disposed; an ejection opening portion that allows communication between the ejection opening and the passage; a supply passage for allowing the liquid to flow into the passage from an outside; and an outflow passage for allowing the liquid to flow out to the outside from the passage, wherein an expression of $H^{-0.34}\times P^{-0.66}\times W>1.7$ and an expression of $0.350\times H+0.227\times P-0.100\times Z>4$ are satisfied when a height of the passage at an upstream side of a communication portion between the passage and the ejection opening portion in a flow direction of the liquid inside the passage is set to H, a length of the ejection opening portion in a direction in which the liquid is ejected from the ejection opening is set to P, a length of the ejection opening portion in the flow direction of the liquid inside the passage is set to W, and an effective diameter of the inscribed circle of the ejection opening portion is set to Z.

In a sixth aspect of the present invention, there is provided a liquid ejection head comprising: an ejection opening for ejecting a liquid; a passage in which an energy generation element for generating energy used to eject the liquid is disposed; an ejection opening portion that allows communication between the ejection opening and the passage; a supply passage for allowing the liquid to flow into the passage from an outside; and an outflow passage for allowing the liquid to flow out to the outside from the passage, wherein an expression of $H^{-0.34}\times P^{-0.66}\times W>1.5$ is satisfied when a height of the passage at an upstream side of a communication portion between the passage and the ejection opening portion in a flow direction of the liquid inside the passage is set to H, a length of the ejection opening portion in a direction in which the liquid is ejected from the ejection opening is set to P, and a length of the ejection opening portion in the flow direction of the liquid inside the passage is set to W.

In a seventh aspect of the present invention, there is provided a method of supplying a liquid in a liquid ejection head including an ejection opening for ejecting a liquid, a passage in which an energy generation element for generating energy used to eject the liquid is disposed, an ejection opening portion that allows communication between the ejection opening and the passage, a supply passage for allowing the liquid to flow into the passage from an outside, and an outflow passage for allowing the liquid to flow out to the outside from the passage, wherein a flow of the liquid is generated such that the liquid entering an inside of the ejection opening portion from the passage arrives at a position corresponding to at least a half the inside of the ejection opening portion in a direction in which the liquid inside the ejection opening portion is ejected, and then returns to the passage when the liquid is supplied such that the liquid flows into the passage from the outside through the supply passage, and flows out to the outside through the outflow passage from the passage.

According to the above configuration, it is possible to suppress a change in quality of liquid adjacent to an ejection opening by allowing liquid in a passage of the liquid ejection head to flow. Thereby, it is possible to for example, suppress thickening of ink due to evaporation of liquid from the ejection opening and reduce color unevenness of an image.

Further features of the present invention will become apparent from the following description of exemplary embodiments (with reference to the attached drawings).

DESCRIPTION OF THE EMBODIMENTS

Hereinafter, application examples and embodiments to which the present invention is applied will be described with reference to the drawings. Additionally, a liquid ejection head that ejects liquid such as ink and a liquid ejection apparatus that mounts the liquid ejection head according to the present invention can be applied to a printer, a copying machine, a facsimile machine having a communication system, a word processor having a printer, and an industrial printing apparatus combined with various processing devices. For example, the liquid ejection head and the liquid ejection apparatus can be used to manufacture a biochip or print an electronic circuit. Further, since the embodiments to be described below are detailed examples of the invention, various technical limitations thereof can be made. However, embodiments of the present invention are not limited to the embodiments or the other detailed methods of the specification and can be modified within the spirit of the present invention.

First Application Example

<Inkjet Printing Apparatus>

Figure 1:
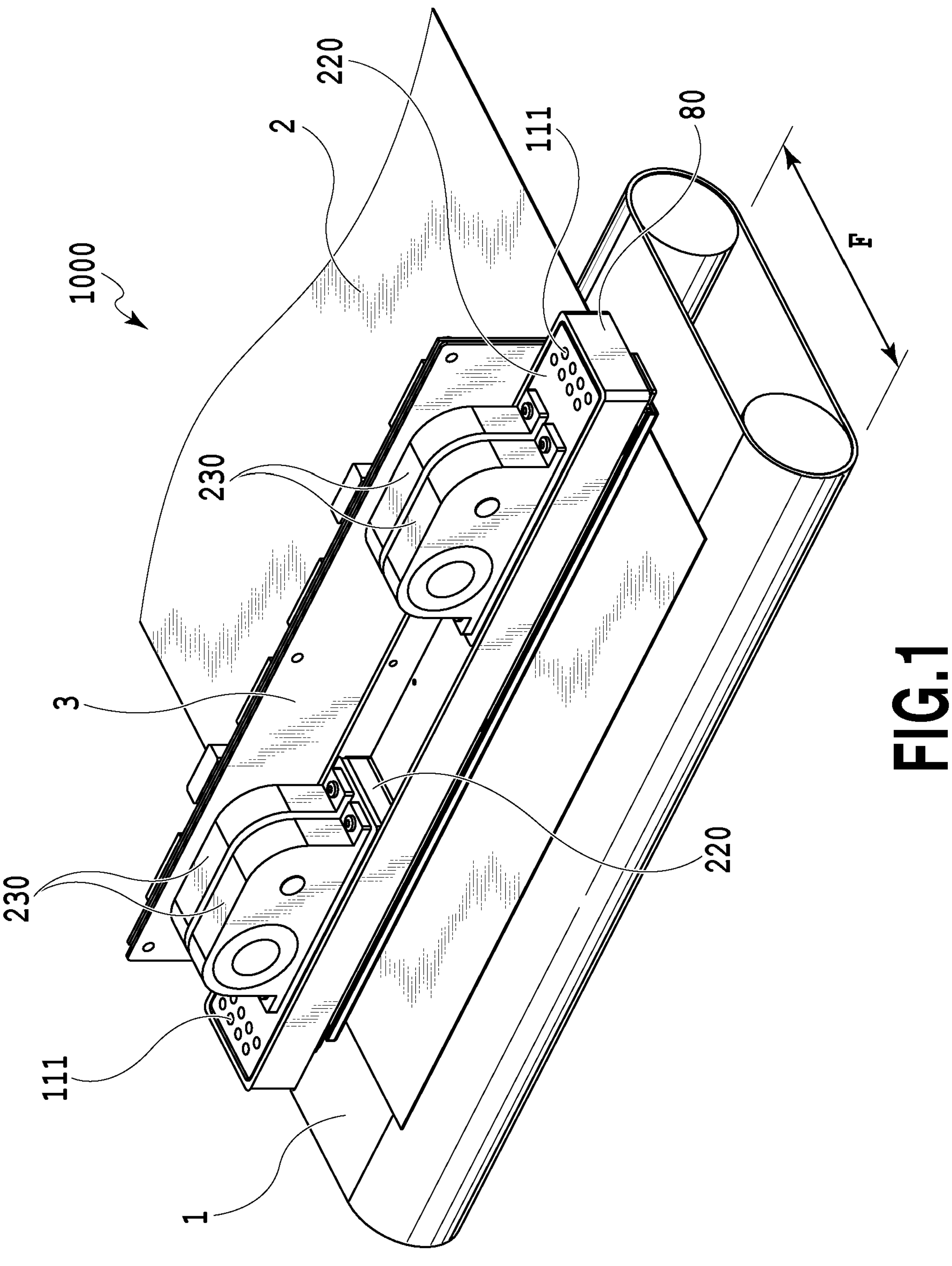
FIG. 1 is a view illustrating a schematic configuration of an ink jet printing apparatus according to an embodiment of a liquid ejection apparatus of the present invention that ejects a liquid.

FIG. 1 is a diagram illustrating a schematic configuration of a liquid ejection apparatus that ejects a liquid in the invention and particularly an inkjet printing apparatus (hereinafter, also referred to as a printing apparatus) 1000 that prints an image by ejecting ink. The printing apparatus 1000 includes a conveying unit 1 which conveys a print medium 2 and a line type (page wide type) liquid ejection head 3 which is disposed to be substantially orthogonal to the conveying direction of the print medium 2. Then, the printing apparatus 1000 is a line type printing apparatus which continuously prints an image at one pass by ejecting ink onto the relative moving print mediums 2 while continuously or intermittently conveying the print mediums 2. The liquid ejection head 3 includes a negative pressure control unit 230 which controls a pressure (a negative pressure) inside a circulation path, a liquid supply unit 220 which communicates with the negative pressure control unit 230 so that a fluid can flow therebetween, a liquid connection portion 111 which serves as an ink supply opening and an ink ejection opening of the liquid supply unit 220, and a casing 80. The print medium 2 is not limited to a cut sheet and may be also a continuous roll medium. The liquid ejection head 3 can print a full color image by inks of cyan C, magenta M, yellow Y, and black K and is fluid-connected to a liquid supply member, a main tank, and a buffer tank (see FIG. 2 to be described later) which serve as a supply path supplying a liquid to the liquid ejection head 3. Further, the control unit which supplies power and transmits an ejection control signal to the liquid ejection head 3 is electrically connected to the liquid ejection head 3. The liquid path and the electric signal path in the liquid ejection head 3 will be described later.

The printing apparatus 1000 is an inkjet printing apparatus that circulates a liquid such as ink between a tank and the liquid ejection head 3 to be described later. In the ink jet printing apparatus of a first application example, various circulation configurations including a first circulation configuration and a second circulation configuration, which are described below, can be applied. The first circulation configuration is a configuration in which the liquid is circulated by the activation of two circulation pumps (for high and low pressures) at the downstream side of the liquid ejection head 3. A second circulation configuration is a configuration in which the liquid is circulated by the activation of two circulation pumps (for high and low pressures) at the upstream side of the liquid ejection head 3. Hereinafter, the first circulation configuration and the second circulation configuration will be described.

(Description of First Circulation Configuration)

Figure 2:
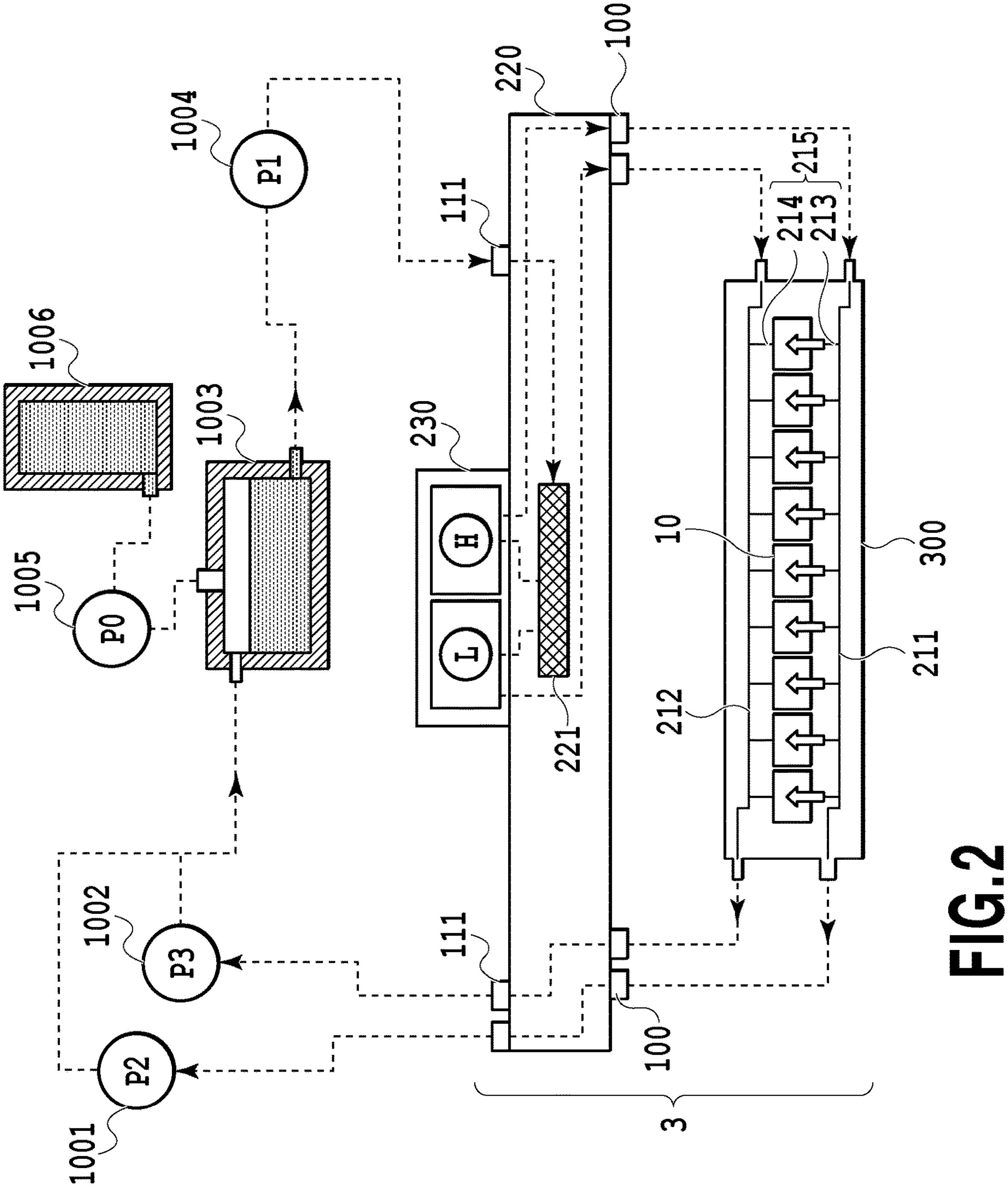
FIG. 2 is a diagram illustrating a first circulation configuration in a circulation path applied to a printing apparatus of the embodiment.

FIG. 2 is a schematic diagram illustrating the first circulation configuration in the circulation path applied to the printing apparatus 1000 of the application example. The liquid ejection head 3 is fluid-connected to a first circulation pump (the high pressure side) 1001, a first circulation pump (the low pressure side) 1002, and a buffer tank 1003. Further, in FIG. 2, in order to simplify a description, a path through which ink of one color of cyan C, magenta M, yellow Y, and black K flows is illustrated. However, in fact, four colors of circulation paths are provided in the liquid ejection head 3 and the printing apparatus body.

In the first circulation configuration, ink inside a main tank 1006 is supplied into the buffer tank 1003 by a replenishing pump 1005 and then is supplied to the liquid supply unit 220 of the liquid ejection head 3 through the liquid connection portion 111 by a second circulation pump 1004. Subsequently, the ink which is adjusted to two different negative pressures (high and low pressures) by the negative pressure control unit 230 connected to the liquid supply unit 220 is circulated while being divided into two passages having the high and low pressures. The ink inside the liquid ejection head 3 is circulated in the liquid ejection head by the action of the first circulation pump (the high pressure side) 1001 and the first circulation pump (the low pressure side) 1002 at the downstream side of the head 3, is discharged from the head 3 through the liquid connection portion 111, and is returned to the buffer tank 1003.

The buffer tank 1003 which is a sub-tank includes an atmosphere communication opening (not illustrated) which is connected to the main tank 1006 to communicate the inside of the tank with the outside and thus can discharge bubbles inside the ink to the outside. The replenishing pump 1005 is provided between the buffer tank 1003 and the main tank 1006. The replenishing pump 1005 delivers the ink from the main tank 1006 to the buffer tank 1003 after the ink is consumed by the ejection (the ink ejection) of the ink from the ejection opening of the liquid ejection head 3 in the printing operation and the suction collection operation.

Two first circulation pumps 1001 and 1002 draw the liquid from the liquid connection portion 111 of the liquid ejection head 3 so that the liquid flows to the buffer tank 1003. As the first circulation pump, a displacement pump having quantitative liquid delivery ability is desirable. Specifically, a tube pump, a gear pump, a diaphragm pump, and a syringe pump can be exemplified. However, for example, a general constant flow valve or a general relief valve may be disposed at an outlet of a pump to ensure a predetermined flow rate. When the liquid ejection head 3 is driven, the first circulation pump (the high pressure side) 1001 and the first circulation pump (the low pressure side) 1002 are operated so that the ink flows at a predetermined flow rate through a common supply passage 211 and a common collection passage 212. Since the ink flows in this way, the temperature of the liquid ejection head 3 during a printing operation is kept at an optimal temperature. The predetermined flow rate when the liquid ejection head 3 is driven is desirably set to be equal to or higher than a flow rate at which a difference in temperature among the printing element boards inside the liquid ejection head 3 does not influence printing quality. Above all, when a too high flow rate is set, a difference in negative pressure among the printing element boards 10 increases due to the influence of pressure loss of the passage inside a liquid ejection unit 300 and thus unevenness in density is caused. For that reason, it is desirable to set the flow rate in consideration of a difference in temperature and a difference in negative pressure among the printing element boards 10.

The negative pressure control unit 230 is provided in a path between the second circulation pump 1004 and the liquid ejection unit 300. The negative pressure control unit 230 is operated to keep a pressure at the downstream side (that is, a pressure near the liquid ejection unit 300) of the negative pressure control unit 230 at a predetermined pressure even when the flow rate of the ink changes in the circulation system due to a difference in ejection amount per unit area. As two negative pressure control mechanisms constituting the negative pressure control unit 230, any mechanism may be used as long as a pressure at the downstream side of the negative pressure control unit 230 can be controlled within a predetermined range or less from a desired set pressure. As an example, a mechanism such as a so-called "pressure reduction regulator" can be employed. In the circulation passage of the application example, the upstream side of the negative pressure control unit 230 is pressurized by the second circulation pump 1004 through the liquid supply unit 220. With such a configuration, since an influence of a water head pressure of the buffer tank 1003 with respect to the liquid ejection head 3 can be suppressed, a degree of freedom in layout of the buffer tank 1003 of the printing apparatus 1000 can be widened.

As the second circulation pump 1004, a turbo pump or a displacement pump can be used as long as a predetermined head pressure or more can be exhibited in the range of the ink circulation flow rate used when the liquid ejection head 3 is driven. Specifically, a diaphragm pump can be used. Further, for example, a water head tank disposed to have a certain water head difference with respect to the negative pressure control unit 230 can be also used instead of the second circulation pump 1004.

As illustrated in FIG. 2, the negative pressure control unit 230 includes two negative pressure adjustment mechanisms H, L respectively having different control pressures. Among two negative pressure adjustment mechanisms, a relatively high pressure side (indicated by "H" in FIG. 2) and a relatively low pressure side (indicated by "L" in FIG. 2) are respectively connected to the common supply passage 211 and the common collection passage 212 inside the liquid ejection unit 300 through the liquid supply unit 220. The liquid ejection unit 300 is provided with the common supply passage 211, the common collection passage 212, and an individual passage 215 (an individual supply passage 213 and an individual collection passage 214) communicating with the printing element board. The negative pressure control mechanism H is connected to the common supply passage 211, the negative pressure control mechanism L is connected to the common collection passage 212, and a differential pressure is formed between two common passages. Then, since the individual passage 215 communicates with the common supply passage 211 and the common collection passage 212, a flow (a flow indicated by an arrow direction of FIG. 2) is generated in which a part of the liquid flows from the common supply passage 211 to the common collection passage 212 through the passage formed inside the printing element board 10. The two negative pressure adjustment mechanisms H, L are connected to passages from the liquid connection portion 111 through the filter 221.

In this way, the liquid ejection unit 300 has a flow in which a part of the liquid passes through the printing element boards 10 while the liquid flows to pass through the common supply passage 211 and the common collection passage 212. For this reason, heat generated by the printing element boards 10 can be discharged to the outside of the printing element board 10 by the ink flowing through the common supply passage 211 and the common collection passage 212. With such a configuration, the flow of the ink can be generated even in the pressure chamber or the ejection opening not ejecting the liquid when an image is printed by the liquid ejection head 3. Accordingly, the thickening of the ink can be suppressed in such a manner that the viscosity of the ink thickened inside the ejection opening is decreased. Further, the thickened ink or the foreign material in the ink can be discharged toward the common collection passage 212. For this reason, the liquid ejection head 3 of the application example can print a high-quality image at a high speed.

(Description of Second Circulation Configuration)

Figure 3:
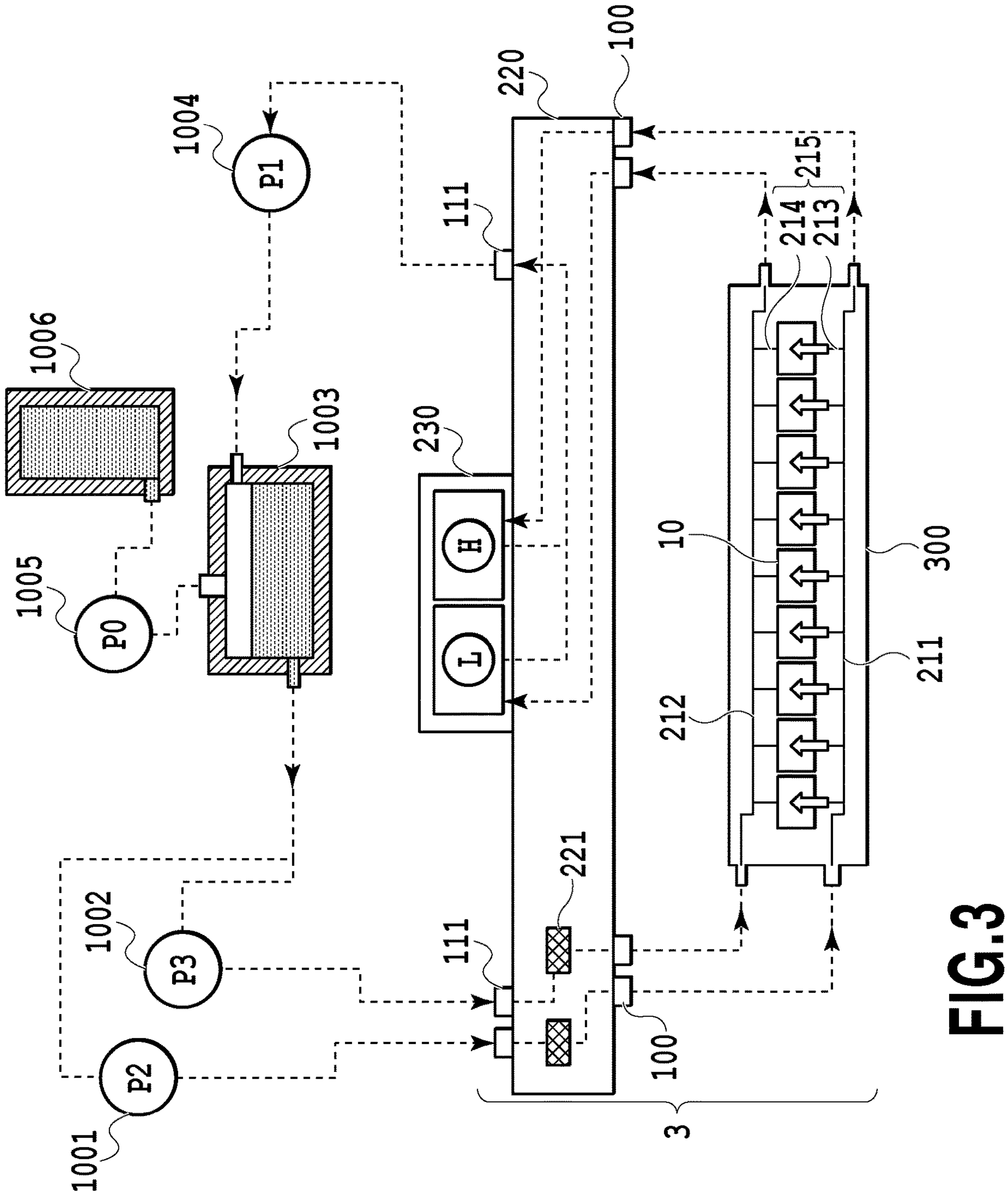
FIG. 3 is a diagram illustrating a second circulation configuration in the circulation path applied to the printing apparatus of the embodiment.

FIG. 3 is a schematic diagram illustrating the second circulation configuration which is a circulation configuration different from the first circulation configuration in the circulation path applied to the printing apparatus of the application example. A main difference from the first circulation configuration is that two negative pressure control mechanisms constituting the negative pressure control unit 230 both control a pressure at the upstream side of the negative pressure control unit 230 within a predetermined range from a desired set pressure. Further, another difference from the first circulation configuration is that the second circulation pump 1004 serves as a negative pressure source which reduces a pressure at the downstream side of the negative pressure control unit 230. Further, still another difference is that the first circulation pump (the high pressure side) 1001 and the first circulation pump (the low pressure side) 1002 are disposed at the upstream side of the liquid ejection head 3 and the negative pressure control unit 230 is disposed at the downstream side of the liquid ejection head 3.

In the second circulation configuration, the ink inside the main tank 1006 is supplied to the buffer tank 1003 by the replenishing pump 1005. Subsequently, the ink is divided into two passages and is circulated in two passages at the high pressure side and the low pressure side by the action of the negative pressure control unit 230 provided in the liquid ejection head 3. The ink which is divided into two passages at the high pressure side and the low pressure side is supplied to the liquid ejection head 3 through the liquid connection portion 111 by the action of the first circulation pump (the high pressure side) 1001 and the first circulation pump (the low pressure side) 1002. Subsequently, the ink circulated inside the liquid ejection head by the action of the first circulation pump (the high pressure side) 1001 and the first circulation pump (the low pressure side) 1002 is discharged from the liquid ejection head 3 through the liquid connection portion 111 by the negative pressure control unit 230. The discharged ink is returned to the buffer tank 1003 by the second circulation pump 1004.

In the second circulation configuration, the negative pressure control unit 230 stabilizes a change in pressure at the upstream side (that is, the liquid ejection unit 300) of the negative pressure control unit 230 within a predetermined range from a predetermined pressure even when a change in flow rate is caused by a change in ejection amount per unit area. In the circulation passage of the application example, the downstream side of the negative pressure control unit 230 is pressurized by the second circulation pump 1004 through the liquid supply unit 220. With such a configuration, since an influence of a water head pressure of the buffer tank 1003 with respect to the liquid ejection head 3 can be suppressed, the layout of the buffer tank 1003 in the printing apparatus 1000 can have many options. Instead of the second circulation pump 1004, for example, a water head tank disposed to have a predetermined water head difference with respect to the negative pressure control unit 230 can be also used. Similarly to the first circulation configuration, in the second circulation configuration, the negative pressure control unit 230 includes two negative pressure control mechanisms respectively having different control pressures. Among two negative pressure adjustment mechanisms, a high pressure side (indicated by "H" in FIG. 3) and a low pressure side (indicated by "L" in FIG. 3) are respectively connected to the common supply passage 211 or the common collection passage 212 inside the liquid ejection unit 300 through the liquid supply unit 220. When the pressure of the common supply passage 211 is set to be higher than the pressure of the common collection passage 212 by two negative pressure adjustment mechanisms, a flow of the liquid is formed from the common supply passage 211 to the common collection passage 212 through the individual passage 215 and the passages formed inside the printing element boards 10.

In such a second circulation configuration, the same liquid flow as that of the first circulation configuration can be obtained inside the liquid ejection unit 300, but has two advantages different from those of the first circulation configuration. As a first advantage, in the second circulation configuration, since the negative pressure control unit 230 is disposed at the downstream side of the liquid ejection head 3, there is low concern that a foreign material or a trash produced from the negative pressure control unit 230 flows into the liquid ejection head 3. As a second advantage, in the second circulation configuration, a maximal value of the flow rate necessary for the liquid from the buffer tank 1003 to the liquid ejection head 3 is smaller than that of the first circulation configuration. The reason is as below.

In the case of the circulation in the print standby state, the sum of the flow rates of the common supply passage 211 and the common collection passage 212 is set to a flow rate A. The value of the flow rate A is defined as a minimal flow rate necessary to adjust the temperature of the liquid ejection head 3 in the print standby state so that a difference in temperature inside the liquid ejection unit 300 falls within a desired range. Further, the ejection flow rate obtained when the ink is ejected from all ejection openings of the liquid ejection unit 300 (the full ejection state) is defined as a flow rate F (the ejection amount per each ejection opening x the ejection frequency per unit time x the number of the ejection openings).

Figure 4:
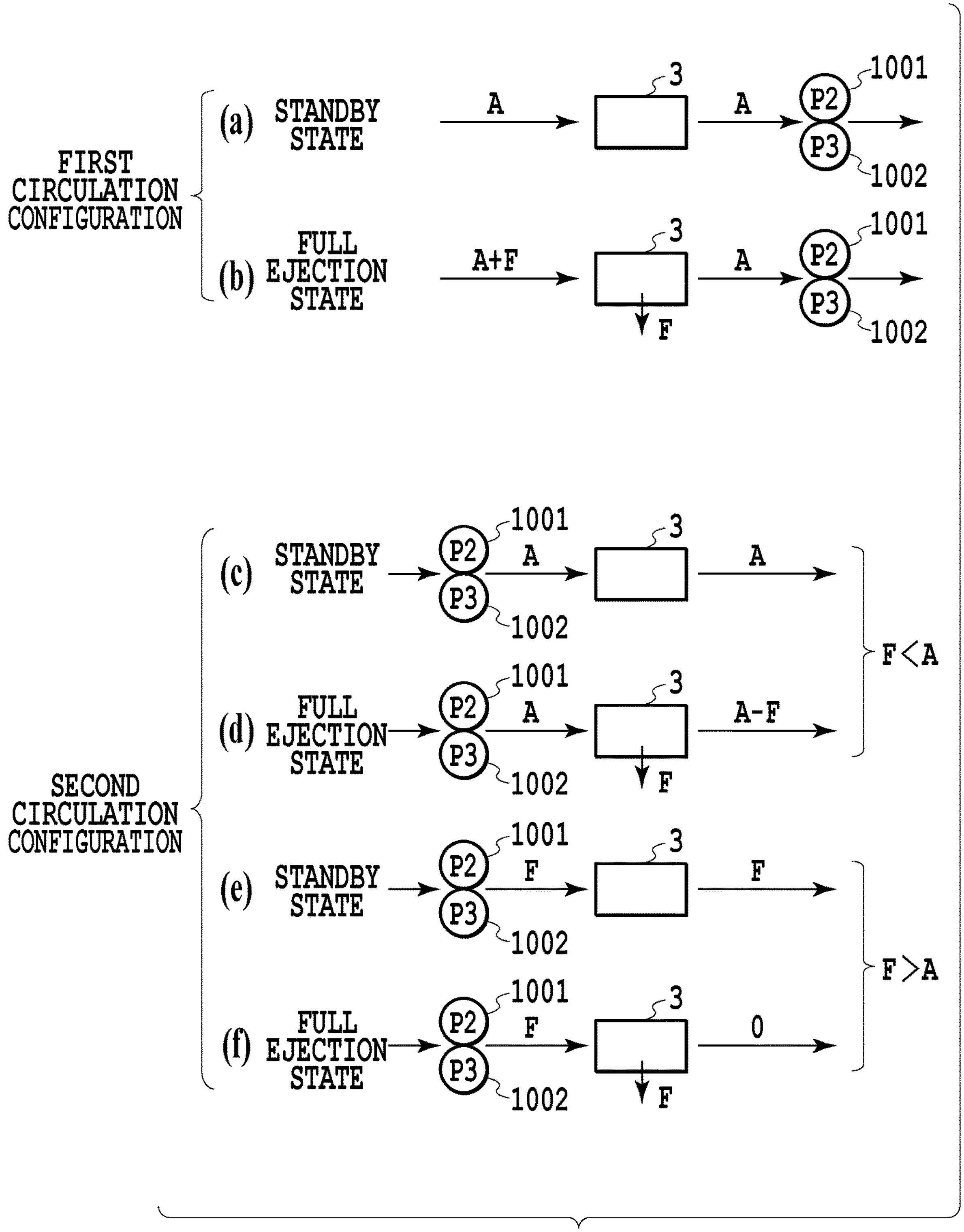
FIG. 4 is a diagram illustrating a difference in ink inflow amount to a liquid ejection head between the first circulation configuration and the second circulation configuration.

FIG. 4 is a schematic diagram illustrating a difference in ink inflow amount to the liquid ejection head between the first circulation configuration and the second circulation configuration. FIG. 4-(*a*) illustrates the standby state in the first circulation configuration and FIG. 4-(*b*) illustrates the full ejection state in the first circulation configuration. FIG. 4-(*c*) to FIG. 4-(*f*) illustrate the second circulation passage. Here, FIG. 4-(*c*) and FIG. 4-(*d*) illustrate a case where the flow rate F is lower than the flow rate A and FIG. 4-(*e*) and FIG. 4-(*f*) illustrate a case where the flow rate F is higher than the flow rate A. In this way, the flow rates in the standby state and the full ejection state are illustrated.

The case of the first circulation configuration (FIG. 4-(*a*) and FIG. 4-(*b*)) in which the first circulation pump 1001 and the first circulation pump 1002 each having a quantitative liquid delivery ability are disposed at the downstream side of the liquid ejection head 3 will be described. In this case, the total flow rate of the first circulation pump 1001 and the first circulation pump 1002 becomes the flow rate A (FIG. 4-(*a*)). By the flow rate A, the temperature inside the liquid ejection unit 300 in the standby state can be managed. Then, in the case of the full ejection state of the liquid ejection head 3, the total flow rate of the first circulation pump 1001 and the first circulation pump 1002 remains in the flow rate A. However, negative pressure generated by the ejection of the liquid ejection head 3 acts. Thereby, a maximal flow rate of the liquid supplied to the liquid ejection head 3 is obtained such that the flow rate F consumed by the full ejection is added to the flow rate A of the total flow rate. Thus, a maximal value of the supply amount to the liquid ejection head 3 satisfies a relation of the flow rate A+the flow rate F since the flow rate F is added to the flow rate A (FIG. 4-(*b*)).

Meanwhile, in the case of the second circulation configuration (FIG. 4-(*c*) to FIG. 4-(*f*)) in which the first circulation pump 1001 and the first circulation pump 1002 are disposed at the upstream side of the liquid ejection head 3, the supply amount to the liquid ejection head 3 necessary for the print standby state becomes the flow rate A similarly to the first circulation configuration. Thus, when the flow rate A is higher than the flow rate F (FIG. 4-(*c*) and FIG. 4-(*d*)) in the second circulation configuration in which the first circulation pump 1001 and the first circulation pump 1002 are disposed at the upstream side of the liquid ejection head 3, the supply amount to the liquid ejection head 3 sufficiently becomes the flow rate A even in the full ejection state. At that time, the discharge flow rate of the liquid ejection head 3 satisfies a relation of the flow rate A−the flow rate F (FIG. 4-(*d*)). However, when the flow rate F is higher than the flow rate A (FIG. 4-(*e*) and FIG. 4-(*f*)), the flow rate becomes insufficient when the flow rate of the liquid supplied to the liquid ejection head 3 becomes the flow rate A in the full ejection state. For that reason, when the flow rate F is higher than the flow rate A, the supply amount to the liquid ejection head 3 needs to be set to the flow rate F. At that time, since the flow rate F is consumed by the liquid ejection head 3 in the full ejection state, the flow rate of the liquid discharged from the liquid ejection head 3 becomes almost zero (FIG. 4-(*f*)). In addition, if the liquid is not ejected in the full ejection state when the flow rate F is higher than the flow rate A, the liquid which is attracted by the amount consumed by the ejection of the flow rate F is discharged from the liquid ejection head 3.

In this way, in the case of the second circulation configuration, the total value of the flow rates set for the first circulation pump 1001 and the first circulation pump 1002, that is, the maximal value of the necessary supply flow rate becomes a large value among the flow rate A and the flow rate F. For this reason, as long as the liquid ejection unit 300 having the same configuration is used, the maximal value (the flow rate A or the flow rate F) of the supply amount necessary for the second circulation configuration becomes smaller than the maximal value (the flow rate A+the flow rate F) of the supply flow rate necessary for the first circulation configuration.

For that reason, in the case of the second circulation configuration, the degree of freedom of the applicable circulation pump increases. For example, a circulation pump having a simple configuration and low cost can be used or a load of a cooler (not illustrated) provided in a main body side path can be reduced. Accordingly, there is an advantage that the cost of the printing apparatus can be decreased. This advantage is high in the line head having a relatively large value of the flow rate A or the flow rate F. Accordingly, a line head having a longer longitudinal length among the line heads is beneficial.

Meanwhile, the first circulation configuration is more advantageous than the second circulation configuration. That is, in the second circulation configuration, since the flow rate of the liquid flowing through the liquid ejection unit 300 in the print standby state becomes maximal, a higher negative pressure is applied to the ejection openings as the ejection amount per unit area of the image (hereinafter, also referred to as a low-duty image) becomes smaller. For this reason, when the passage width is narrow and the negative pressure is high, a high negative pressure is applied to the ejection opening in the low-duty image in which unevenness easily appears. Accordingly, there is concern that printing quality may be deteriorated in accordance with an increase in the number of so-called satellite droplets ejected along with main droplets of the ink. Meanwhile, in the case of the first circulation configuration, since a high negative pressure is applied to the ejection opening when the image (hereinafter, also referred to as a high-duty image) having a large ejection amount per unit area is formed, there is an advantage that an influence of satellite droplets on the image is small even when many satellite droplets are generated. Two circulation configurations can be desirably selected in consideration of the specifications (the ejection flow rate F, the minimal circulation flow rate A, and the passage resistance inside the head) of the liquid ejection head and the printing apparatus body.

(Description of Third Circulation configuration)

Figure 47:
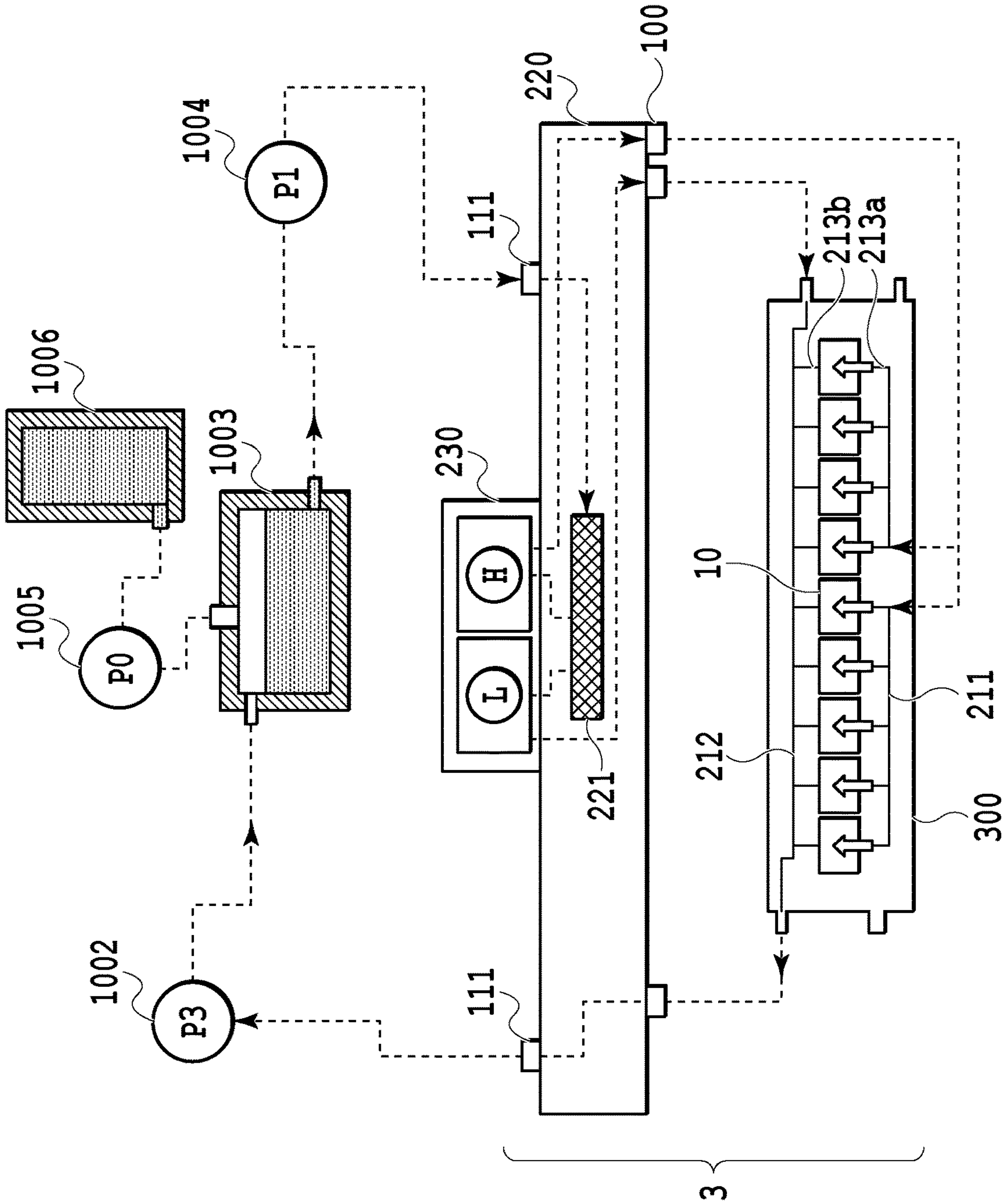
FIG. 47 is a diagram illustrating a third circulation configuration.

FIG. 47 is a schematic diagram illustrating a third circulation configuration which is one of the circulation paths used in the printing apparatus of the application example. A description of the same functions and configurations as those of the first and second circulation paths will be omitted and only a difference will be described.

In the circulation path, the liquid is supplied into the liquid ejection head 3 from three positions including two positions of the center portion of the liquid ejection head 3 and one end side of the liquid ejection head 3. The liquid flowing from the common supply passage 211 to each pressure chamber 23 is collected by the common collection passage 212 and is collected to the outside from the collection opening at the other end of the liquid ejection head 3. The individual supply passage 213 communicates with the common supply passage 211 and the common collection passage 212, and the printing element board 10 and the pressure chamber 23 disposed inside the printing element board are provided in the path of the individual supply passage 213. Accordingly, a part of the liquid flowing from the first circulation pump 1002 flows from the common supply passage 211 to the common collection passage 212 while passing through the pressure chamber 23 of the printing element board 10 and flows (see an arrow of FIG. 47). This is because a differential pressure is generated between a pressure adjustment mechanism H connected to the common supply passage 211 and a pressure adjustment mechanism L connected to the common collection passage 212 and the first circulation pump 1002 is connected only to the common collection passage 212.

In this way, in the liquid ejection unit 300, a flow of the liquid passing through the common collection passage 212 and a flow of the liquid flowing from the common supply passage 211 to the common collection passage 212 while passing through the pressure chamber 23 inside each printing element board 10 are generated. For this reason, heat generated by each printing element board 10 can be discharged to the outside of the printing element board 10 by the flow from the common supply passage 211 to the common collection passage 212 while pressure loss is suppressed. Further, according to the circulation path, the number of the pumps which are liquid transporting units can be decreased compared with the first and second circulation paths.

(Description of Configuration of Liquid Ejection Head)

Figure 5A:
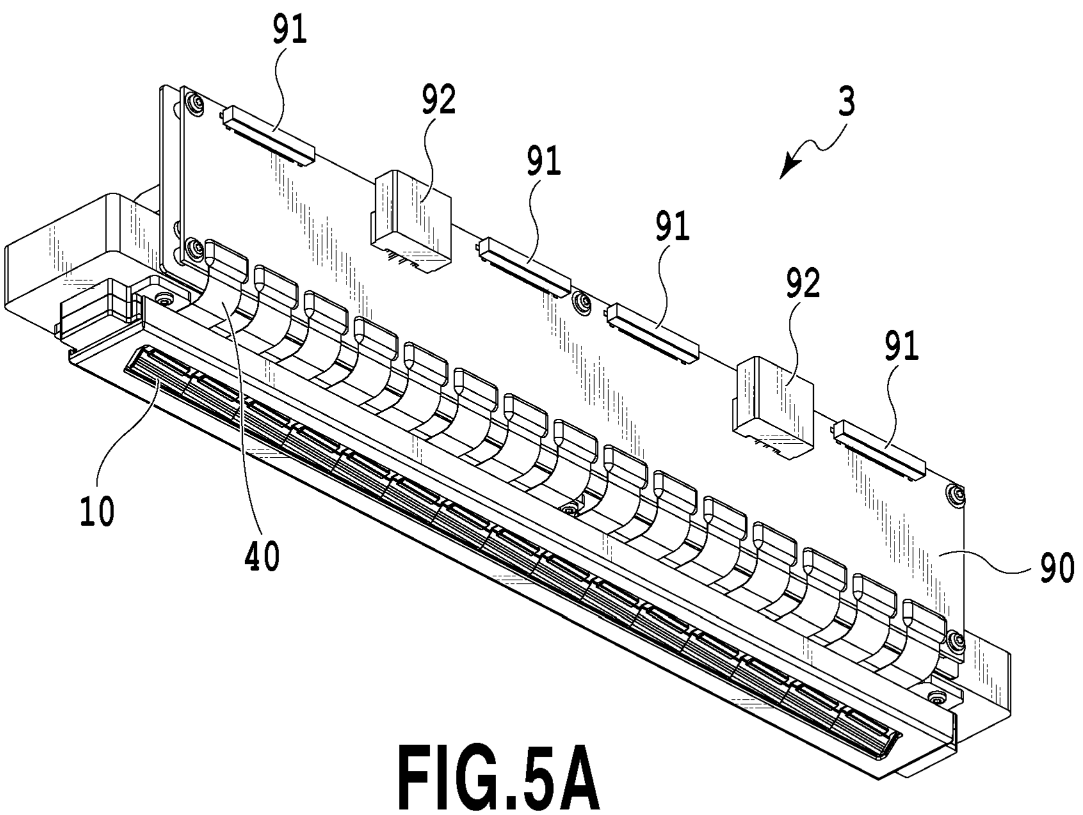
FIGS. 5A and 5B are perspective views illustrating the liquid ejection head of the embodiment.
Figure 5B:
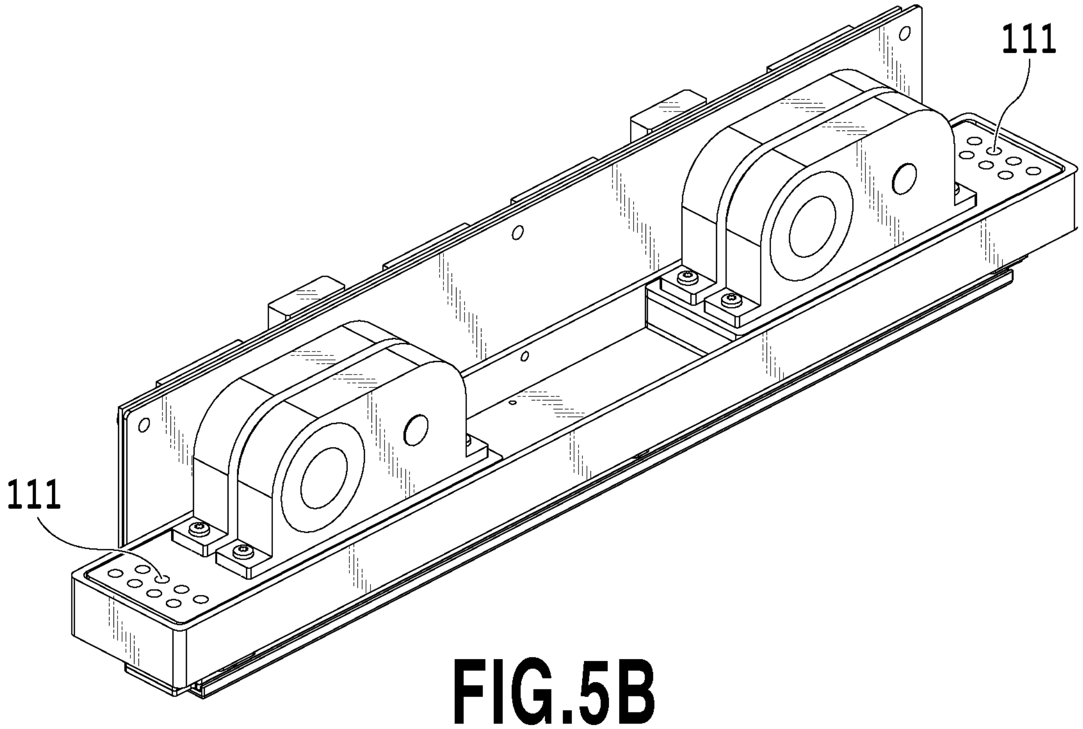

A configuration of the liquid ejection head 3 according to the first application example will be described. FIGS. 5A and 5B are perspective views illustrating the liquid ejection head 3 according to the application example. The liquid ejection head 3 is a line type (a page wide type) liquid ejection head in which fifteen printing element boards 10 each of which is capable of ejecting inks of four colors of cyan C, magenta M, yellow Y, and black K are arranged in series (an in-line arrangement). As illustrated in FIG. 5A, the liquid ejection head 3 includes the printing element boards 10 and a signal input terminal 91 and a power supply terminal 92 which are electrically connected to each other through a flexible circuit board 40 and an electric wiring board 90 capable of supplying electric energy to the printing element board 10. The signal input terminal 91 and the power supply terminal 92 are electrically connected to the control unit of the printing apparatus 1000 so that an ejection drive signal and power necessary for the ejection are supplied to the printing element board 10. When the wirings are integrated by the electric circuit inside the electric wiring board 90, the number of the signal input terminals 91 and the power supply terminals 92 can be decreased compared with the number of the printing element boards 10. Accordingly, the number of electrical connection components to be separated when the liquid ejection head 3 is assembled to the printing apparatus 1000 or the liquid ejection head is replaced decreases. As illustrated in FIG. 5B, the liquid connection portions 111 which are provided at both ends of the liquid ejection head 3 are connected to the liquid supply system of the printing apparatus 1000. Accordingly, the inks of four colors including cyan C, magenta M, yellow Y, and black K4 are supplied from the supply system of the printing apparatus 1000 to the liquid ejection head 3 and the inks passing through the liquid ejection head 3 are collected by the supply system of the printing apparatus 1000. In this way, the inks of different colors can be circulated through the path of the printing apparatus 1000 and the path of the liquid ejection head 3.

Figure 6:
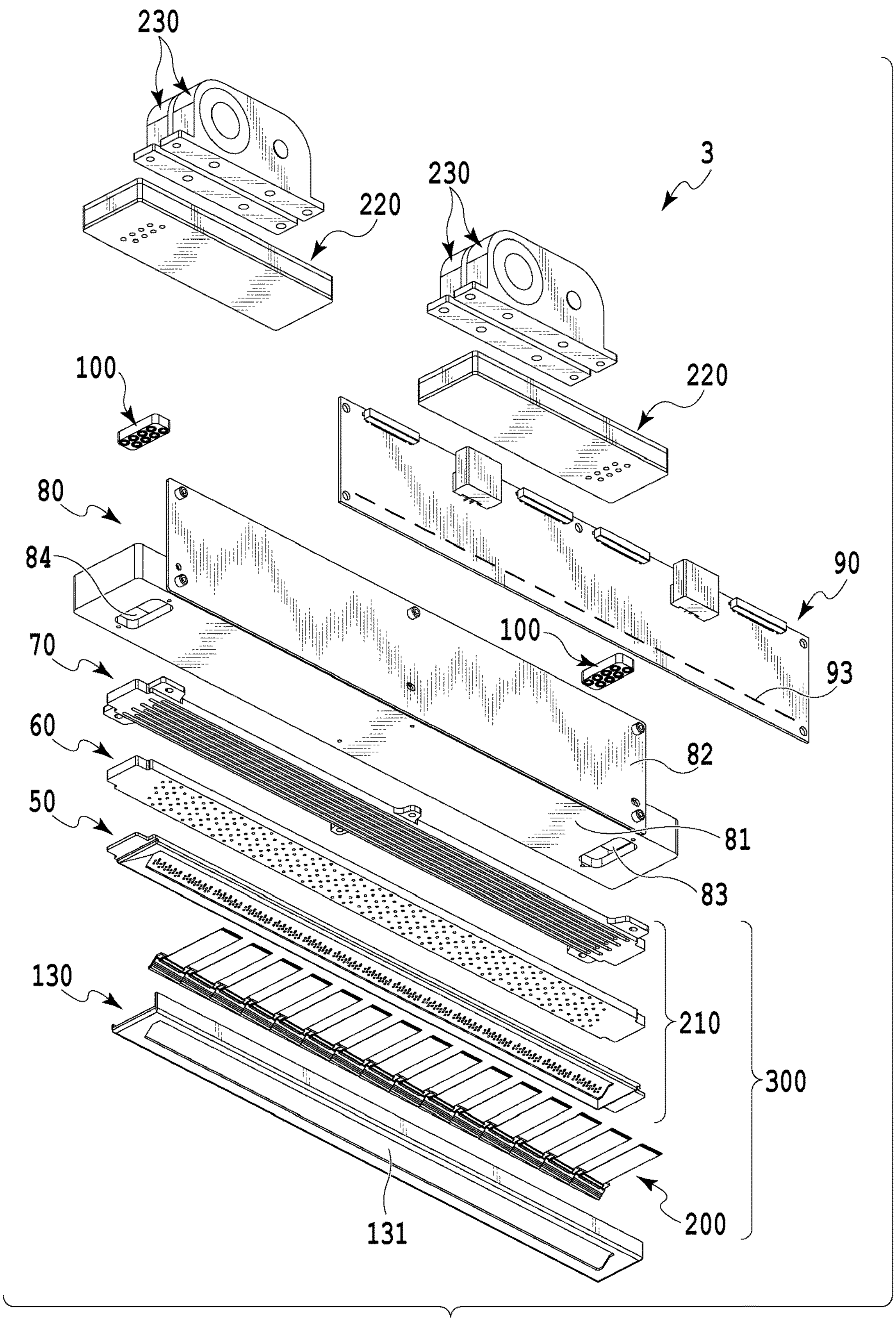
FIG. 6 is an exploded perspective view illustrating components or units constituting the liquid ejection head.

FIG. 6 is an exploded perspective view illustrating components or units constituting the liquid ejection head 3. The liquid ejection unit 300, the liquid supply unit 220, and the electric wiring board 90 are attached to the casing 80. The liquid connection portions 111 (see FIG. 3) are provided in the liquid supply unit 220. Also, in order to remove a foreign material in the supplied ink, filters 221 (see FIGS. 2 and 3) for different colors are provided inside the liquid supply unit 220 while communicating with the openings of the liquid connection portions 111. Two liquid supply units 220 respectively corresponding to two colors are provided with the filters 221. The liquid passing through the filter 221 is supplied to the negative pressure control unit 230 disposed on the liquid supply unit 220 disposed to correspond to each color. The negative pressure control unit 230 is a unit which includes different colors of negative pressure control valves. By the function of a spring member or a valve provided therein, a change in pressure loss inside the supply system (the supply system at the upstream side of the liquid ejection head 3) of the printing apparatus 1000 caused by a change in flow rate of the liquid is largely decreased. Accordingly, the negative pressure control unit 230 can stabilize a change negative pressure at the downstream side (the liquid ejection unit 300) of the negative pressure control unit within a predetermined range. As described in FIG. 2, two negative pressure control valves of different colors are built inside the negative pressure control unit 230. Two negative pressure control valves are respectively set to different control pressures. Here, the high pressure side communicates with the common supply passage 211 (see FIG. 2) inside the liquid ejection unit 300 and the low pressure side communicates with the common collection passage 212 (see FIG. 2) through the liquid supply unit 220.

The casing 80 includes a liquid ejection unit support portion 81 and an electric wiring board support portion 82 and ensures the rigidity of the liquid ejection head 3 while supporting the liquid ejection unit 300 and the electric wiring board 90. The electric wiring board support portion 82 is used to support the electric wiring board 90 and is fixed to the liquid ejection unit support portion 81 by a screw. The liquid ejection unit support portion 81 is used to correct the warpage or deformation of the liquid ejection unit 300 to ensure the relative position accuracy among the printing element boards 10. Accordingly, stripe and unevenness of a printed medium is suppressed. For that reason, it is desirable that the liquid ejection unit support portion 81 have sufficient rigidity. As a material, metal such as SUS or aluminum or ceramic such as alumina is desirable. The liquid ejection unit support portion 81 is provided with openings 83 and 84 into which a joint rubber 100 is inserted. The liquid supplied from the liquid supply unit 220 is led to a third passage member 70 constituting the liquid ejection unit 300 through the joint rubber.

The liquid ejection unit 300 includes a plurality of ejection modules 200 and a passage member 210 and a cover member 130 is attached to a face near the print medium in the liquid ejection unit 300. Here, the cover member 130 is a member having a picture frame shaped surface and provided with an elongated opening 131 as illustrated in FIG. 6 and the printing element board 10 and a sealing member 110 (see FIG. 10A to be described later) included in the ejection module 200 are exposed from the opening 131. A peripheral frame of the opening 131 serves as a contact face of a cap member that caps the liquid ejection head 3 in the print standby state. For this reason, it is desirable to form a closed space in a capping state by applying an adhesive, a sealing material, and a filling material along the periphery of the opening 131 to fill unevenness or a gap on the ejection opening face of the liquid ejection unit 300.

Next, a configuration of the passage member 210 included in the liquid ejection unit 300 will be described. As illustrated in FIG. 6, the passage member 210 is obtained by laminating a first passage member 50, a second passage member 60, and a third passage member 70 and distributes the liquid supplied from the liquid supply unit 220 to the ejection modules 200. Further, the passage member 210 is a passage member that returns the liquid re-circulated from the ejection module 200 to the liquid supply unit 220. The passage member 210 is fixed to the liquid ejection unit support portion 81 by a screw and thus the warpage or deformation of the passage member 210 is suppressed.

Figure 7:
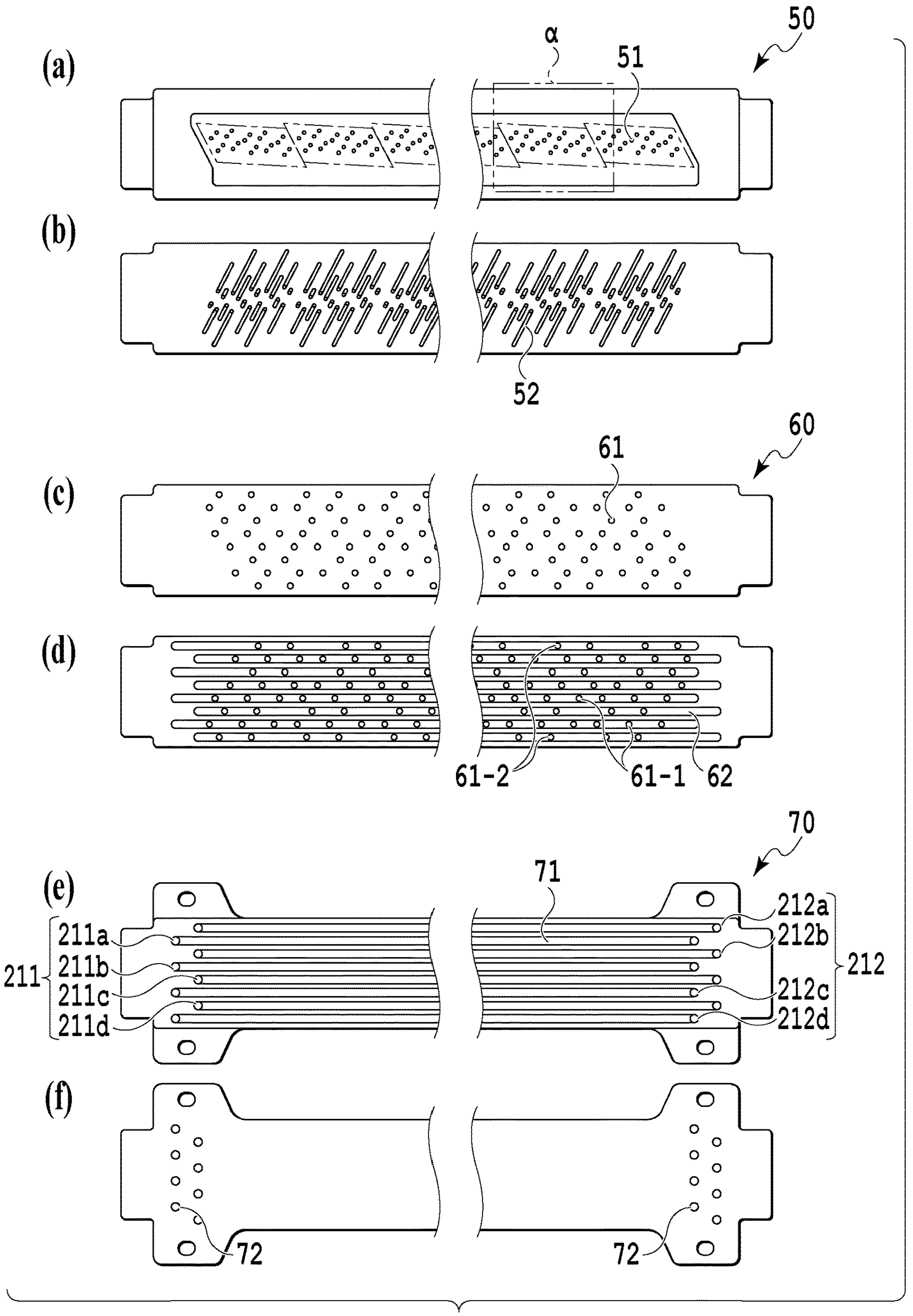
FIG. 7 is diagram illustrating front and rear faces of each of first to third passage members.

FIGS. 7(*a*) to 7(*f*) are diagrams illustrating front and rear faces of the first to third passage members. FIG. 7-(*a*) illustrates a face onto which the ejection module 200 is mounted in the first passage member 50 and FIG. 7-(*f*) illustrates a face with which the liquid ejection unit support portion 81 comes into contact in the third passage member 70. The first passage member 50 and the second passage member 60 are bonded to teach other so that the parts illustrated in FIGS. 7-(*b*) and 7-(*c*) and corresponding to the contact faces of the passage members face each other and the second passage member and the third passage member are bonded to each other so that the parts illustrated in FIGS. 7(*d*) and 7(*e*) and corresponding to the contact faces of the passage members face each other. When the second passage member 60 and the third passage member 70 are bonded to each other, eight common passages (211*a*, 211*b*, 211*c*, 211*d*, 212*a*, 212*b*, 212*c*, 212*d*) extending in the longitudinal direction of the passage member are formed by common passage grooves 62 and 71 of the passage members. Accordingly, a set of the common supply passage 211 and the common collection passage 212 is formed inside the passage member 210 to correspond to each color. The ink is supplied from the common supply passage 211 to the liquid ejection head 3 and the ink supplied to the liquid ejection head 3 is collected by the common collection passage 212. A communication opening 72 (see FIG. 7-(*f*)) of the third passage member 70 communicates with the holes of the joint rubber 100 and is fluid-connected to the liquid supply unit 220 (see FIG. 6). A bottom face of the common passage groove 62 of the second passage member 60 is provided with a plurality of communication openings 61 (a communication opening 61-1 communicating with the common supply passage 211 and a communication opening 61-2 communicating with the common collection passage 212) and communicates with one end of an individual passage groove 52 of the first passage member 50. The other end of the individual passage groove of the first passage member 50 is provided with a communication opening 51 and is fluid-connected to the ejection modules 200 through the communication opening 51. By the individual passage groove 52, the passages can be densely provided at the center side of the passage member.

It is desirable that the first to third passage members be formed of a material having corrosion resistance with respect to a liquid and having a low linear expansion coefficient. As a material, for example, a composite material (resin) obtained by adding inorganic filler such as fiber or fine silica particles to a base material such as alumina, LCP (liquid crystal polymer), PPS (polyphenyl sulfide), PSF (polysulfone), or modified PPE (polyphenylene ether) can be appropriately used. As a method of forming the passage member 210, three passage members may be laminated and adhered to one another. When a resin composite material is selected as a material, a bonding method using welding may be used.

Figure 8:
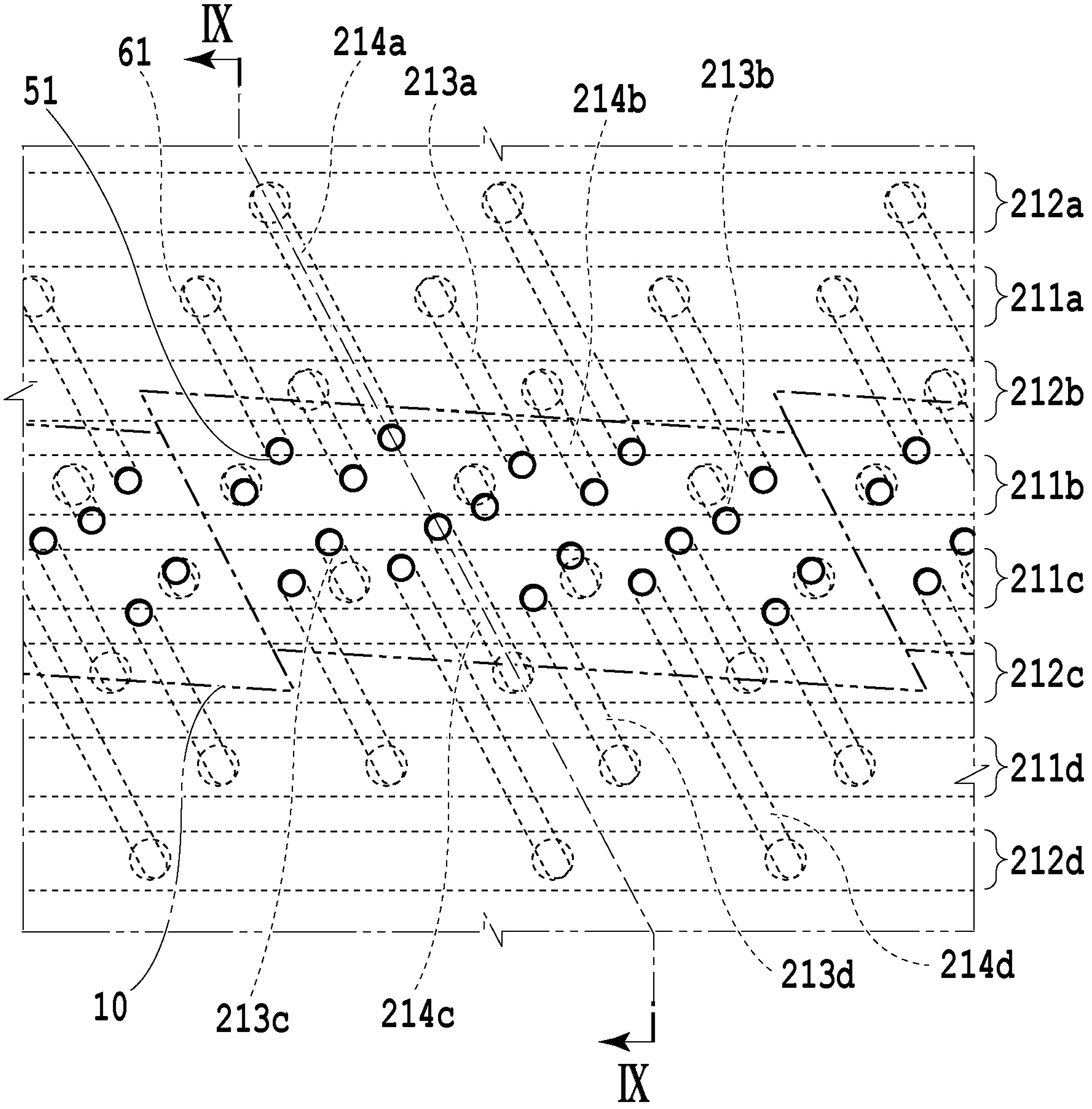
FIG. 8 is a transparent view illustrating a passage in the passage members which is formed by connecting the first to third passage members.

FIG. 8 is a partially enlarged perspective view illustrating a part α of FIG. 7-(*a*) and illustrating the passages inside the passage member 210 formed by bonding the first to third passage members to one another when viewed from a face onto which the ejection module 200 is mounted in the first passage member 50. The common supply passage 211 and the common collection passage 212 are formed such that the common supply passage 211 and the common collection passage 212 are alternately disposed from the passages of both ends. Here, a connection relation among the passages inside the passage member 210 will be described.

The passage member 210 is provided with the common supply passage 211 (211*a*, 211*b*, 211*c*, 211*d*) and the common collection passage 212 (212*a*, 212*b*, 212*c*, 212*d*) extending in the longitudinal direction of the liquid ejection head 3 and provided for each color. The individual supply passages 213 (213*a*, 213*b*, 213*c*, 213*d*) which are formed by the individual passage grooves 52 are connected to the common supply passages 211 of different colors through the communication openings 61. Further, the individual collection passages 214 (214*a*, 214*b*, 214*c*, 214*d*) formed by the individual passage grooves 52 are connected to the common collection passages 212 of different colors through the communication openings 61. With such a passage configuration, the ink can be intensively supplied to the printing element board 10 located at the center portion of the passage member from the common supply passages 211 through the individual supply passages 213. Further, the ink can be collected from the printing element board 10 to the common collection passages 212 through the individual collection passages 214.

Figure 9:
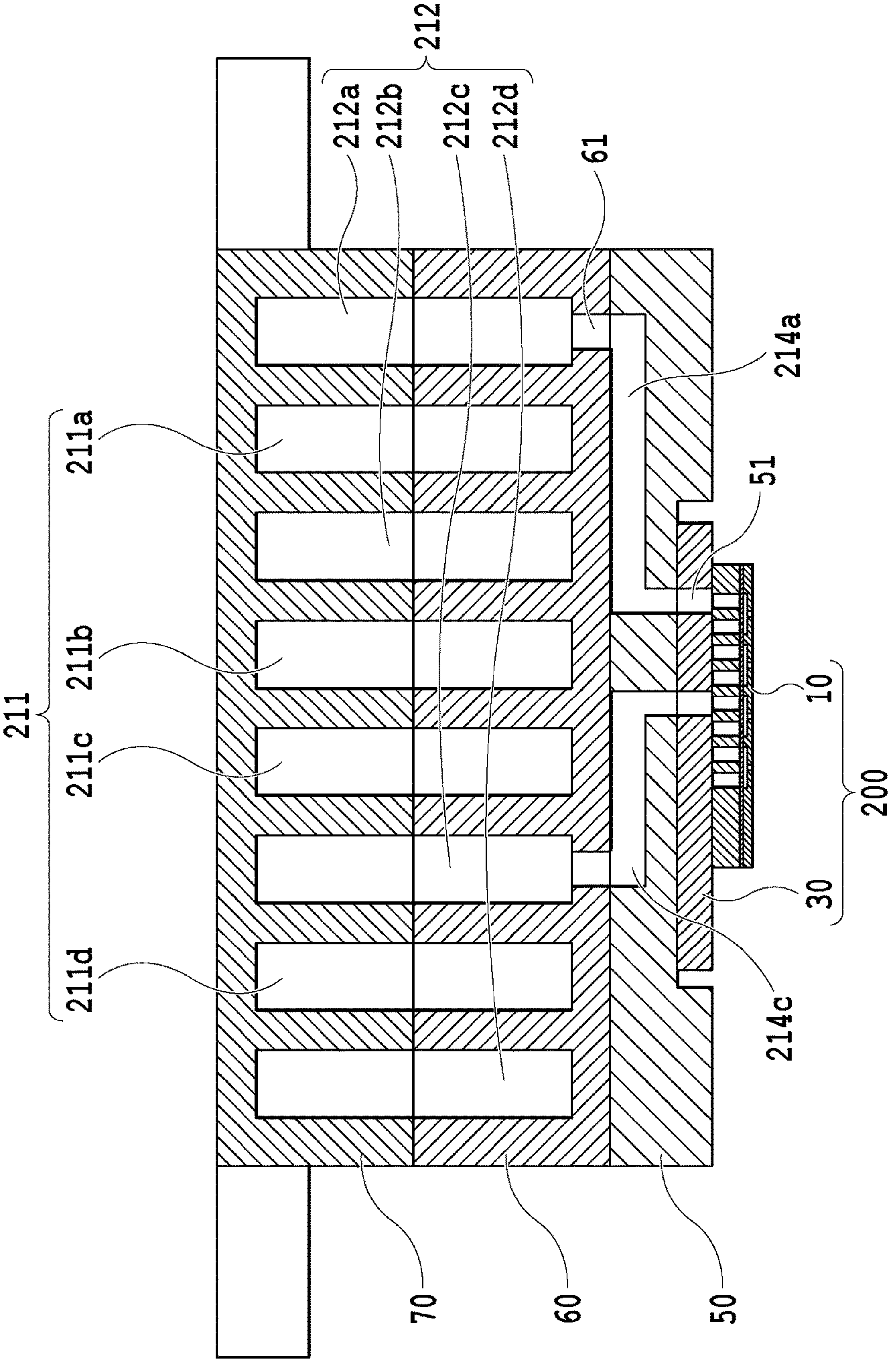
FIG. 9 is a cross-sectional view taken along a line IX-IX of FIG. 8.

FIG. 9 is a cross-sectional view taken along a line IX-IX of FIG. 8. The individual collection passage (214*a*, 214*c*) communicates with the ejection module 200 through the communication opening 51. In FIG. 9, only the individual collection passage (214*a*, 214*c*) is illustrated, but in a different cross-section, the individual supply passage 213 and the ejection module 200 communicates with each other as illustrated in FIG. 8. A support member 30 and the printing element board 10 which are included in each ejection module 200 are provided with passages which supply the ink from the first passage member 50 to a printing element 15 provided in the printing element board 10. Further, the support member 30 and the printing element board 10 are provided with passages which collect (re-circulate) a part or the entirety of the liquid supplied to the printing element 15 to the first passage member 50.

Here, the common supply passage 211 of each color is connected to the negative pressure control unit 230 (the high pressure side) of corresponding color through the liquid supply unit 220 and the common collection passage 212 is connected to the negative pressure control unit 230 (the low pressure side) through the liquid supply unit 220. By the negative pressure control unit 230, a differential pressure (a difference in pressure) is generated between the common supply passage 211 and the common collection passage 212. For this reason, as illustrated in FIGS. 8 and 9, a flow is generated in order of the common supply passage 211 of each color, the individual supply passage 213, the printing element board 10, the individual collection passage 214, and the common collection passage 212 inside the liquid ejection head of the application example having the passages connected to one another.

(Description of Ejection Module)

Figure 10A:
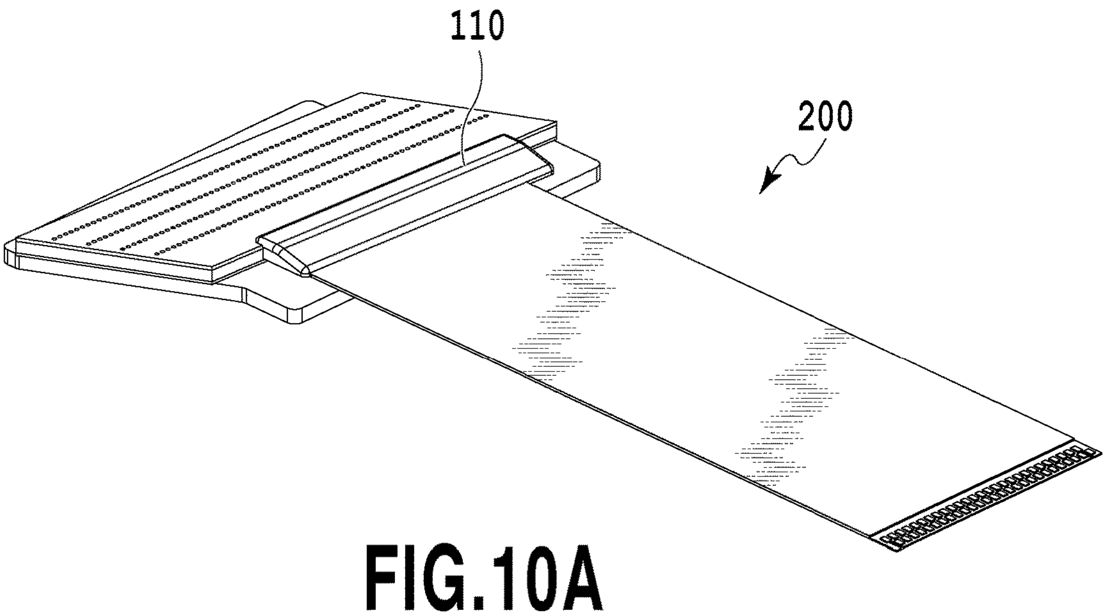
FIGS. 10A and 10B are perspective views illustrating one ejection module.
Figure 10B:
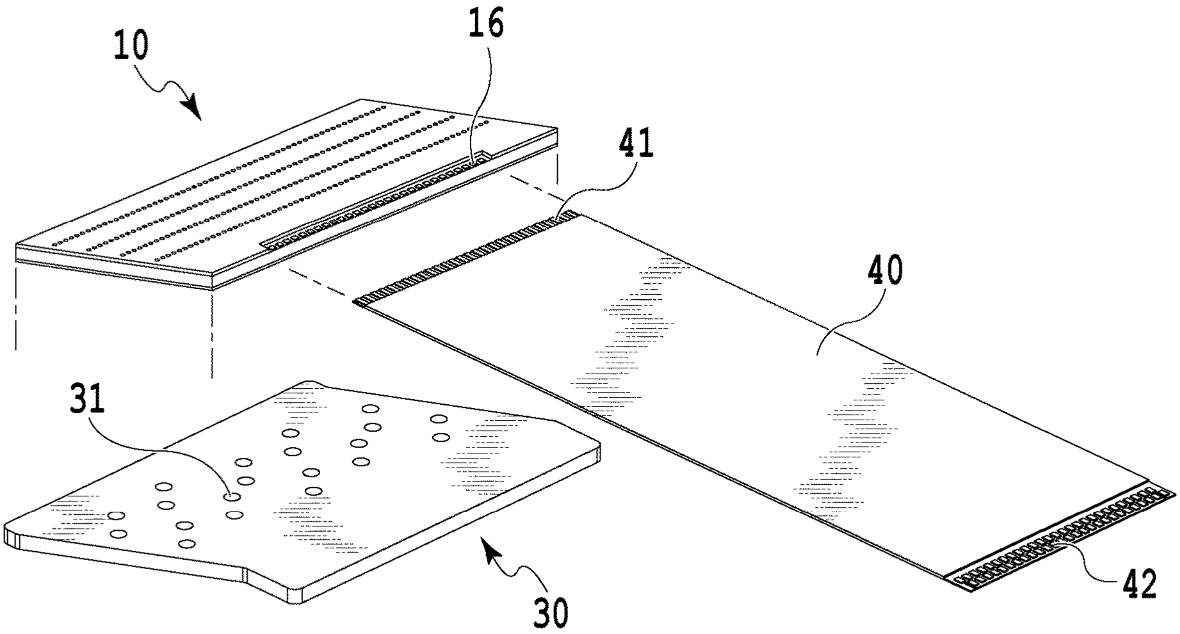

FIG. 10A is a perspective view illustrating one ejection module 200 and FIG. 10B is an exploded view thereof. As a method of manufacturing the ejection module 200, first, the printing element board 10 and the flexible circuit board 40 are adhered onto the support member 30 provided with a liquid communication opening 31. Subsequently, a terminal 16 on the printing element board 10 and a terminal 41 on the flexible circuit board 40 are electrically connected to each other by wire bonding and the wire bonded portion (the electrical connection portion) is sealed by the sealing member 110. A terminal 42 which is opposite to the printing element board 10 of the flexible circuit board 40 is electrically connected to a connection terminal 93 (see FIG. 6) of the electric wiring board 90. Since the support member 30 serves as a support body that supports the printing element board 10 and a passage member that fluid-communicates the printing element board 10 and the passage member 210 to each other, it is desirable that the support member have high flatness and sufficiently high reliability while being bonded to the printing element board. As a material, for example, alumina or resin is desirable.

(Description of Structure of Printing element Board)

Figure 11A:
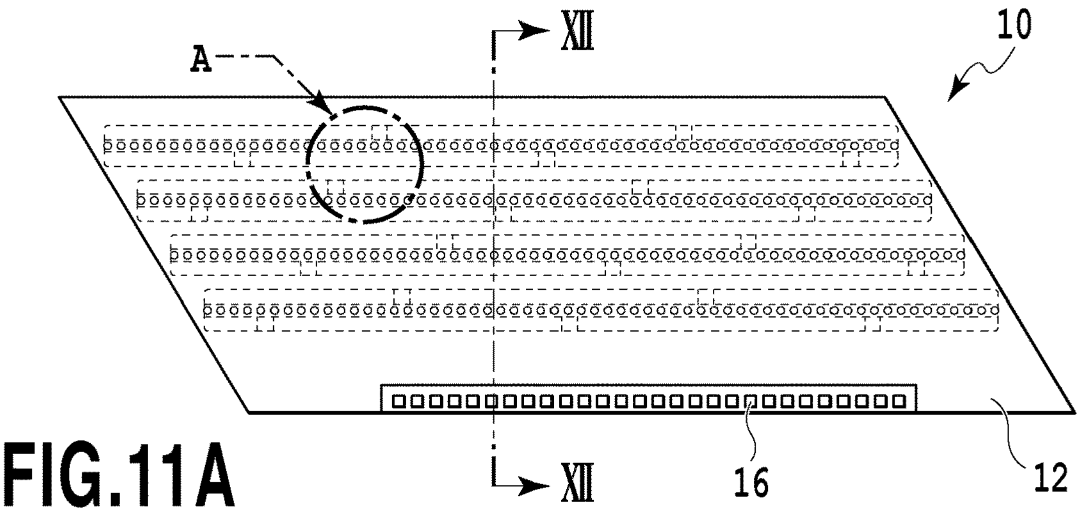
FIG. 11A is a plan view of a surface of a printing element board on which ejection openings are formed.
Figure 11B:
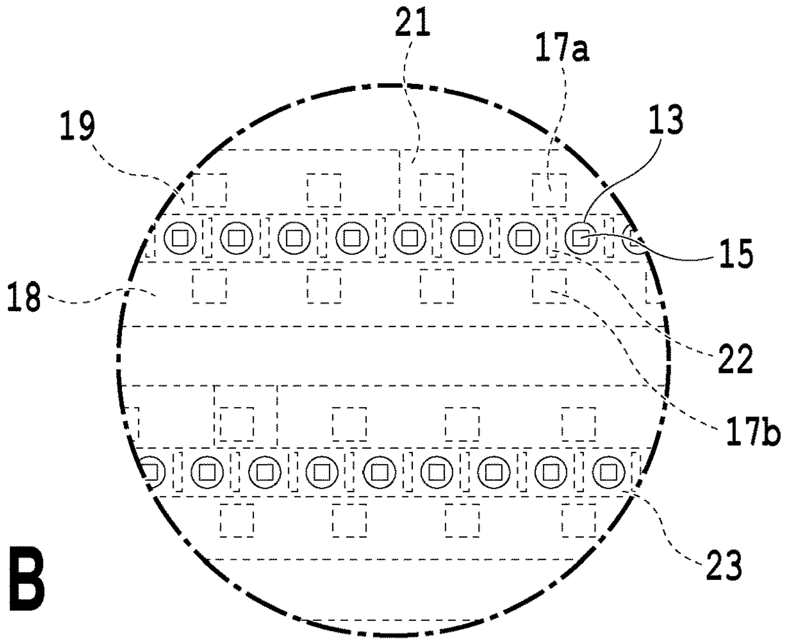
FIG. 11B is a partial enlargement view of the surface of a printing element board.
Figure 11C:
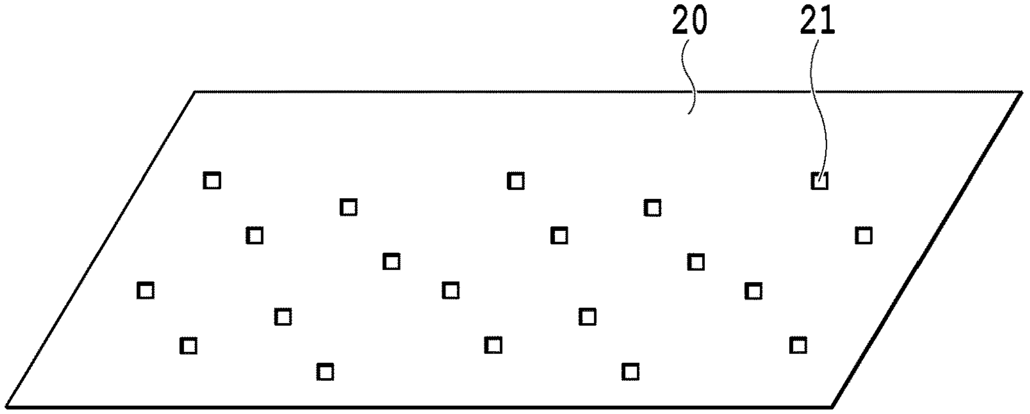
FIG. 11C is a view of opposite side of the surface of a printing element board.

FIG. 11A is a top view illustrating a face provided with an ejection opening 13 in the printing element board 10, FIG. 11B is an enlarged view of a part A of FIG. 11A, and FIG. 11C is a top view illustrating a rear face of FIG. 11A. Here, a configuration of the printing element board 10 of the application example will be described. As illustrated in FIG. 11A, an ejection opening forming member 12 of the printing element board 10 is provided with four ejection opening rows corresponding to different colors of inks. Further, the extension direction of the ejection opening rows of the ejection openings 13 will be referred to as an “ejection opening row direction”. As illustrated in FIG. 11B, the printing element 15 serving as an ejection energy generation element for ejecting the liquid by heat energy is disposed at a position corresponding to each ejection opening 13. A pressure chamber 23 provided inside the printing element 15 is defined by a partition wall 22. The printing element 15 is electrically connected to the terminal 16 by an electric wire (not illustrated) provided in the printing element board 10. Then, the printing element 15 boils the liquid while being heated on the basis of a pulse signal input from a control circuit of the printing apparatus 1000 via the electric wiring board 90 (see FIG. 6) and the flexible circuit board 40 (see FIG. 10B). The liquid is ejected from the ejection opening 13 by a foaming force caused by the boiling. As illustrated in FIG. 11B, a liquid supply path 18 extends at one side along each ejection opening row and a liquid collection path 19 extends at the other side along the ejection opening row. The liquid supply path 18 and the liquid collection path 19 are passages that extend in the ejection opening row direction provided in the printing element board 10 and communicate with the ejection opening 13 through a supply opening 17*a* and a collection opening 17*b*.

As illustrated in FIG. 11C, a sheet-shaped lid member 20 is laminated on a rear face of a face provided with the ejection opening 13 in the printing element board 10 and the lid member 20 is provided with a plurality of openings 21 communicating with the liquid supply path 18 and the liquid collection path 19. In the application example, the lid member 20 is provided with three openings 21 for each liquid supply path 18 and two openings 21 for each liquid collection path 19. As illustrated in FIG. 11B, openings 21 of the lid member 20 communicate with the communication openings 51 illustrated in FIG. 7-(*a*). It is desirable that the lid member 20 have sufficient corrosion resistance for the liquid. From the viewpoint of preventing mixed color, the opening shape and the opening position of the opening 21 need to have high accuracy. For this reason, it is desirable to form the opening 21 by using a photosensitive resin material or a silicon plate as a material of the lid member 20 through photolithography. In this way, the lid member 20 changes the pitch of the passages by the opening 21. Here, it is desirable to form the lid member by a film-shaped member with a thin thickness in consideration of pressure loss.

Figure 12:
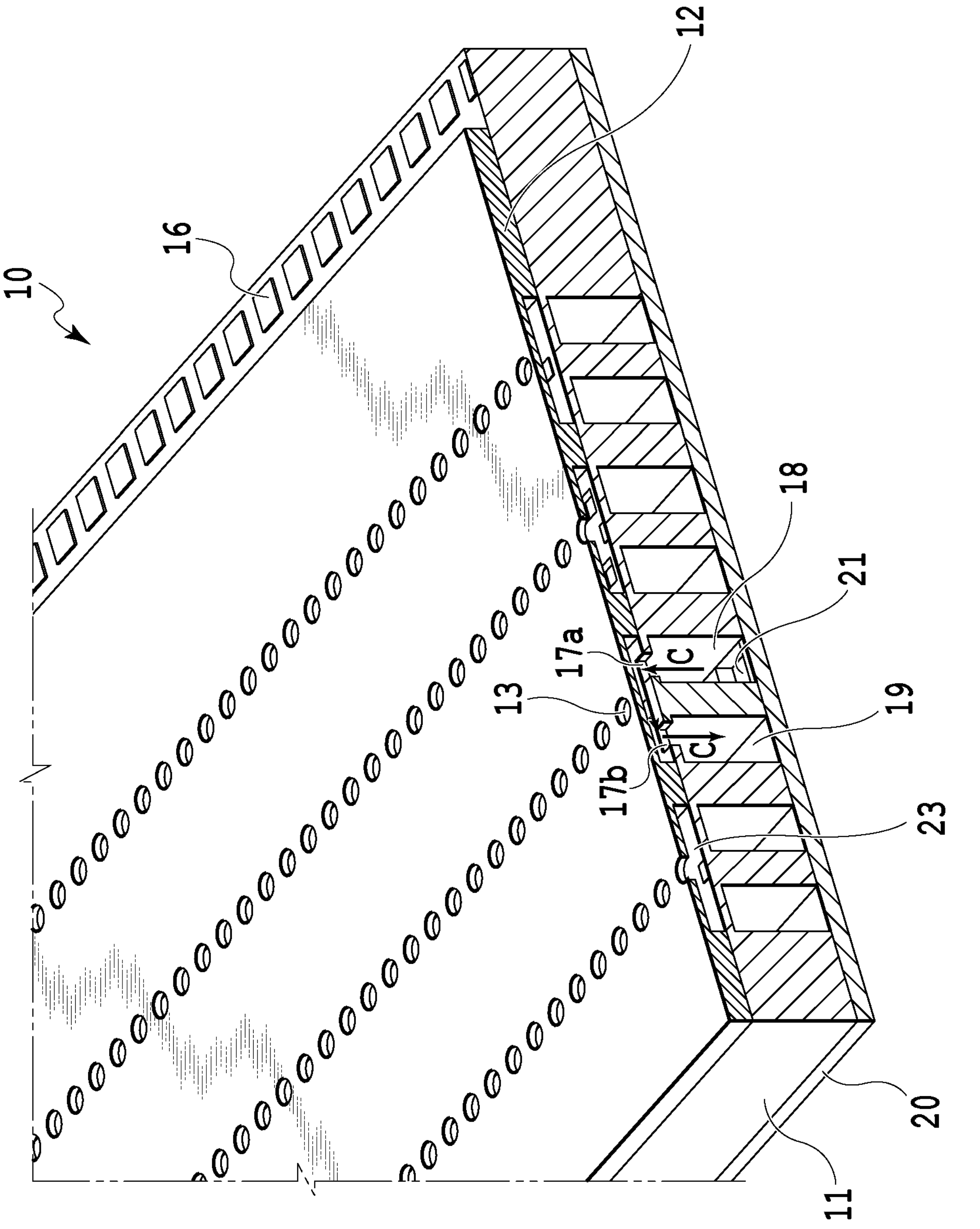
FIG. 12 is a perspective view illustrating cross-sections taken along a line XII-XII of FIG. 11A.

FIG. 12 is a perspective view illustrating cross-sections of the printing element board 10 and the lid member 20 when taken along a line XII-XII of FIG. 11A. Here, a flow of the liquid inside the printing element board 10 will be described. The lid member 20 serves as a lid that forms a part of walls of the liquid supply path 18 and the liquid collection path 19 formed in a substrate 11 of the printing element board 10. The printing element board 10 is formed by laminating the substrate 11 formed of Si and the ejection opening forming member 12 formed of photosensitive resin and the lid member 20 is bonded to a rear face of the substrate 11. One face of the substrate 11 is provided with the printing element 15 (see FIG. 11B) and a rear face thereof is provided with grooves forming the liquid supply path 18 and the liquid collection path 19 extending along the ejection opening row. The liquid supply path 18 and the liquid collection path 19 which are formed by the substrate 11 and the lid member 20 are respectively connected to the common supply passage 211 and the common collection passage 212 inside each passage member 210 and a differential pressure is generated between the liquid supply path 18 and the liquid collection path 19. When the liquid is ejected from the ejection opening 13 to print an image, the liquid inside the liquid supply path 18 provided inside the substrate 11 at the ejection opening not ejecting the liquid flows toward the liquid collection path 19 through the supply opening 17*a*, the pressure chamber 23, and the collection opening 17*b* by the differential pressure (see an arrow C of FIG. 12). By the flow, foreign materials, bubbles, and thickened ink produced by the evaporation from the ejection opening 13 in the ejection opening 13 or the pressure chamber 23 not involved with a printing operation can be collected by the liquid collection path 19. Further, the thickening of the ink of the ejection opening 13 or the pressure chamber 23 can be suppressed. The liquid which is collected to the liquid collection path 19 is collected in order of the communication opening 51 (see FIG. 7-(*a*)) inside the passage member 210, the individual collection passage 214, and the common collection passage 212 through the opening of the lid member 20 and the liquid communication opening 31 (see FIG. 10B) of the support member 30. Then, the liquid is collected from the liquid ejection head 3 to the collection path of the printing apparatus 1000. That is, the liquid supplied from the printing apparatus body to the liquid ejection head 3 flows in the following order to be supplied and collected.

First, the liquid flows from the liquid connection portion 111 of the liquid supply unit 220 into the liquid ejection head 3. Then, the liquid is sequentially supplied through the joint rubber 100, the communication opening 72 and the common passage groove 71 provided in the third passage member, the common passage groove 62 and the communication opening 61 provided in the second passage member, and the individual passage groove 52 and the communication opening 51 provided in the first passage member. Subsequently, the liquid is supplied to the pressure chamber 23 while sequentially passing through the liquid communication opening 31 provided in the support member 30, the opening 21 provided in the lid member 20, and the liquid supply path 18 and the supply opening 17*a* provided in the substrate 11. In the liquid supplied to the pressure chamber 23, the liquid which is not ejected from the ejection opening 13 sequentially flows through the collection opening 17*b* and the liquid collection path 19 provided in the substrate 11, the opening 21 provided in the lid member 20, and the liquid communication opening 31 provided in the support member 30. Subsequently, the liquid sequentially flows through the communication opening and the individual passage groove 52 provided in the first passage member, the communication opening 61 and the common passage groove 62 provided in the second passage member, the common passage groove 71 and the communication opening 72 provided in the third passage member 70, and the joint rubber 100. Then, the liquid flows from the liquid connection portion 111 provided in the liquid supply unit 220 to the outside of the liquid ejection head 3.

In the first circulation configuration illustrated in FIG. 2, the liquid which flows from the liquid connection portion 111 is supplied to the joint rubber 100 through the negative pressure control unit 230. Further, in the second circulation configuration illustrated in FIG. 3, the liquid which is collected from the pressure chamber 23 passes through the joint rubber 100 and flows from the liquid connection portion 111 to the outside of the liquid ejection head through the negative pressure control unit 230. The entire liquid which flows from one end of the common supply passage 211 of the liquid ejection unit 300 is not supplied to the pressure chamber 23 through the individual supply passage 213*a*. That is, the liquid may flow from the other end of the common supply passage 211 to the liquid supply unit 220 while not flowing into the individual supply passage 213*a* by the liquid which flows from one end of the common supply passage 211. In this way, since the path is provided so that the liquid flows therethrough without passing through the printing element board 10, the reverse flow of the circulation flow of the liquid can be suppressed even in the printing element board 10 including the large passage with a small flow resistance as in the application example. In this way, since the thickening of the liquid in the vicinity of the ejection opening or the pressure chamber 23 can be suppressed in the liquid ejection head 3 of the application example, a slippage or a non-ejection can be suppressed. As a result, a high-quality image can be printed.

(Description of Positional Relation Among Printing Element Boards)

Figure 13:
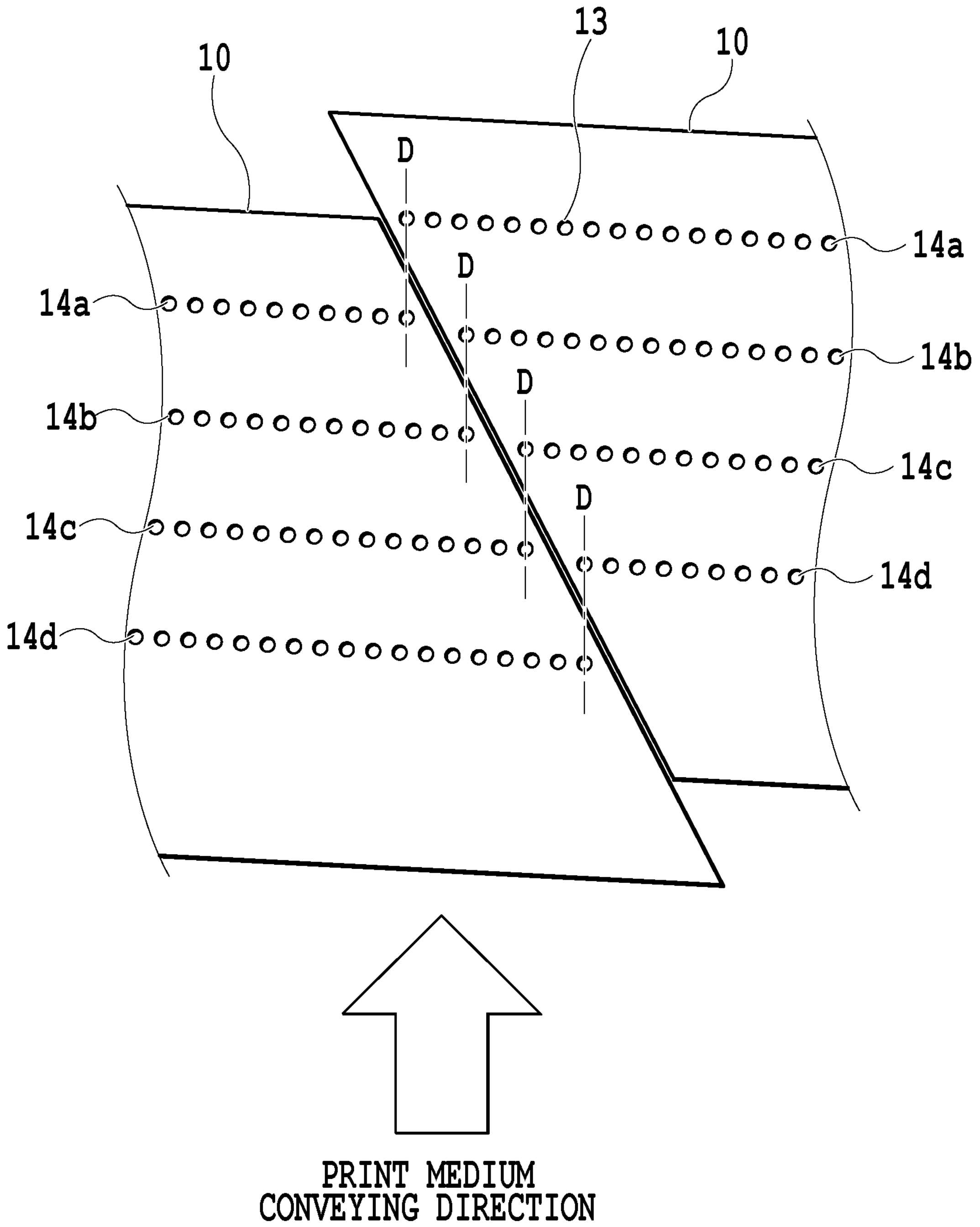
FIG. 13 is a partially enlarged plan view of an adjacent portion of adjacent two ejection modules of the printing element board.

FIG. 13 is a partially enlarged top view illustrating an adjacent portion of the printing element board in two adjacent ejection modules 200. In the application example, a substantially parallelogram printing element board is used. Ejection opening rows (14*a* to 14*d*) having the ejection openings 13 arranged in each printing element board 10 are disposed to be inclined while having a predetermined angle with respect to the longitudinal direction of the liquid ejection head 3. Then, the ejection opening row at the adjacent portion between the printing element boards 10 is formed such that at least one ejection opening overlaps in the print medium conveying direction. In FIG. 13, two ejection openings on a line D overlap each other. With such an arrangement, even when a position of the printing element board 10 is slightly deviated from a predetermined position, black streaks or missing of a print image cannot be seen by a driving control of the overlapping ejection openings. Even when the printing element boards 10 are disposed in a straight linear shape (an in-line shape) instead of a zigzag shape, black streaks or white streaks at the connection portion can be handled. Specifically, the black streaks or the white streaks at the connection portion between the printing element boards 10 can be handled while an increase in the length of the liquid ejection head 3 in the print medium conveying direction is suppressed by the configuration illustrated in FIG. 13. Further, in the application example, a principal plane of the printing element board has a parallelogram shape, but the invention is not limited thereto. For example, even when the printing element boards having a rectangular shape, a trapezoid shape, and the other shapes are used, the configuration of the invention can be desirably used.

(Description of Modified Example of Configuration of Liquid Ejection Head)

A modified example of a configuration of the liquid ejection head illustrated in FIG. 46 and FIGS. 48A to 50 will be described. A description of the same configuration and function as those of the above-described example will be omitted and only a difference will be mainly described.

Figure 46:
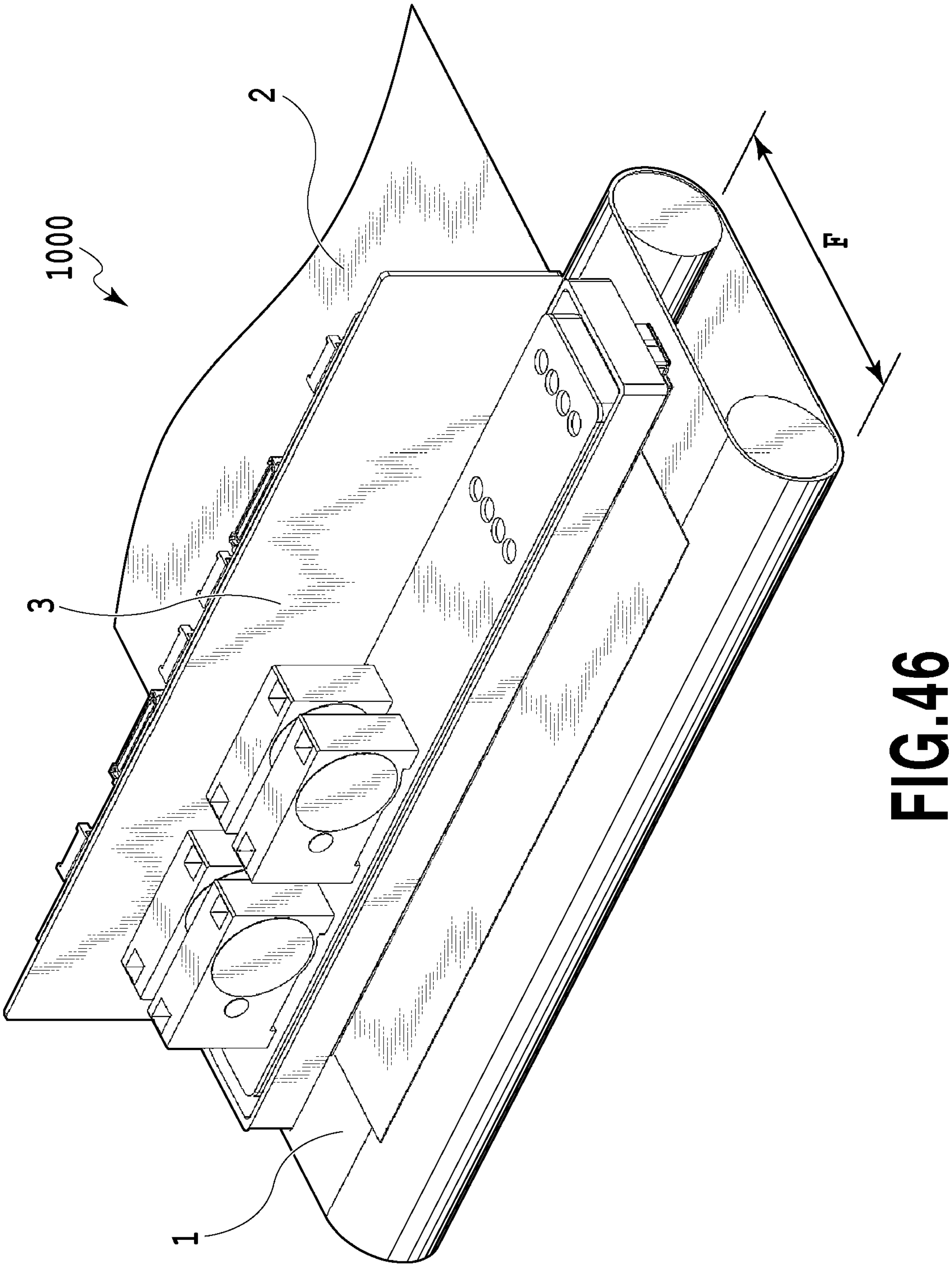
FIG. 46 is a view illustrating a printing apparatus of a first application example.
Figure 48A:
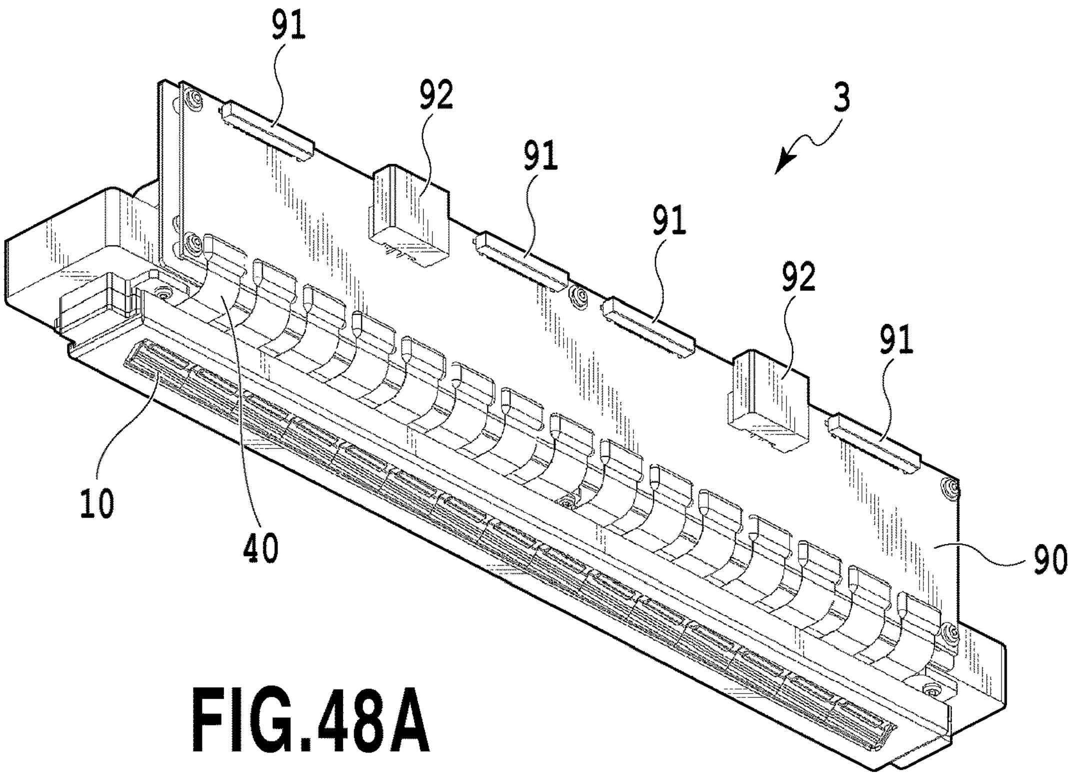
FIGS. 48A and 48B are views illustrating a modified example of a liquid ejection head according to the first application example.
Figure 48B:
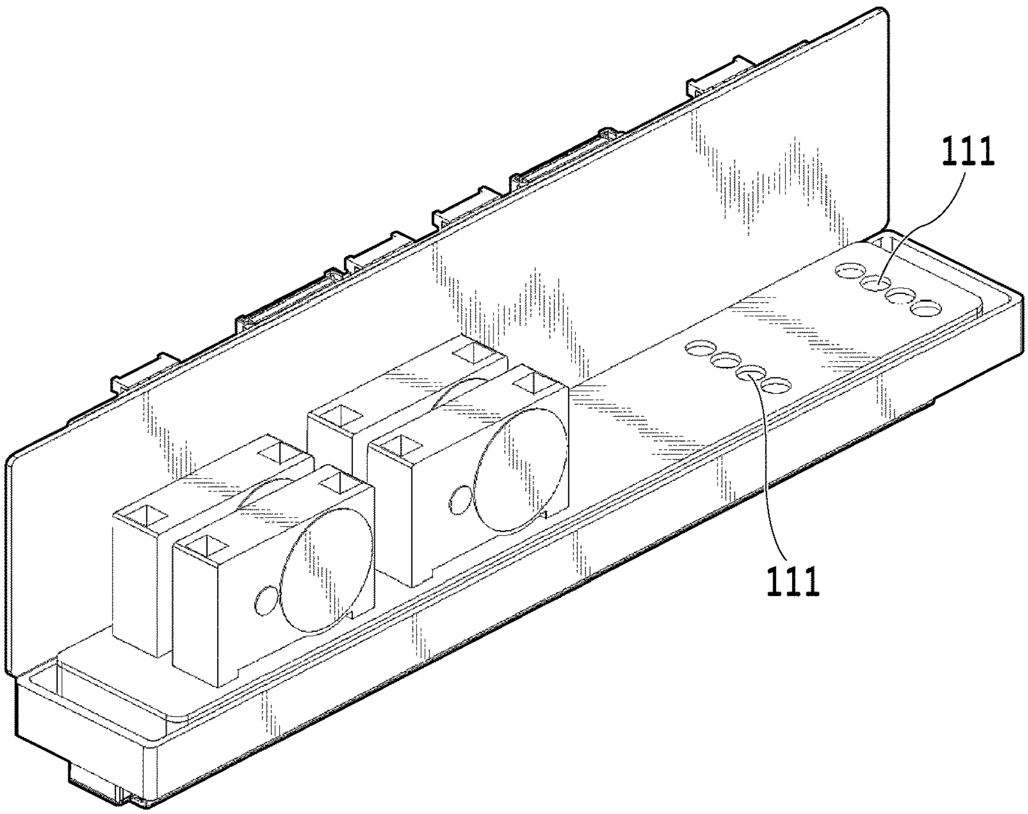
Figure 49:
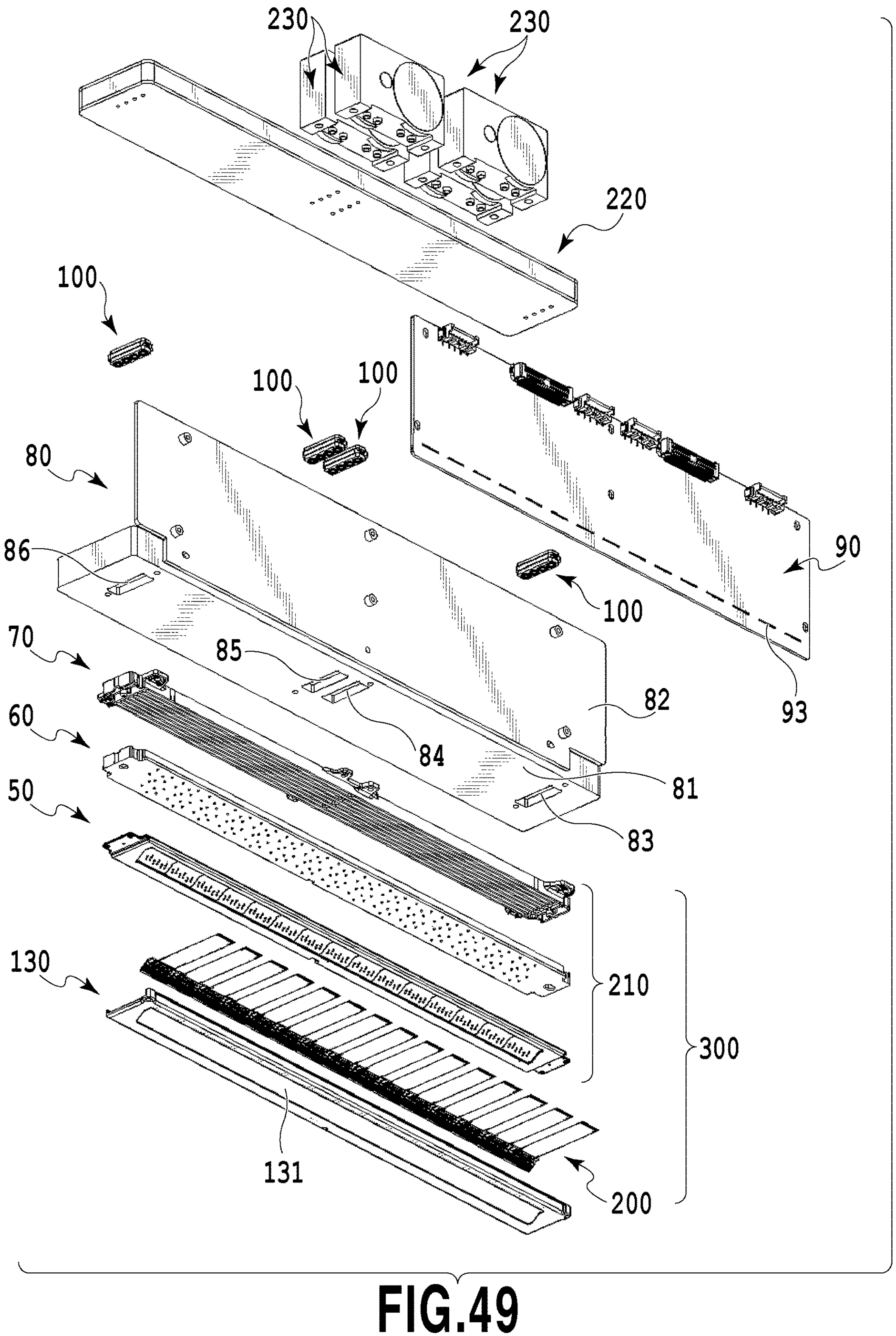
FIG. 49 is a view illustrating a modified example of a liquid ejection head according to the first application example.

In the modified example, as illustrated in FIGS. 46 and 48, the liquid connection portions 111 between the liquid ejection head 3 and the outside are intensively disposed at one end side of the liquid ejection head in the longitudinal direction. The negative pressure control units 230 are intensively disposed at the other end side of the liquid ejection head 3 (FIG. 49). The liquid supply unit 220 that belongs to the liquid ejection head 3 is configured as an elongated unit corresponding to the length of the liquid ejection head 3 and includes passages and filters 221 respectively corresponding to four liquids to be supplied. As illustrated in FIG. 49, the positions of the openings 83 to 86 provided at the liquid ejection unit support portion 81 are also located at positions different from those of the liquid ejection head 3.

Figure 32:
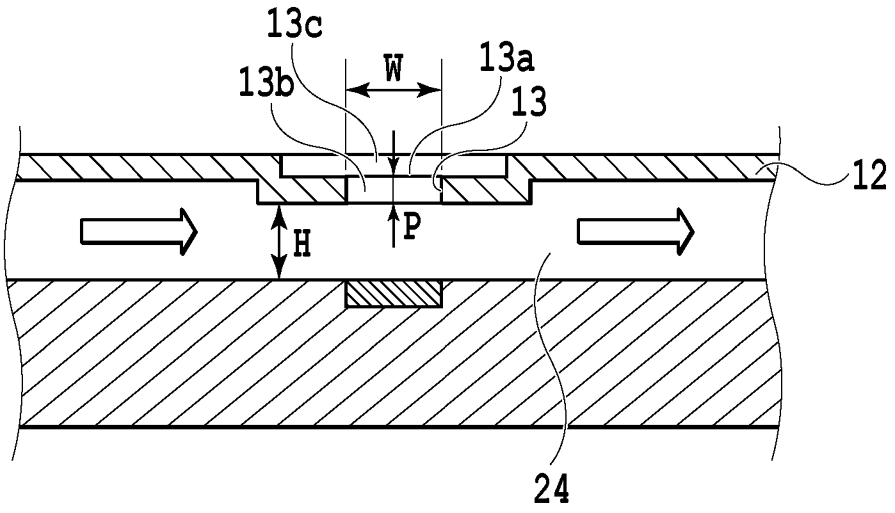
FIG. 32 is a diagram illustrating an aspect of a flow of an ink flow of ink flowing inside a liquid ejection head according to a fifth embodiment of the invention.
Figure 50:
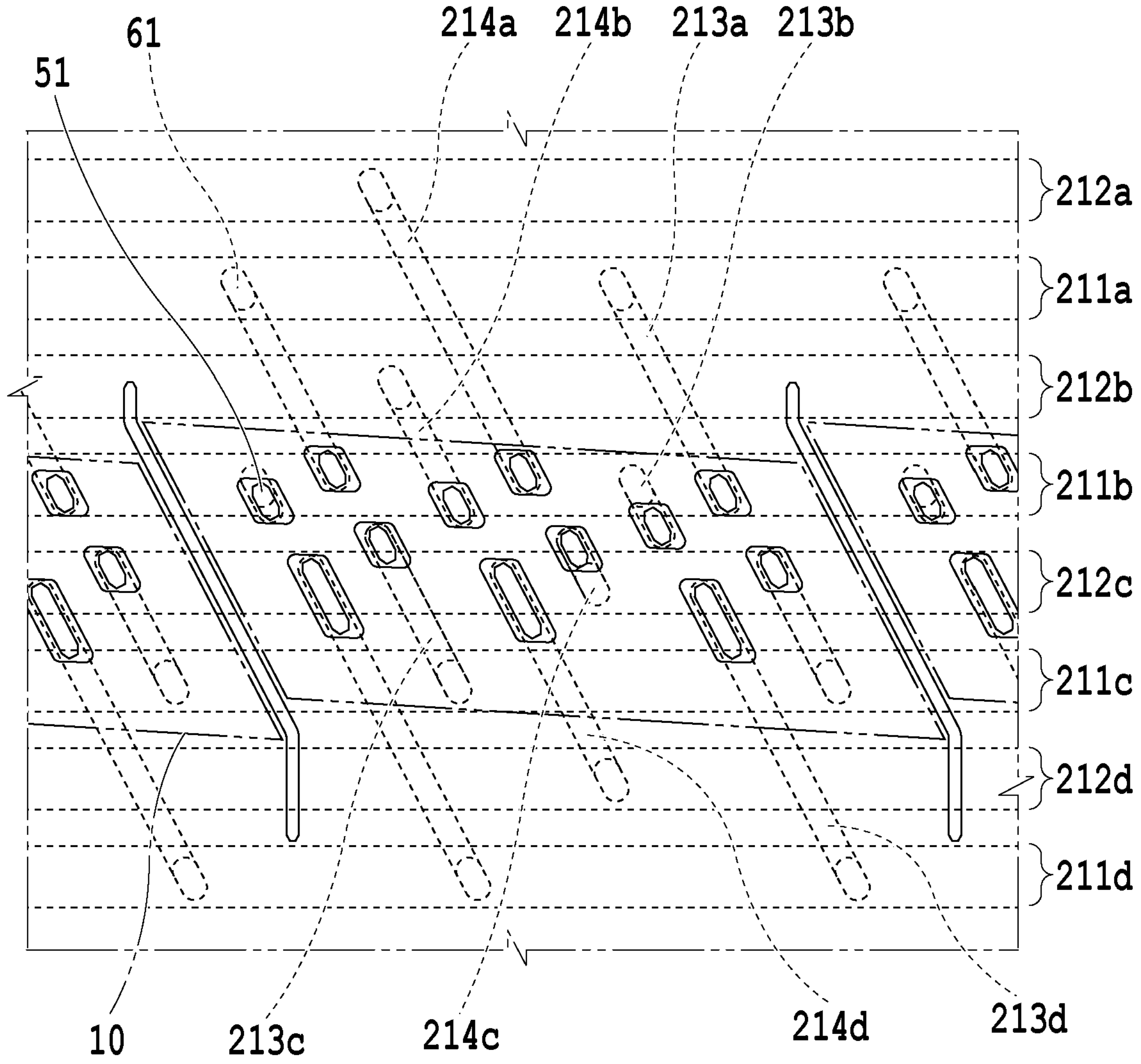
FIG. 50 is a view illustrating a modified example of a liquid ejection head according to the first application example.

FIG. 50 illustrates a lamination state of the passage members 50, 60, and 70. The printing element boards 10 are arranged linearly on the upper face of the passage member 50 which is the uppermost layer among the passage members 50, 60, and 70. As the passage which communicates with the opening 21 formed at the rear face side of each printing element board 10, two individual supply passages 213 and one individual collection passage 214 are provided for each color of the liquid. Accordingly, as the opening 21 which is formed at the lid member 20 provided at the rear face of the printing element board 10, two supply openings 21 and one collection opening 21 are provided for each color of the liquid. As illustrated in FIG. 32, the common supply passage 211 and the common collection passage 212 extending along the longitudinal direction of the liquid ejection head 3 are alternately arranged.

Second Application Example

<Ink Jet Printing Apparatus>

Next, configurations of an inkjet printing apparatus 2000 and a liquid ejection head 2003 according to a second application example of the invention, which are different from the above described first application example, will be described with reference to the drawings. In the description below, only a difference from the first application example will be described and a description of the same components as those of the first application example will be omitted.

Figure 21:
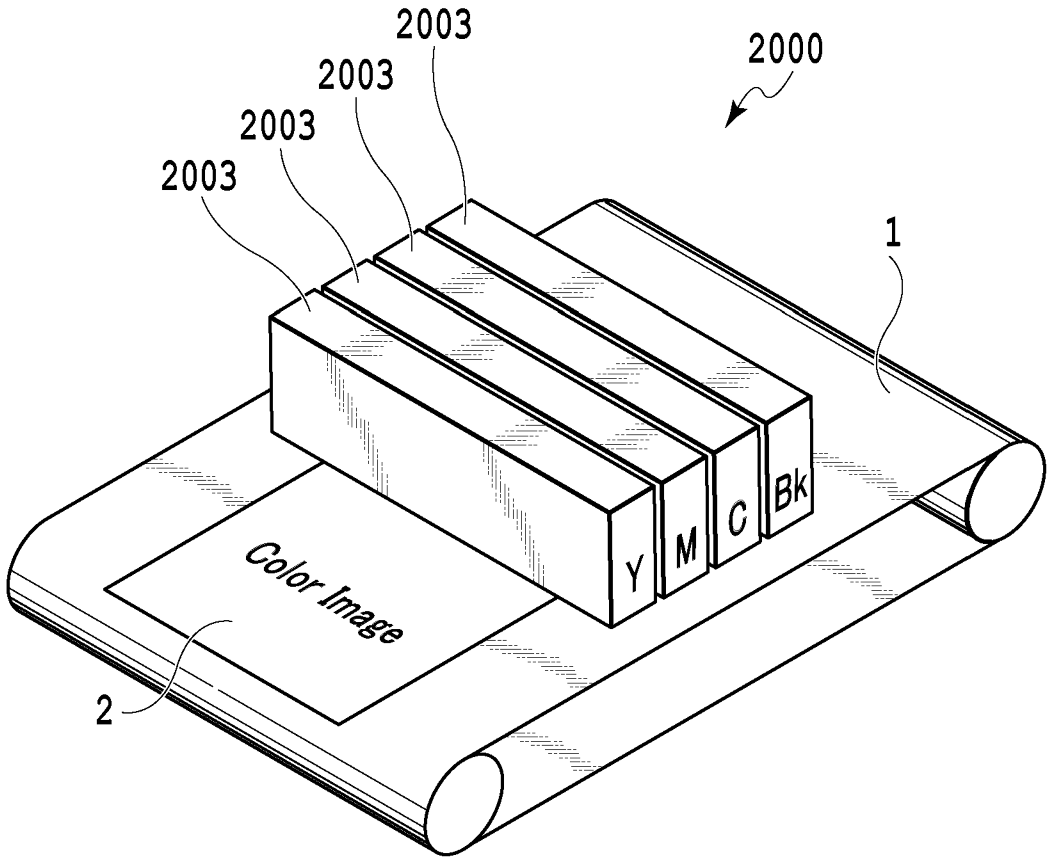
FIG. 21 is a perspective view illustrating a second application example of an inkjet printing apparatus according to the embodiment.

FIG. 21 is a diagram illustrating the inkjet printing apparatus 2000 according to the application example used to eject the liquid. The printing apparatus 2000 of the application example is different from the first application example in that a full color image is printed on the print medium by a configuration in which four monochromic liquid ejection heads 2003 respectively corresponding to the inks of cyan C, magenta M, yellow Y, and black K are disposed in parallel. In the first application example, the number of the ejection opening rows which can be used for one color is one. However, in the application example, the number of the ejection opening rows which can be used for one color is twenty. For this reason, when print data is appropriately distributed to a plurality of ejection opening rows to print an image, an image can be printed at a higher speed. Further, even when there are the ejection openings that do not eject the liquid, the liquid is ejected complementarily from the ejection openings of the other rows located at positions corresponding to the non-ejection openings in the print medium conveying direction. The reliability is improved and thus a commercial image can be appropriately printed. Similarly to the first application example, the supply system, the buffer tank 1003 (see FIGS. 2 and 3), and the main tank 1006 (see FIGS. 2 and 3) of the printing apparatus 2000 are fluid-connected to the liquid ejection heads 2003. Further, an electrical control unit which transmits power and ejection control signals to the liquid ejection head 2003 is electrically connected to the liquid ejection heads 2003.

(Description of Circulation Path)

Similarly to the first application example, the first, second and third circulation configurations illustrated in FIG. 2, FIG. 3, and FIG. 47 can be used as the liquid circulation configuration between the printing apparatus 2000 and the liquid ejection head 2003.

(Description of Structure of Liquid Ejection Head)

Figure 14A:
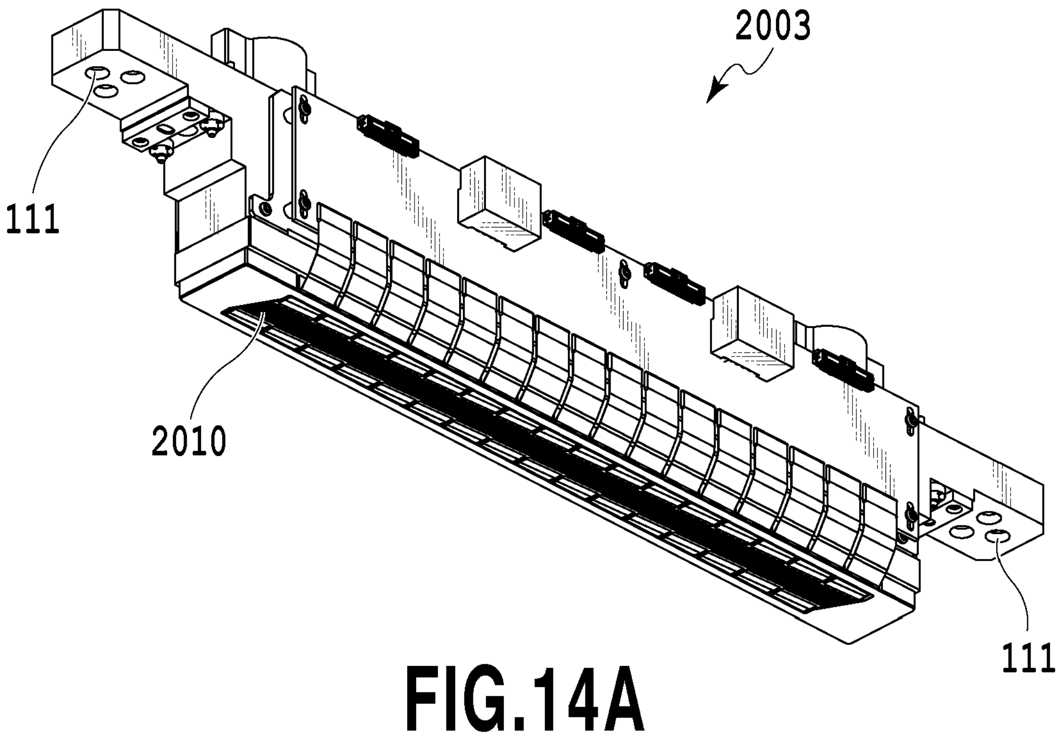
FIGS. 14A and 14B are perspective views illustrating the liquid ejection head according to another example of the embodiment.
Figure 14B:
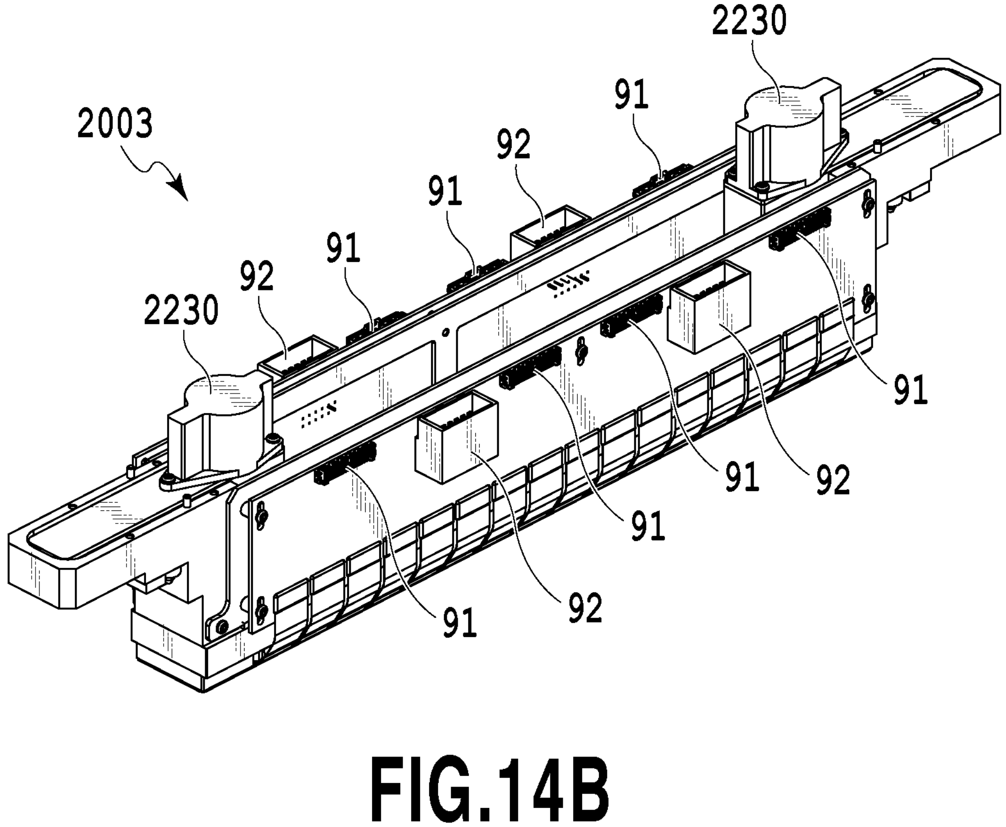

FIGS. 14A and 14B are perspective views illustrating the liquid ejection head 2003 according to the application example. Here, a structure of the liquid ejection head 2003 according to the application example will be described. The liquid ejection head 2003 is an inkjet line type (page wide type) print head which includes sixteen printing element boards 2010 arranged linearly in the longitudinal direction of the liquid ejection head 2003 and can print an image by one kind of liquid. Similarly to the first application example, the liquid ejection head 2003 includes the liquid connection portion 111, the signal input terminal 91, and the power supply terminal 92. However, since the liquid ejection head 2003 of the application example includes many ejection opening rows compared with the first application example, the signal input terminal 91 and the power supply terminal 92 are disposed at both sides of the liquid ejection head 2003. This is because a decrease in voltage or a delay in transmission of a signal caused by the wiring portion provided in the printing element board 2010 needs to be reduced.

Figure 15:
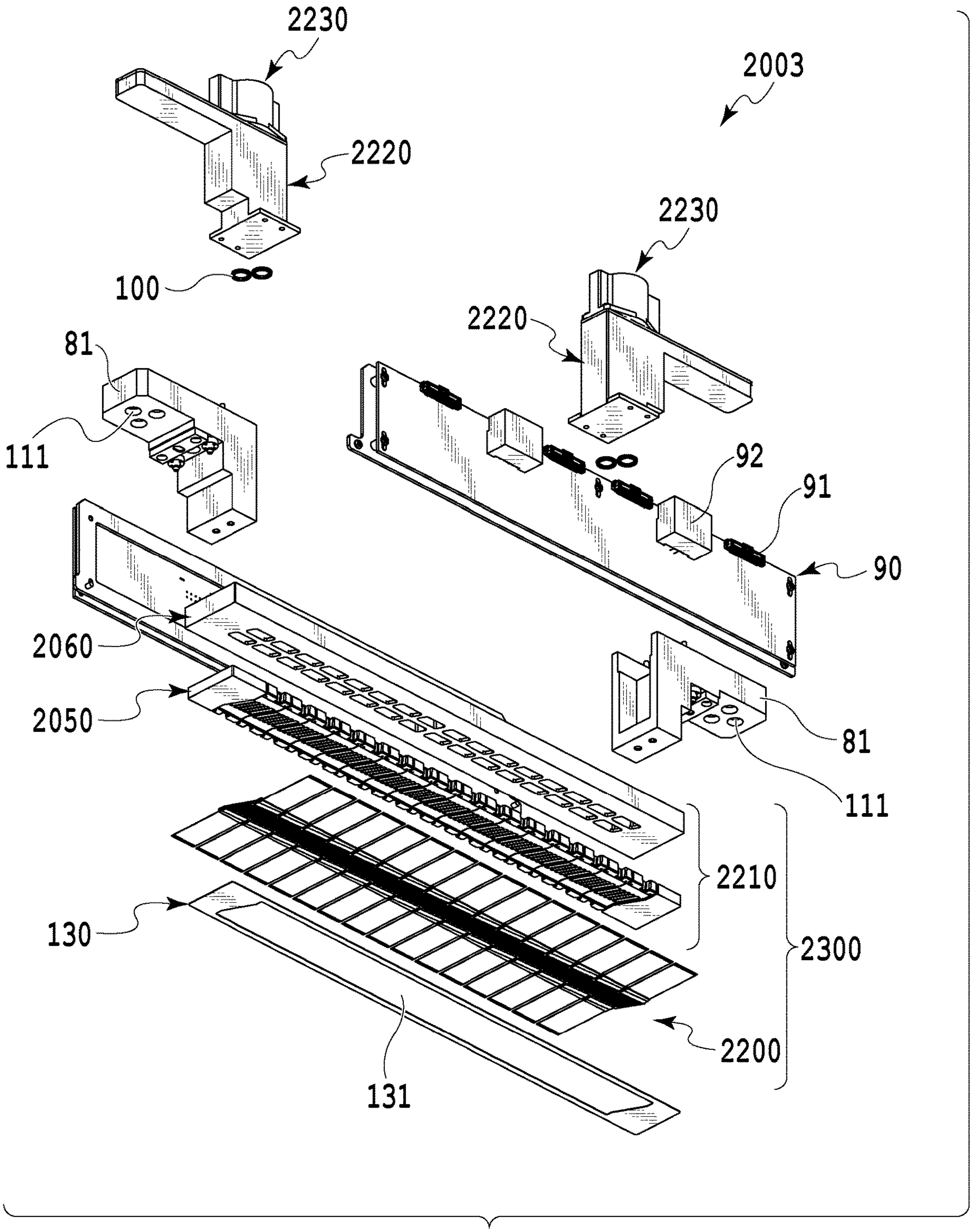
FIG. 15 is a perspective exploded view illustrating the liquid ejection head according to the other example of the embodiment.

FIG. 15 is an oblique exploded view illustrating the liquid ejection head 2003 and components or units constituting the liquid ejection head 2003 according to the functions thereof. The function of each of units and members or the liquid flow sequence inside the liquid ejection head is basically similar to that of the first application example, but the function of guaranteeing the rigidity of the liquid ejection head is different. In the first application example, the rigidity of the liquid ejection head is mainly guaranteed by the liquid ejection unit support portion 81, but in the liquid ejection head 2003 of the second application example, the rigidity of the liquid ejection head is guaranteed by a second passage member 2060 included in a liquid ejection unit 2300. The liquid ejection unit support portion 81 of the application example is connected to both ends of the second passage member 2060 and the liquid ejection unit 2300 is mechanically connected to a carriage of the printing apparatus 2000 to position the liquid ejection head 2003. The electric wiring board 90 and a liquid supply unit 2220 including a negative pressure control unit 2230 are connected to the liquid ejection unit support portion 81. Each of two liquid supply units 2220 includes a filter (not illustrated) built therein.

Two negative pressure control units 2230 are set to control a pressure at different and relatively high and low negative pressures. Further, as in FIGS. 14B and 15, when the negative pressure control units 2230 at the high pressure side and the low pressure side are provided at both ends of the liquid ejection head 2003, the flows of the liquid in the common supply passage and the common collection passage extending in the longitudinal direction of the liquid ejection head 2003 face each other. In such a configuration, a heat exchange between the common supply passage and the common collection passage is promoted and thus a difference in temperature inside two common passages is reduced. Accordingly, a difference in temperature of the printing element boards 2010 provided along the common passage is reduced. As a result, there is an advantage that unevenness in printing is not easily caused by a difference in temperature.

Next, a detailed configuration of a passage member 2210 of the liquid ejection unit 2300 will be described. As illustrated in FIG. 15, the passage member 2210 is obtained by laminating a first passage member 2050 and a second passage member 2060 and distributes the liquid supplied from the liquid supply unit 2220 to ejection modules 2200. The passage member 2210 serves as a passage member that returns the liquid re-circulated from the ejection module 2200 to the liquid supply unit 2220. The second passage member 2060 of the passage member 2210 is a passage member having a common supply passage and a common collection passage formed therein and improving the rigidity of the liquid ejection head 2003. For this reason, it is desirable that a material of the second passage member 2060 have sufficient corrosion resistance for the liquid and high mechanical strength. Specifically, SUS, Ti, or alumina can be used.

Figure 16:
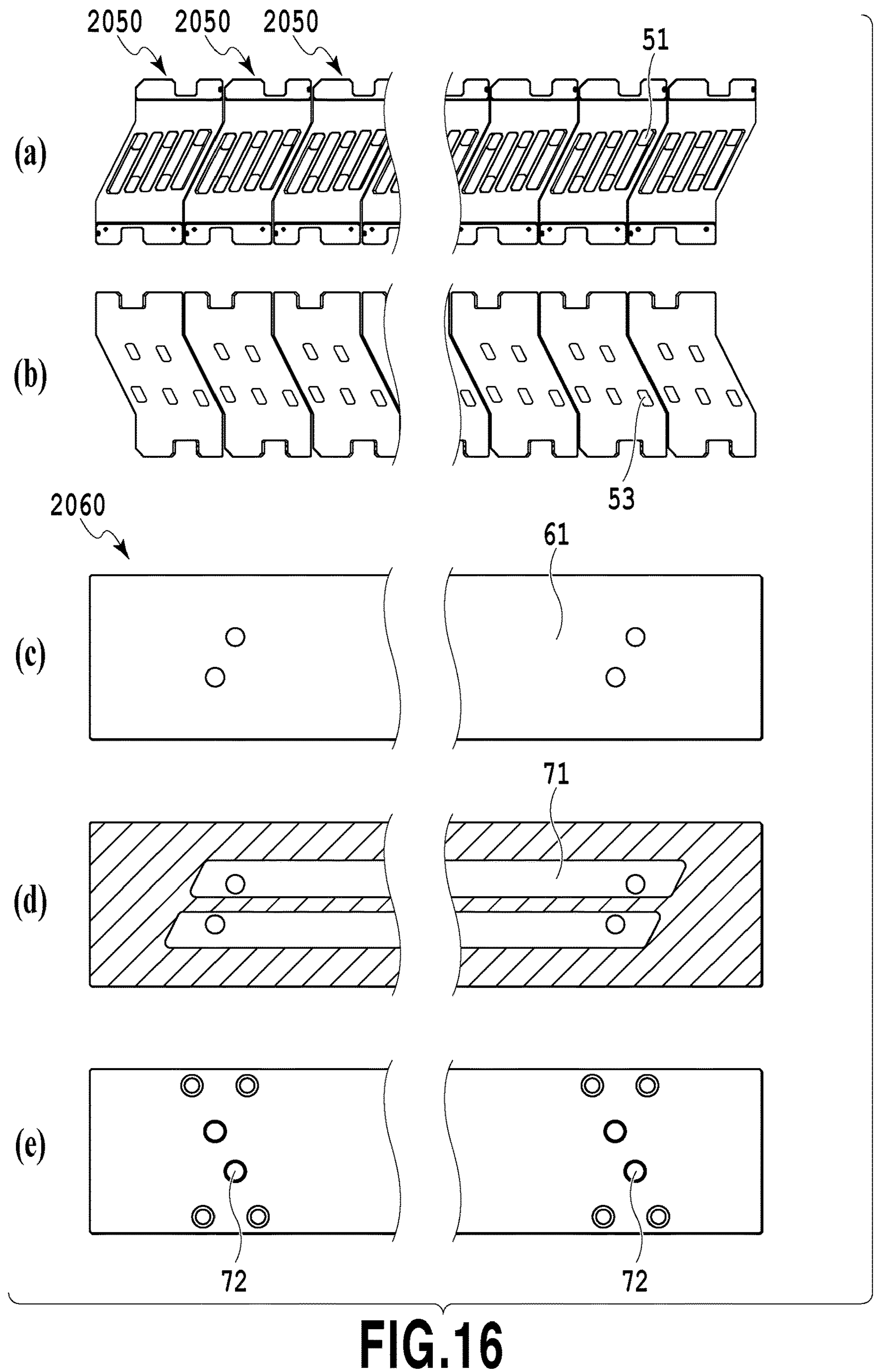
FIG. 16 is a diagram illustrating passage members making up the liquid ejection head according to the other example of the embodiment.

FIG. 16-(*a*) shows a diagram illustrating a face onto which the ejection module 2200 is mounted in the first passage member 2050 and FIG. 16-(*b*) shows a diagram illustrating a rear face thereof and a face contacting the second passage member 2060. Differently from the first application example, the first passage member 2050 of the application example has a configuration in which a plurality of members are disposed adjacently to respectively correspond to the ejection modules 2200. By employing such a split structure, a plurality of modules can be arranged to correspond to a length of the liquid ejection head 2003.

Accordingly, this structure can be appropriately used particularly in a relatively long liquid ejection head corresponding to, for example, a sheet having a size of B2 or more. As illustrated in FIG. 16-(*a*), the communication opening 51 of the first passage member 2050 fluid-communicates with the ejection module 2200. As illustrated in FIG. 16-(*b*), the individual communication opening 53 of the first passage member 2050 fluid-communicates with the communication opening 61 of the second passage member 2060. FIG. 16-(*c*) illustrates a contact face of the second passage member 60 with respect to the first passage member 2050, FIG. 16-(*d*) illustrates a cross-section of a center portion of the second passage member 60 in the thickness direction, and FIG. 16-(*e*) shows a diagram illustrating a contact face of the second passage member 2060 with respect to the liquid supply unit 2220. The function of the communication opening or the passage of the second passage member 2060 is similar to each color of the first application example. The common passage groove 71 of the second passage member 2060 is formed such that one side thereof is a common supply passage 2211 illustrated in FIG. 17 and the other side thereof is a common collection passage 2212. These passages are respectively provided along the longitudinal direction of the liquid ejection head 2003 so that the liquid is supplied from one end thereof to the other end thereof. The application example is different from the first application example in that the liquid flow directions in the common supply passage 2211 and the common collection passage 2212 are opposite to each other.

Figure 17:
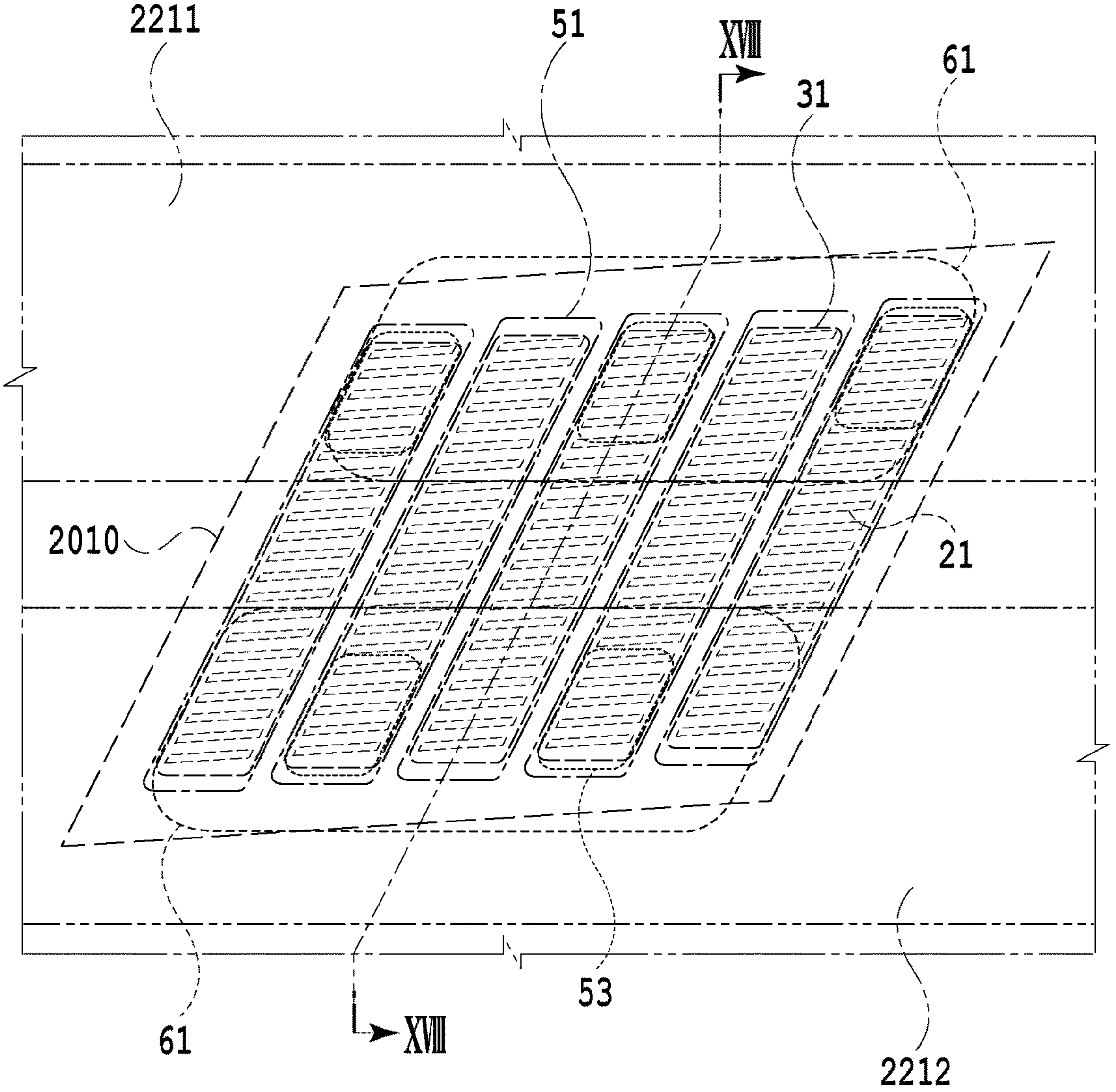
FIG. 17 is a transparent view illustrating a liquid connection relation between the printing element board and the passage member in the liquid ejection head according to other example of the embodiment.

FIG. 17 is a perspective view illustrating a liquid connection relation between the printing element board 2010 and the passage member 2210. A pair of the common supply passage 2211 and the common collection passage 2212 extending in the longitudinal direction of the liquid ejection head 2003 is provided inside the passage member 2210. The communication opening 61 of the second passage member 2060 is connected to the individual communication opening 53 of the first passage member 2050 so that both positions match each other. The liquid supply passage communicating with the communication opening 51 of the first passage member 2050 through the communication opening 61 from the common supply passage 2211 of the second passage member 2060 is formed. Similarly, the liquid the supply path communicating with the communication opening 51 of the first passage member 2050 through the common collection passage 2212 from the communication opening 72 of the second passage member 2060 is also formed.

Figure 18:
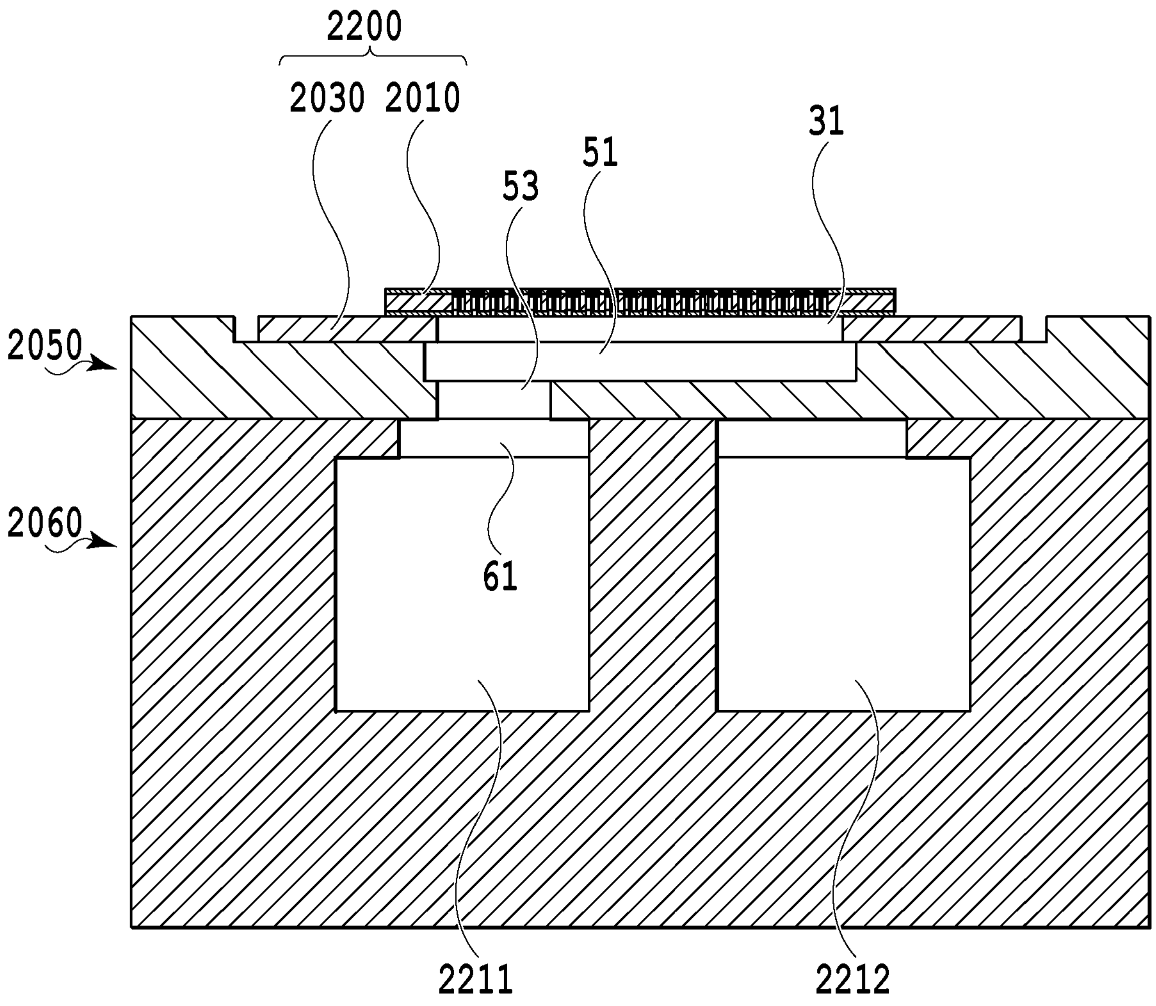
FIG. 18 is a cross-sectional view taken along a line XVIII-XVIII of FIG. 17.

FIG. 18 is a cross-sectional view taken along a line XVIII-XVIII of FIG. 17. The common supply passage 2211 is connected to the ejection module 2200 through the communication opening 61, the individual communication opening 53, and the communication opening 51. Although not illustrated in FIG. 18, it is obvious that the common collection passage 2212 is connected to the ejection module 2200 by the same path in a different cross-section in FIG. 17. Similarly to the first application example, each of the ejection module 2200 and the printing element board 2010 is provided with a passage communicating with each ejection opening and thus a part or the entirety of the supplied liquid can be re-circulated while passing through the ejection opening that does not perform the ejection operation. Further, similarly to the first application example, the common supply passage 2211 is connected to the negative pressure control unit 2230 (the high pressure side) and the common collection passage 2212 is connected to the negative pressure control unit 2230 (the low pressure side) through the liquid supply unit 2220. Thus, a flow is formed so that the liquid flows from the common supply passage 2211 to the common collection passage 2212 through the pressure chamber of the printing element board 2010 by the differential pressure.

(Description of Ejection Module)

Figure 19A:
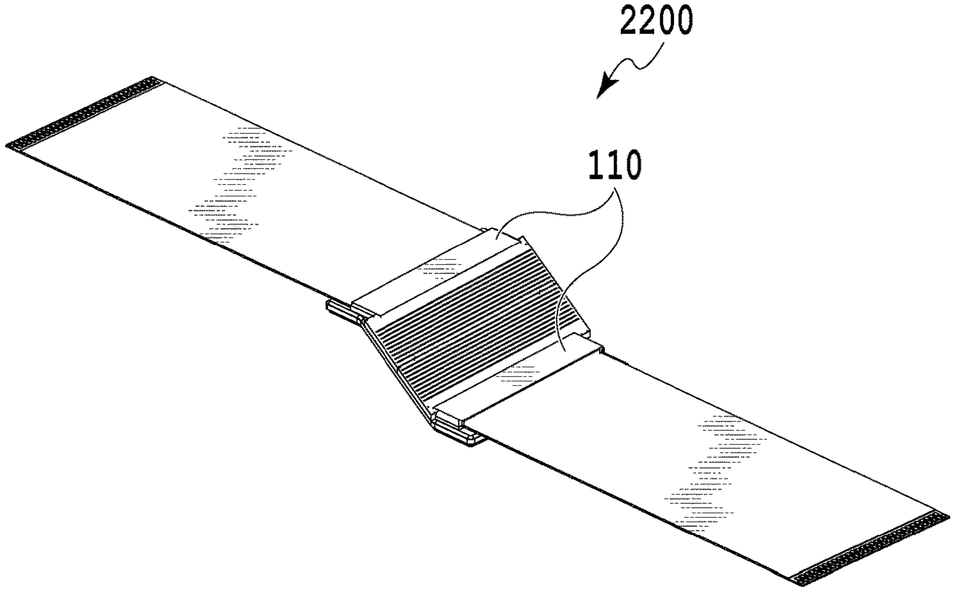
FIGS. 19A and 19B are a perspective view and an exploded view respectively illustrating ejection modules of the liquid ejection head according to other example of the embodiment.
Figure 19B:
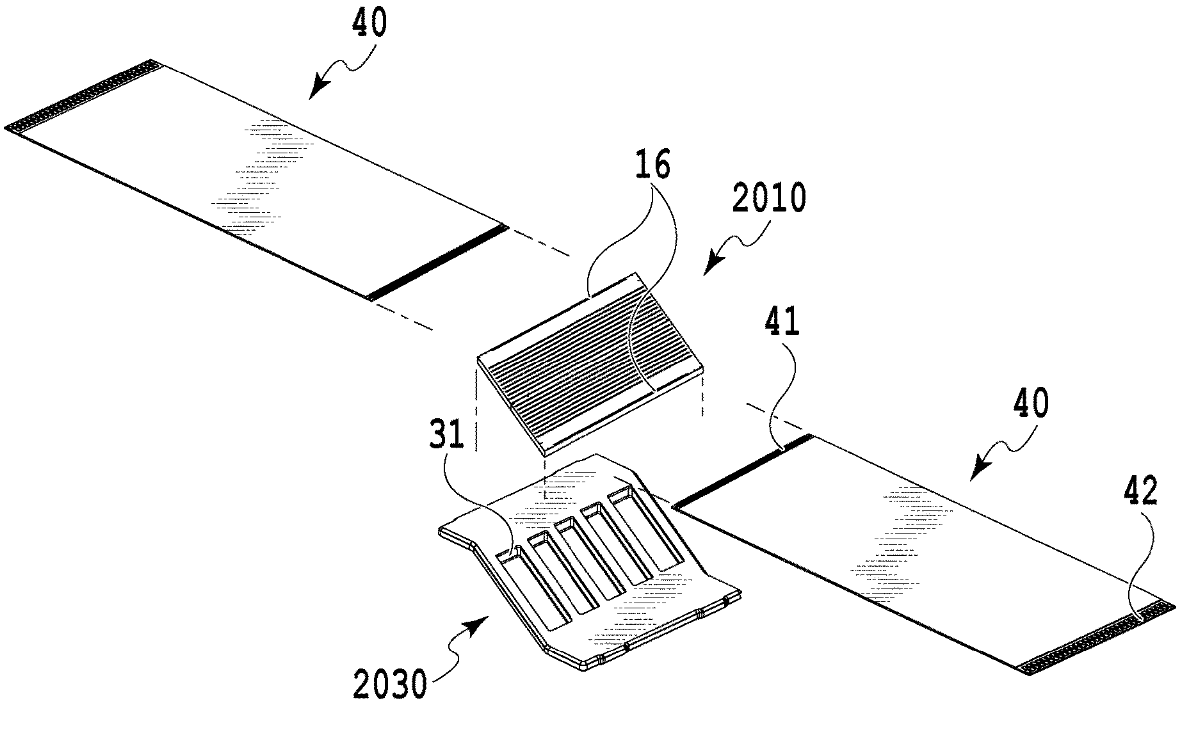

FIG. 19A is a perspective view illustrating one ejection module 2200 and FIG. 19B is an exploded view thereof. A difference from the first application example is that the terminals 16 are respectively disposed at both sides (the long side portions of the printing element board 2010) in the ejection opening row directions of the printing element board 2010. Accordingly, two flexible circuit boards 40 electrically connected to the printing element board 2010 are disposed for each printing element board 2010. Since the number of the ejection opening rows provided in the printing element board 2010 is twenty, the ejection opening rows are more than eight ejection opening rows of the first application example. Here, since a maximal distance from the terminal 16 to the printing element is shortened, a decrease in voltage or a delay of a signal generated in the wiring portion inside the printing element board 2010 is reduced. Further, the liquid communication opening 31 of the support member 2030 is opened along the entire ejection opening row provided in the printing element board 2010. The other configurations are similar to those of the first application example.

(Description of Structure of Printing element Board)

Figure 20:
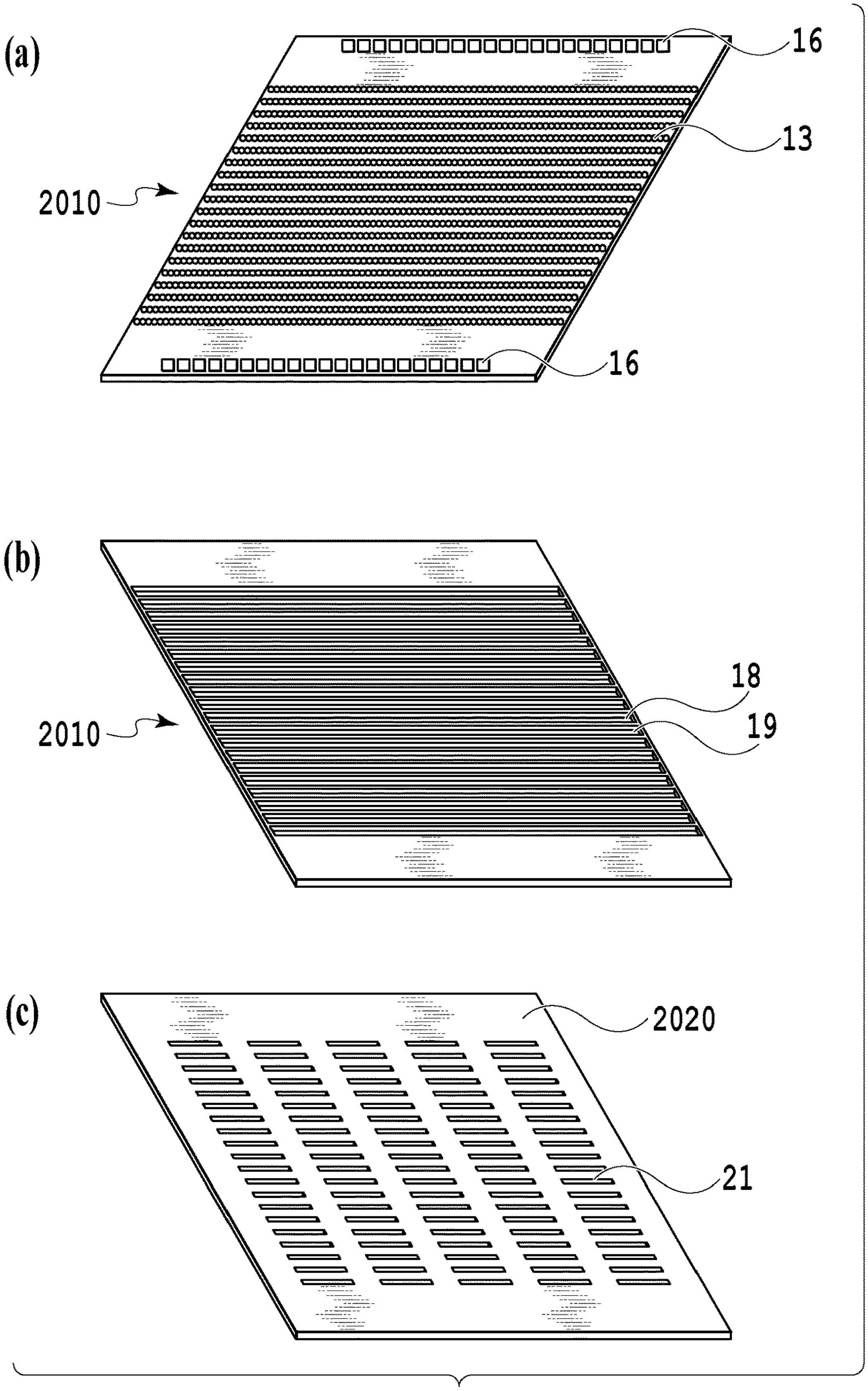
FIG. 20 is a schematic diagram illustrating a surface of the printing element board on which ejection openings are arranged, a surface of the printing element board in a condition that a cover plate is removed from an opposite side of the printing element board, and an opposite side surface to the surface on which ejection openings are arranged.

FIG. 20-(*a*) shows a schematic diagram illustrating a face on which the ejection opening 13 is disposed in the printing element board 2010 and FIG. 20-(*c*) shows a schematic diagram illustrating a rear face of the face of FIG. 20-(*a*). FIG. 20-(*b*) shows a schematic diagram illustrating a face of the printing element board 2010 when a cover plate 2020 provided in the rear face of the printing element board 2010 in FIG. 20-(*c*) is removed. As illustrated in FIG. 20-(*b*), the liquid supply path 18 and the liquid collection path 19 are alternately provided along the ejection opening row direction at the rear face of the printing element board 2010. The number of the ejection opening rows is larger than that of the first application example. However, a basic difference from the first application example is that the terminal 16 is disposed at both sides of the printing element board in the ejection opening row direction as described above. A basic configuration is similar to the first application example in that a pair of the liquid supply path 18 and the liquid collection path 19 is provided in each ejection opening row and the cover plate 2020 is provided with the opening 21 communicating with the liquid communication opening 31 of the support member 2030.

Third Application Example

<Ink Jet Printing Apparatus>

Configurations of the inkjet printing apparatus 1000 and the liquid ejection head 3 according to a third application example of the present invention will be described. The liquid ejection head of the third application example is of a page wide type in which an image is printed on a print medium of a B2 size through one scan. Since the third application example is similar to the second application example in many respects, only difference from the second application example will be mainly described in the description below and a description of the same configuration as that of the second application example will be omitted.

Figure 51:
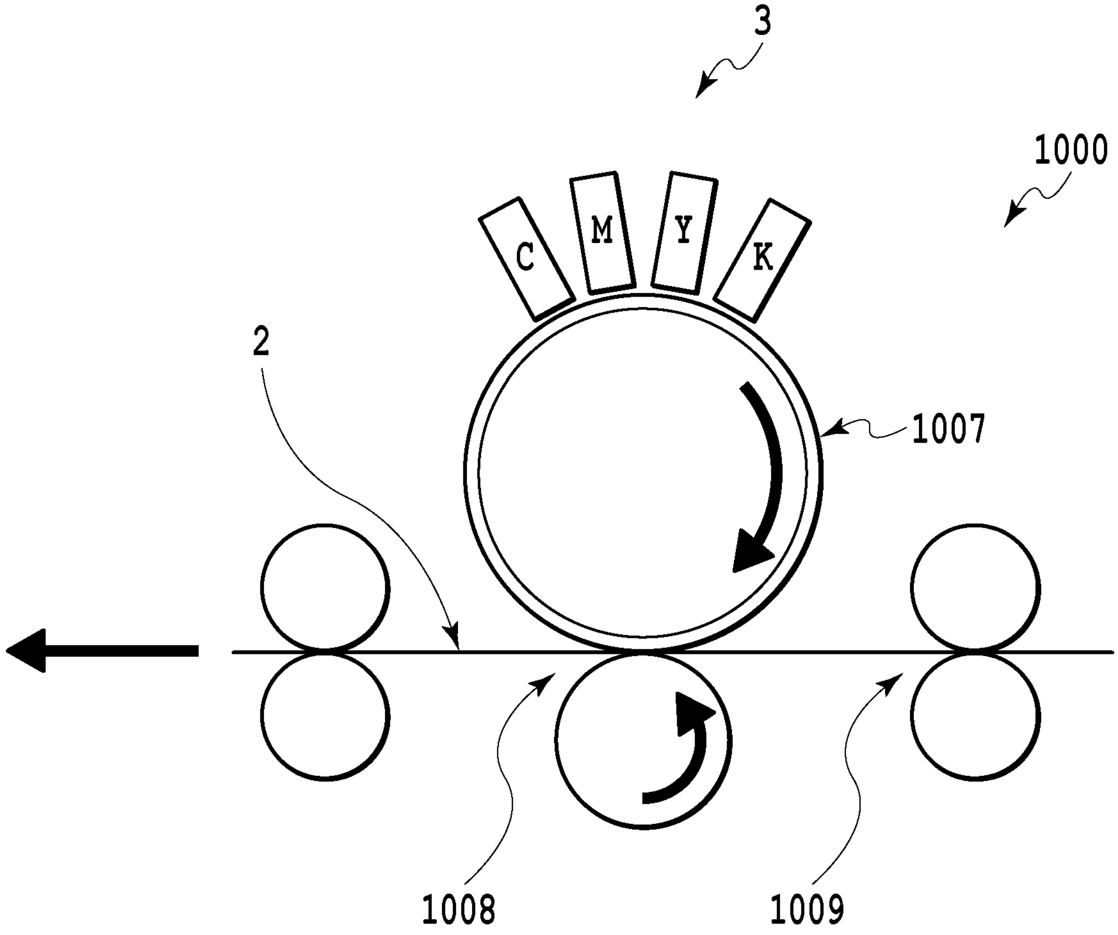
FIG. 51 is a view illustrating a printing apparatus according to a third application example.

FIG. 51 is a schematic diagram illustrating an inkjet printing apparatus according to the application example. The printing apparatus 1000 has a configuration in which an image is not directly printed on a print medium by the liquid ejected from the liquid ejection head 3. That is, the liquid is first ejected to an intermediate transfer member (an intermediate transfer drum) 1007 to form an image thereon and the image is transferred to the print medium 2. In the printing apparatus 1000, the liquid ejection heads 3 respectively corresponding to four colors (C,M,Y,K) of inks are disposed along the intermediate transfer drum 1007 in a circular-arc shape. Accordingly, a full-color printing process is performed on the intermediate transfer member, the printed image is appropriately dried on the intermediate transfer member, and the image is transferred to the print medium 2 conveyed by a sheet conveying roller 1009 to a transfer portion 1008. The sheet conveying system of the second application example is mainly used to convey a cut sheet in the horizontal direction. However, the sheet conveying system of this application example can be also applied to a continuous sheet supplied from a main roll (not illustrated). In such a drum conveying system, since the sheet is easily conveyed while a predetermined tension is applied thereto, a conveying jam hardly occurs even at a high-speed printing operation. For this reason, the reliability of the apparatus is improved and thus the apparatus is suitable for a commercial printing purpose. Similarly to the first and second application examples, the supply system of the printing apparatus 1000, the buffer tank 1003, and the main tank 1006 are fluid-connected to each liquid ejection head 3. Further, an electrical control unit which transmits an ejection control signal and power to the liquid ejection head 3 is electrically connected to each liquid ejection head 3.

(Description of Fourth Circulation Configuration)

Figure 52:
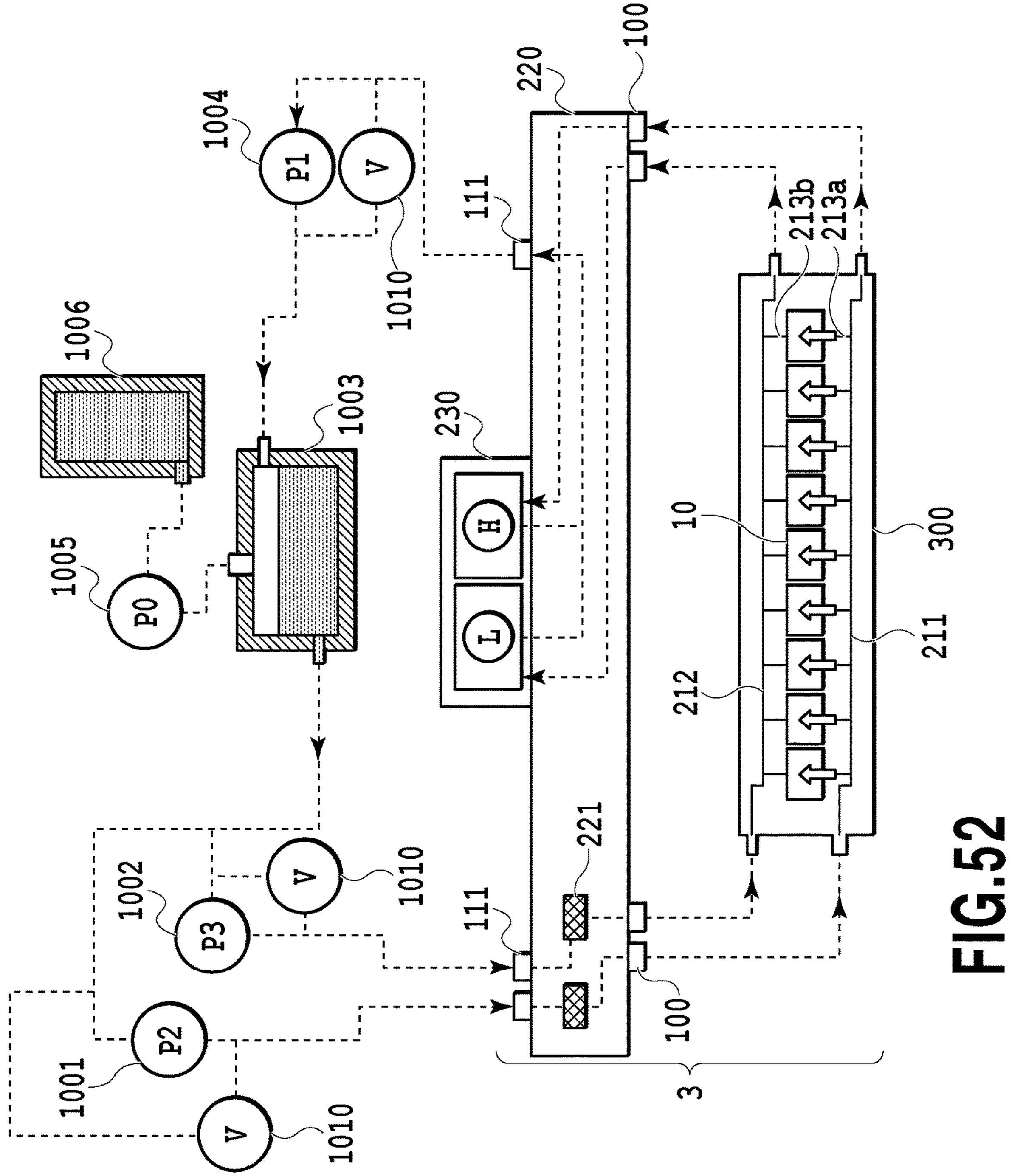
FIG. 52 is a diagram illustrating a fourth circulation configuration.

The first to third circulation paths illustrated in FIG. 2, 3 or 47 can be also applied as the liquid circulation path, but the circulation path illustrated in FIG. 52 is desirably applied. The circulation path illustrated in FIG. 52 is similar to the second circulation path illustrated in FIG. 3. However, a main difference from the second circulation path of FIG. 3 is that a bypass valve 1010 is additionally provided to communicate with each of the passages of the first circulation pumps 1001 and 1002 and the second circulation pump 1004. The bypass valve 1010 has a function (a first function) of decreasing the upstream pressure of the bypass valve 1010 by opening the valve when a pressure exceeds a predetermined pressure. Further, the bypass valve 1010 has a function (a second function) of opening and closing the valve at an arbitrary timing by a signal from a control substrate of the printing apparatus body.

By the first function, it is possible to suppress a large or small pressure from being applied to the downstream side of the first circulation pumps 1001 and 1002 or the upstream side of the second circulation pump 1004. For example, when the functions of the first circulation pumps 1001 and 1002 are not operated properly, there is a case in which a large flow rate or pressure may be applied to the liquid ejection head 3. Accordingly, there is concern that the liquid may leak from the ejection opening of the liquid ejection head 3 or each bonding portion inside the liquid ejection head 3 may be broken. However, when the bypass valves 1010 are added to the first circulation pumps 1001 and 1002 as in the application example, the bypass valve 1010 is opened in the event of a large pressure. Accordingly, since the liquid path is opened to the upstream side of each circulation pump, the above-described trouble can be suppressed.

Further, by the second function, when the circulation driving operation is stopped, all bypass valves 1010 are promptly opened on the basis of the control signal of the printing apparatus body after the operation of the first circulation pumps 1001 and 1002 and the second circulation pump 1004 are stopped. Accordingly, a high negative pressure (for example, several to several tens of kPa) at the downstream portion (between the negative pressure control unit 230 and the second circulation pump 1004) of the liquid ejection head 3 can be released within a short time. When a displacement pump such as a diaphragm pump is used as the circulation pump, a check valve is normally built inside the pump. However, when the bypass valve 1010 is opened, the pressure at the downstream portion of the liquid ejection head 3 can be also released from the downstream portion of the buffer tank 1003. Although the pressure at the downstream portion of the liquid ejection head 3 can be released only from the upstream side, pressure loss exists in the upstream passage of the liquid ejection head and the passage inside the liquid ejection head. For that reason, since some time is taken when the pressure is released, the pressure inside the common passage inside the liquid ejection head 3 transiently decreases too much. Accordingly, there is concern that the meniscus in the ejection opening may be broken. However, since the downstream pressure of the liquid ejection head is further released when the bypass valve 1010 at the downstream side of the liquid ejection head 3 is opened, the risk of the breakage of the meniscus in the ejection opening is reduced.

(Description of Structure of Liquid Ejection Head)

Figure 53A:
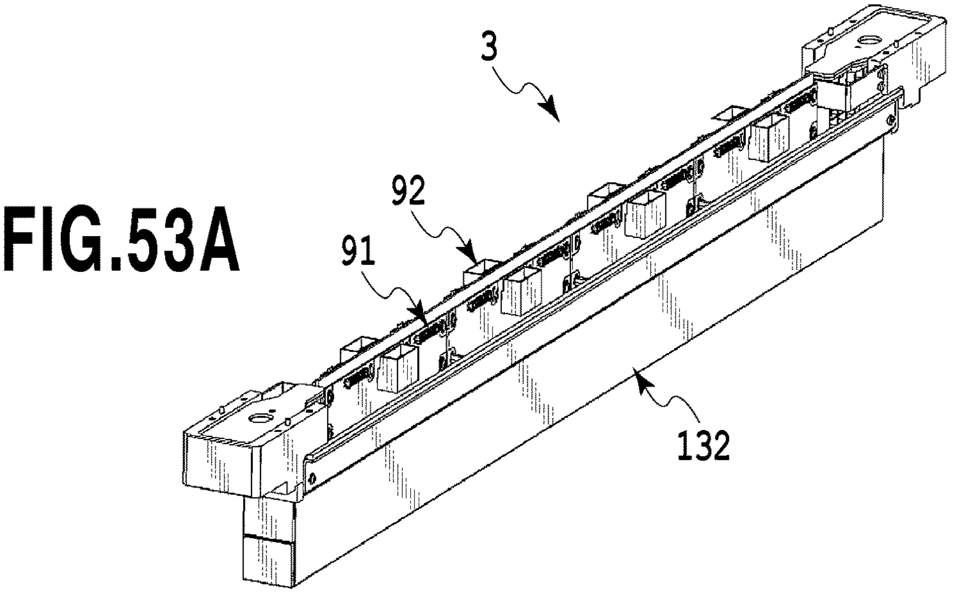
FIGS. 53A and 53B are views illustrating a liquid ejection head according to the third application example.
Figure 53B:
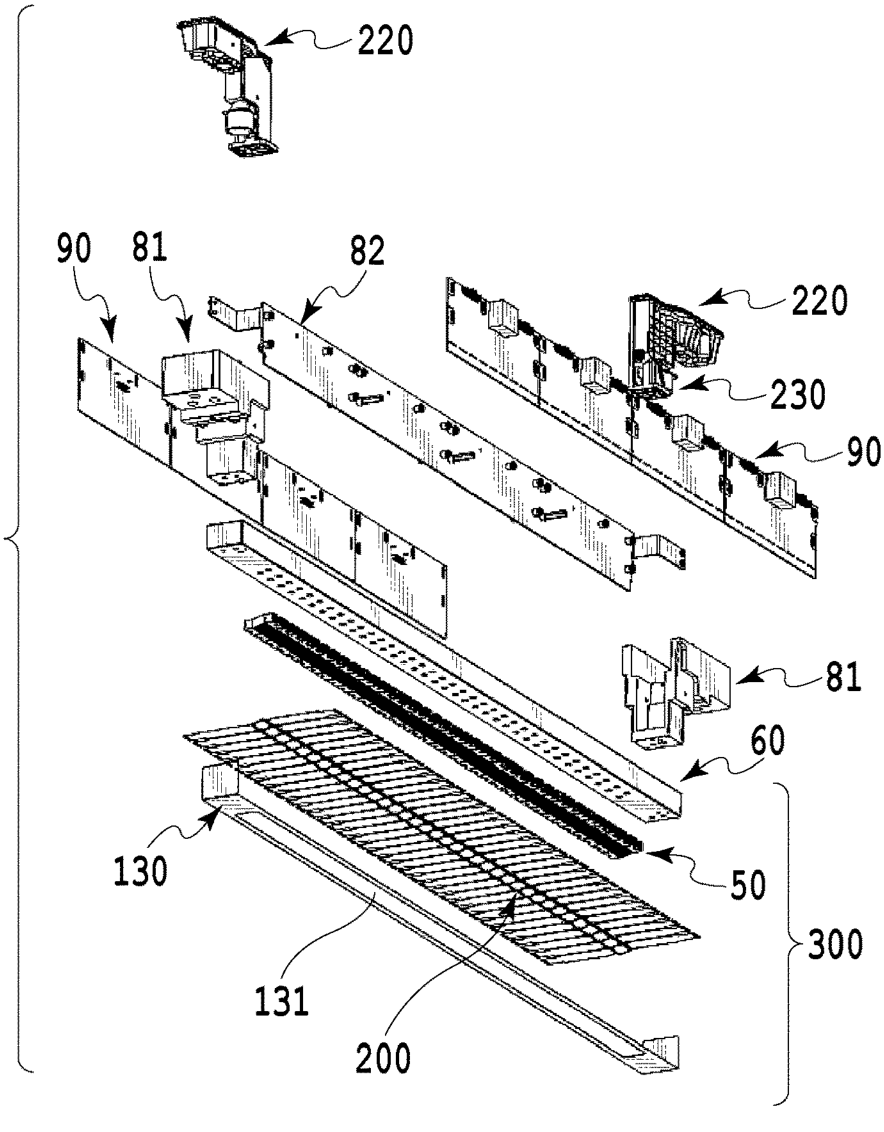

A structure of the liquid ejection head 3 according to the third application example of the present invention will be described. FIG. 53A is a perspective view illustrating the liquid ejection head 3 according to the application example, and FIG. 53B is an exploded perspective view thereof. The liquid ejection head 3 is an inkjet page wide type printing head which includes thirty six printing element boards 10 arranged in a line shape (an in-line shape) in the longitudinal direction of the liquid ejection head 3 and prints an image by one color. Similarly to the second application example, the liquid ejection head 3 includes a shield plate 132 which protects a rectangular side face of the head in addition to the signal input terminal 91 and the power supply terminal 92.

FIG. 53B is an exploded perspective view illustrating the liquid ejection head 3. In FIG. 53B, components or units constituting the liquid ejection head 3 are divided according to the functions thereof and illustrated (where the shield plate 132 is not illustrated). The functions of the units and the members, and the liquid circulation sequence inside the liquid ejection head 3 are similar to those of the second application example. A main difference from the second application example is that the divided electric wiring boards 90 and the negative pressure control unit 230 are disposed at different positions and the first passage member has a different shape. As in this application example, for example, in the case of the liquid ejection head 3 having a length corresponding to the print medium of a B2 size, the power consumed by the liquid ejection head 3 is large and thus eight electric wiring boards 90 are provided. Four electric wiring boards 90 are attached to each of both side faces of the elongated electric wiring board support portion 82 attached to the liquid ejection unit support portion 81.

Figure 54A:
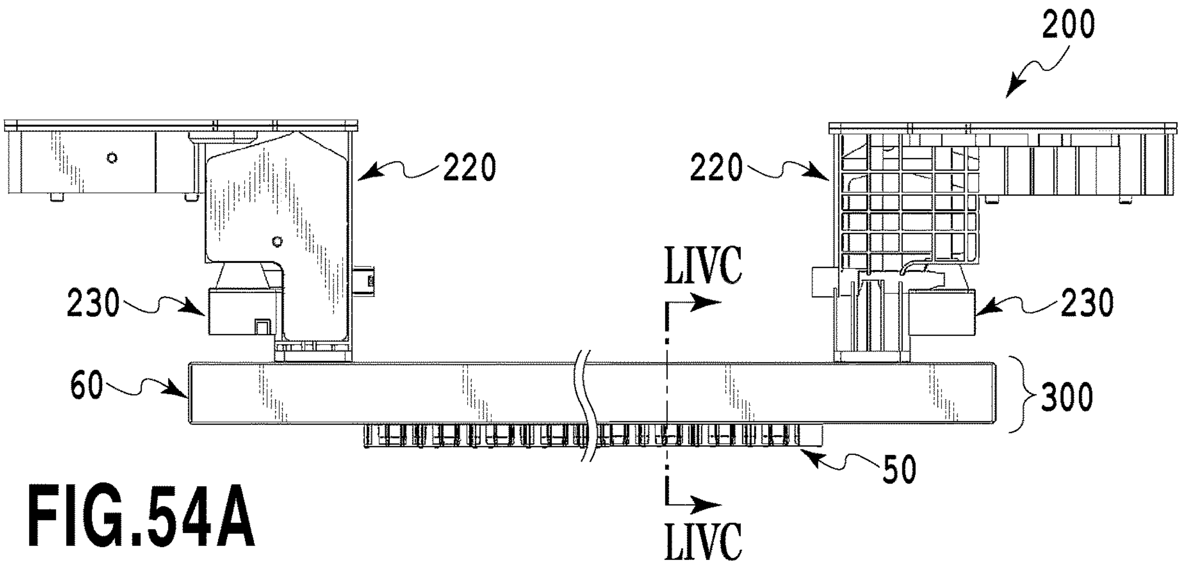
FIGS. 54A, 54B and 54C are views illustrating a liquid ejection head according to the third application example.
Figure 54B:
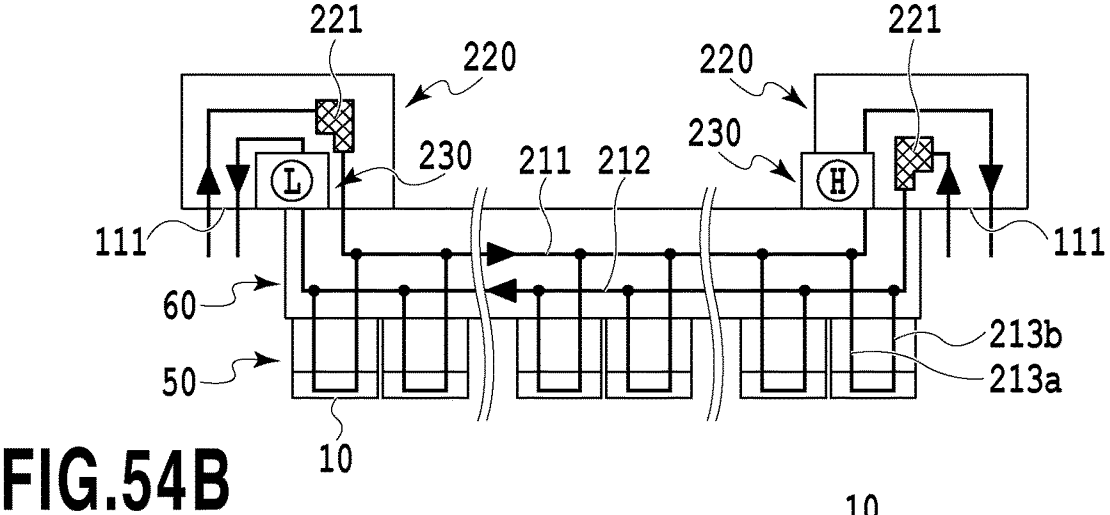
Figure 54C:
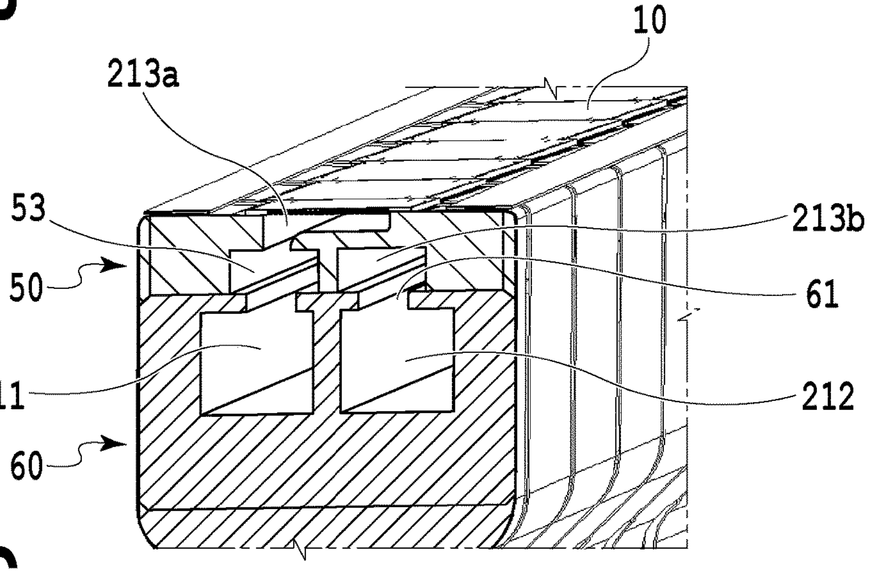

FIG. 54A is a side view illustrating the liquid ejection head 3 including the liquid ejection unit 300, the liquid supply unit 220, and the negative pressure control unit 230, FIG. 54B is a schematic diagram illustrating a flow of the liquid, and FIG. 54C is a perspective view illustrating a cross-section taken along a line LIVC-LIVC of FIG. 54A. In order to easily understand the drawings, a part of the configuration is simplified.

The liquid connection portion 111 and the filter 221 are provided inside the liquid supply unit 220 and the negative pressure control unit 230 is integrally formed at the lower side of the liquid supply unit 220. Accordingly, a distance between the negative pressure control unit 230 and the printing element board 10 in the height direction becomes short compared with the second application example. With this configuration, the number of the passage connection portions inside the liquid supply unit 220 decreases. As a result, there is an advantage that the reliability of preventing the leakage of the printing liquid is improved and the number of components or assembly steps decreases.

Further, since a water head difference between the negative pressure control unit 230 and the ejection opening forming face of the liquid ejection head 3 decreases relatively, this configuration can be suitably applied to the printing apparatus in which the inclination angle of the liquid ejection head 3 illustrated in FIG. 51 is different for each of the liquid ejection heads. Since the water head difference can be decreased, a difference in negative pressure applied to the ejection openings of the printing element boards can be reduced even when the liquid ejection heads 3 having different inclination angles are used. Further, since a distance from the negative pressure control unit 230 to the printing element board 10 decreases, a flow resistance therebetween decreases. Accordingly, a difference in pressure loss caused by a change in flow rate of the liquid decreases and thus the negative pressure can be more desirably controlled.

FIG. 54B is a schematic diagram illustrating a flow of the printing liquid inside the liquid ejection head 3. Although the circulation path is similar to the circulation path illustrated in FIG. 52 in terms of the circuit thereof, FIG. 54B illustrates a flow of the liquid in the components of the actual liquid ejection head 3. A pair of the common supply passage 211 and the common collection passage 212 extending in the longitudinal direction of the liquid ejection head 3 is provided inside the elongated second passage member 60. The common supply passage 211 and the common collection passage 212 are formed so that the liquid flow therein in the opposite directions and the filter 221 is provided at the upstream side of each passage so as to trap foreign materials intruding from the connection portion 111 or the like. In this way, since the liquid flows through the common supply passage 211 and the common collection passage 212 in the opposite directions, a temperature gradient inside the liquid ejection head 3 in the longitudinal direction can be desirably reduced. In order to simplify the description of FIG. 52, the flows in the common supply passage 211 and the common collection passage 212 are indicated by the same direction.

The negative pressure control unit 230 is connected to the downstream side of each of the common supply passage 211 and the common collection passage 212. Further, a branch portion is provided in the course of the common supply passage 211 to be connected to the individual supply passages 213*a* and a branch portion is provided in the course of the common collection passage 212 to be connected to the individual collection passages 213*b*. The individual supply passage 213*a* and the individual collection passage 213*b* are formed inside the first passage members 50 and each individual supply passage communicates with the opening 10A (see FIG. 20) of the cover plate 20 provided at the rear face of the printing element board 10.

The negative pressure control units 230 indicated by "H" and "L" of FIG. 54B are units at the high pressure side (H) and the low pressure side (L). The negative pressure control units 230 are back pressure type pressure adjustment mechanisms which control the upstream pressures of the negative pressure control units 230 to a high negative pressure (H) and a low negative pressure (L). The common supply passage 211 is connected to the negative pressure control unit 230 (the high pressure side) and the common collection passage 212 is connected to the negative pressure control unit 230 (the low pressure side) so that a differential pressure is generated between the common supply passage 211 and the common collection passage 212. By the differential pressure, the liquid flows from the common supply passage 211 to the common collection passage 212 while sequentially passing through the individual supply passage 213*a*, the ejection opening 11 (the pressure chamber 23) in the printing element board 10, and the individual collection passage 213*b*.

FIG. 54C is a perspective view illustrating a cross-section taken along a line LIVC-LIVC of FIG. 54A. In the application example, each ejection module 200 includes the first passage member 50, the printing element board 10, and the flexible circuit board 40. In the embodiment, the support member 30 (FIG. 18) described in the second application example does not exist and the printing element board 10 including the lid member 20 is directly bonded to the first passage member 50. The liquid is supplied from the communication opening 61 formed at the upper face of the common supply passage 211 provided at the second passage member to the individual supply passage 213*a* through the individual communication opening 53 formed at the lower face of the first passage member 50.

Subsequently, the liquid passes through the pressure chamber 23 and passes through the individual collection passage 213*b*, the individual communication opening 53, and the communication opening 61 to be collected to the common collection passage 212.

Here, differently from the second application example illustrated in FIG. 15, the individual communication opening 53 formed at the lower face of the first passage member 50 (the face near the second passage member 60) is sufficiently large with respect to the communication opening 61 formed at the upper face of the second passage member 50. With this configuration, the first passage member and the second passage member reliably fluid-communicate with each other even when a positional deviation occurs when the ejection module 200 is mounted onto the second passage member 60. As a result, the yield in the head manufacturing process is improved and thus a decrease in cost can be realized.

Though description is made for the first to third application examples to which the present invention can be applied, the description of the above-described application example does not limit the scope of the invention. As an example, in the application example, a thermal type has been described in which bubbles are generated by a heating element to eject the liquid. However, the invention can be also applied to the liquid ejection head which employs a piezo type and the other various liquid ejection types.

In the application example, the inkjet printing apparatus (the printing apparatus) has been described in which the liquid such as ink is circulated between the tank and the liquid ejection head, but the other application examples may be also used. In the other application examples, for example, a configuration may be employed in which the ink is not circulated and two tanks are provided at the upstream side and the downstream side of the liquid ejection head so that the ink flows from one tank to the other tank. In this way, the ink inside the pressure chamber may flow.

In the application example, an example of using a so-called page wide type head having a length corresponding to the width of the print medium has been described, but the invention can be also applied to a so-called serial type liquid ejection head which prints an image on the print medium while scanning the print medium. As the serial type liquid ejection head, for example, the liquid ejection head may be equipped with a printing element board ejecting black ink and a printing element board ejecting color ink, but the invention is not limited thereto. That is, a liquid ejection head which is shorter than the width of the print medium and includes a plurality of printing element boards disposed so that the ejection openings overlap each other in the ejection opening row direction may be provided and the print medium may be scanned by the liquid ejection head.

Next, a description will be given of embodiments, mainly focusing on characteristics of the present invention.

First Embodiment

Figure 22A:
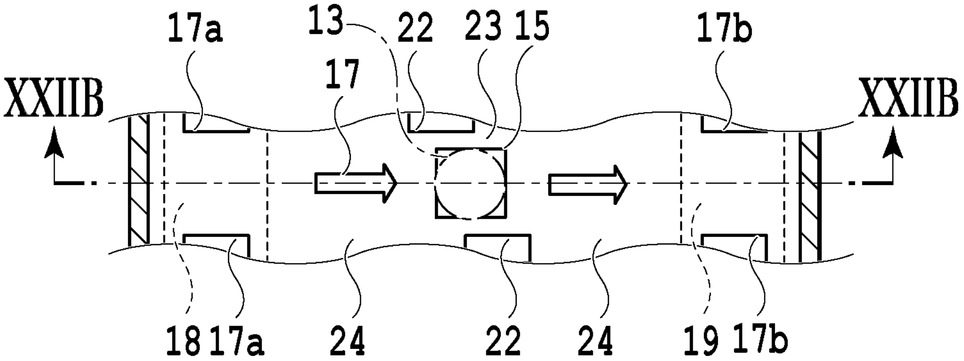
FIGS. 22A, 22B, and 22C are diagrams for description of a configuration of an ejection opening and an ink passage adjacent to the ejection opening in a liquid ejection head according to a first embodiment of the invention.
Figure 22B:
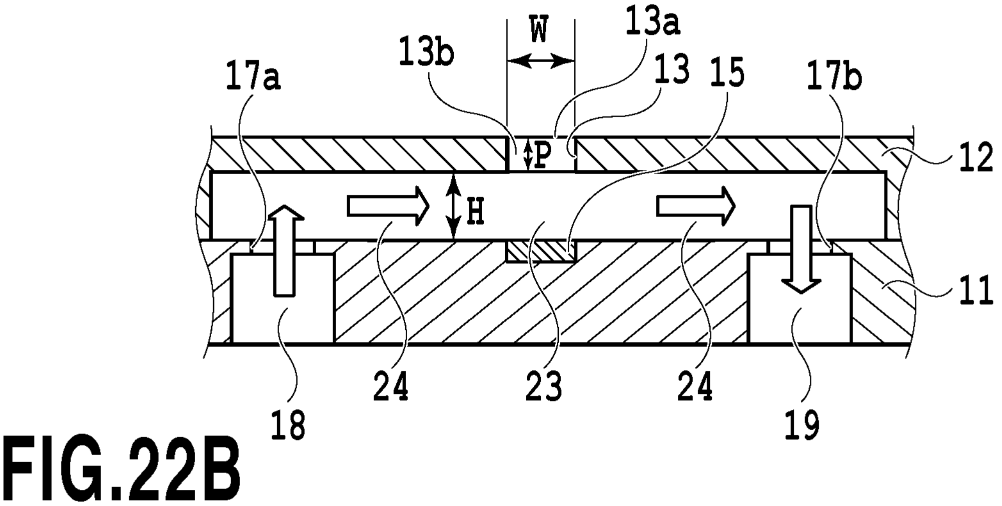
Figure 22C:
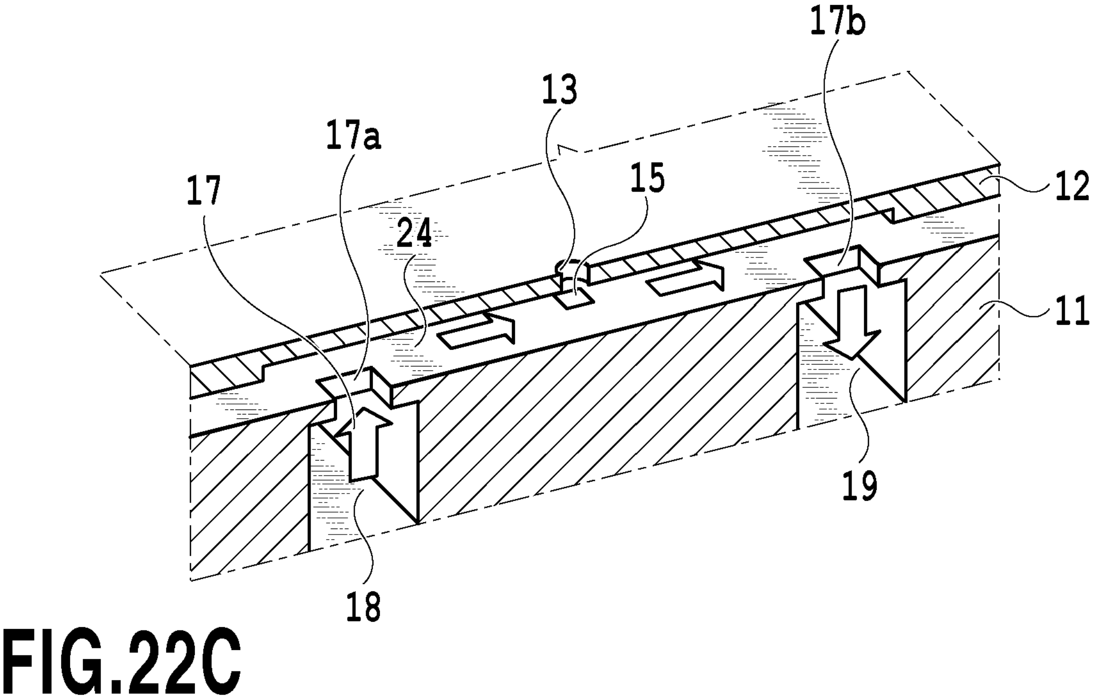

FIGS. 22A, 22B, and 22C are diagrams for description of a configuration of an ejection opening and an ink passage adjacent to the ejection opening in a liquid ejection head according to a first embodiment of the invention. FIG. 22A is a plan view of the ink passage, etc. viewed from a side at which ink is ejected, FIG. 22B is a cross-sectional view taken along XXIIB-XXIIB line of FIG. 22A, and FIG. 22C is a perspective view of a cross section taken along XXIIB-XXIIB line of FIG. 22A.

As illustrated in these figures, the circulation of ink described with reference to FIG. 12, etc., generates a flow 17 of ink in a pressure chamber 23 provided with a printing element 15 and passages 24 in front and back of the pressure chamber 23 on a substrate 11 of the liquid ejection head. In more detail, a differential pressure that causes ink circulation causes the flow of ink supplied from a liquid supply path (supply passage) 18 through a supply opening 17*a* provided in the substrate 11 to pass through the passage 24, the pressure chamber 23, and the passage 24, and arrive at a liquid collection path (outflow passage) 19 through a collection opening 17*b*.

In addition to the above-described ink flow, a space from the printing element (energy generation element) 15 to an ejection opening 13 above the printing element 15 is full of ink in a non-ejection state, and a meniscus of ink (ink boundary 13*a*) is formed around an end portion of the ejection opening 13 at a side in an ejection direction. The ink boundary is indicated by a straight line (plane) in FIG. 22B. However, a shape thereof is determined according to a member that forms a wall of the ejection opening 13 and ink surface tension. Normally, the shape becomes a curved line (curved surface) having a concave or convex shape. The ink boundary is indicated by the straight line to simplify illustration. When an electro-thermal conversion element (heater) corresponding to the energy generation element 15 is driven in a condition that the meniscus is formed, bubbles may be generated in ink using generated heat to eject ink from the ejection opening 13. In the present embodiment, an example in which the heater is used as the energy generation element is described. However, the invention is not restricted thereto. For example, various energy generation elements such as a piezoelectric element, etc. may be used. In the present embodiment, for example, a speed of the ink flow flowing through the passages 24 is in a range of about 0.1 to 100 mm/s, and an influence on impact accuracy, etc. may be made relatively small even when an ejection operation is performed while ink flows.

<With Regard to Relation Among P, W, and H>

Referring to the liquid ejection head of the present embodiment, a relation among a height H of the passage 24, a thickness P of an orifice plate (a passing forming member 12), and a length (diameter) W of the ejection opening is determined as described below.

In FIG. 22B, the height of the passage 24 at an upstream side at a lower end (a communication portion between the ejection opening portion and the passage) of a portion corresponding to the thickness P of the orifice plate of the ejection opening 13 (hereinafter referred to as an ejection opening portion 13*b*) is indicated by H. In addition, a length of the ejection opening portion 13*b* is indicated by P. Further, a length of the ejection opening portion 13*b* in a flow direction of liquid inside the passage 24 is indicated by W. Referring to the liquid ejection head of the present embodiment, H is in a range of 3 to 30 μm, P is in a range of 3 to 30 μm, and W is in a range of 6 to 30 μm. In addition, referring to ink, non-volatile solute concentration is adjusted to 30%, color material concentration is adjusted to 3%, and viscosity is adjusted to a range of 0.002 to 0.01 Pa·s.

Figure 43:
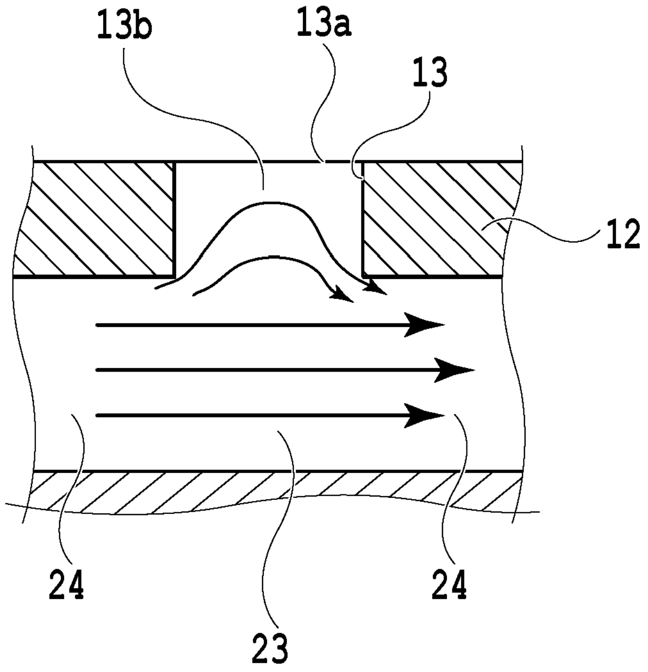
FIG. 43 is a diagram illustrating an aspect of a flow of an ink flow of ink flowing inside the liquid ejection head according to the first embodiment.
Figure 44A:
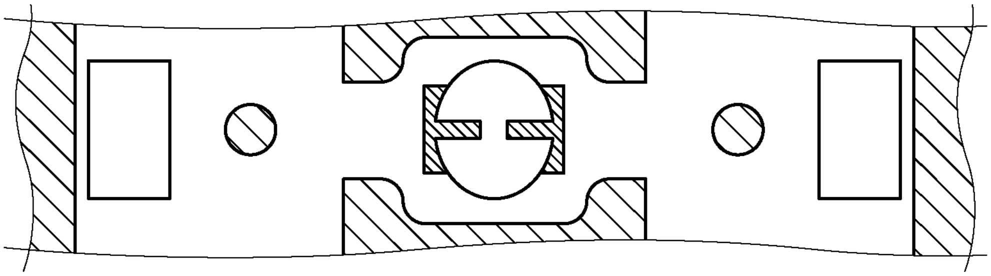
FIGS. 44A and 44B are diagrams illustrating a liquid ejection head according to an eighth embodiment.
Figure 44B:
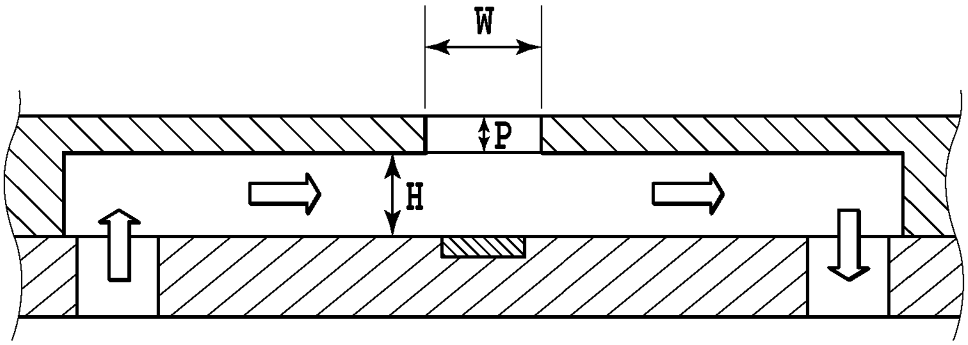
Figure 45A:
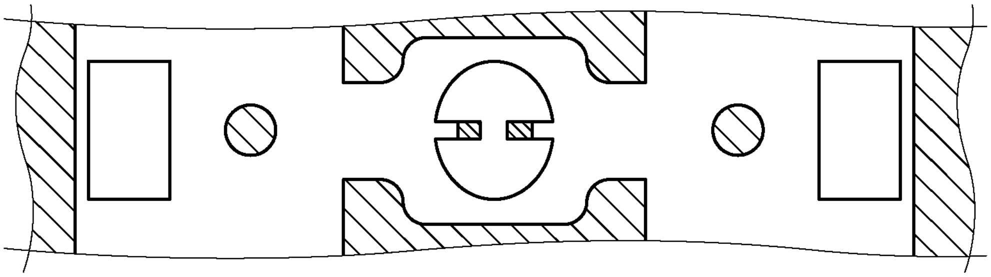
FIGS. 45A and 45B are diagrams illustrating a liquid ejection head according to the eighth embodiment.
Figure 45B:
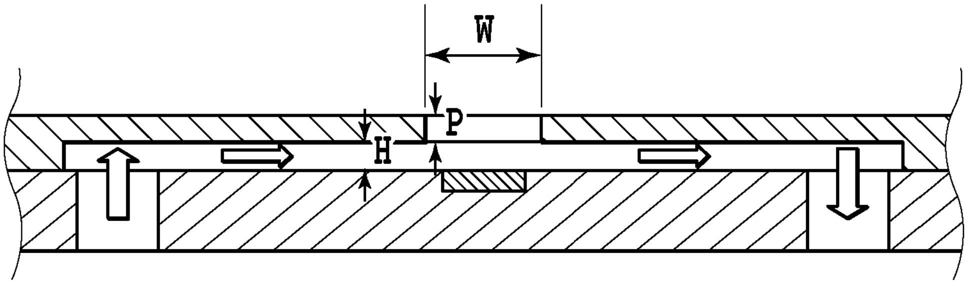

The present embodiment is configured as below to inhibit ink from thickening due to evaporation of ink from the ejection opening 13. FIG. 43 is a diagram illustrating an aspect of a flow of the ink flow 17 in the ejection opening 13, the ejection opening portion 13*b*, and the passages 24 when the ink flow 17 (see FIGS. 22A, 22B, and 22C) of ink flowing inside the passages 24 and the pressure chamber 23 of the liquid ejection head is in a steady state. In this figure, a length of an arrow does not indicate a magnitude of a velocity of the ink flow. FIG. 43 illustrates a flow when ink flows into the passages 24 from the liquid supply path 18 at a flow amount of $1.26\times10^{-4}$ ml/min in the liquid ejection head in which the height H of the passage 24 is 14 μm, the length P of the ejection opening portion 13*b* is 10 μm, and the length (diameter) W of the ejection opening is 17 μm.

The present embodiment has a relation in which the height H of the passage 24, the length P of the ejection opening portion 13*b*, and the length W of the ejection opening portion 13*b* in the flow direction of ink satisfy Expression (1) below.

$$H^{-0.34}\times P^{-0.66}\times W>1.5 \qquad \text{Expression (1)}$$

When the liquid ejection head of the present embodiment satisfies this condition, as illustrated in FIG. 43, the ink flow 17 flowing into the passage 24 flows into the ejection opening portion 13*b*, arrives at a position corresponding to at least half the thickness of the orifice plate of the ejection opening portion 13*b*, and then returns to the passage 24 again. Ink returning to the passage 24 flows to the common collection passage 212 described above through the liquid collection path 19. In other words, at least a portion of the ink flow 17 arrives at a position corresponding to half or more of the ejection opening portion 13*b* in a direction toward the ink boundary 13*a* from the pressure chamber 23, and then returns to the passage 24. It is possible to inhibit ink from thickening by this flow in a large region inside the ejection opening portion 13*b*. When such an ink flow inside the liquid ejection head is generated, ink of the ejection opening portion 13*b* in addition to the passage 24 may flow out to the passage 24. As a result, it is possible to inhibit ink from thickening and ink color material concentration from increasing in the ink ejection opening 13 and the ejection opening portion 13*b*. A liquid droplet of ink ejected from the ejection opening includes ink in the ejection opening portion 13*b* and ink in the pressure chamber 23 (the passage 24) to be ejected in a mixed state. In the embodiment, it is desirable that a rate of the ink from the pressure chamber (the passage 24) is greater than a rate of ink from the ejection opening portion in the ejected liquid droplet. This condition corresponds to for example a case in which a bubble generating for ejection communicates with an outer air. Especially, a liquid ejection head, which has sizes of H being equal to or less than 20 μm, P being equal to or less than 20 μm and W being equal to or less than 30 μm and is then capable of performing higher-definition printing, is desirable. As described above, the embodiment can suppress variation in a quality of liquid adjacent to the ejection opening and thus can achieve suppressing increase of ink viscosity due to liquid evaporation from the ejection opening and reducing color unevenness in an image.

Second Embodiment

Figure 23:
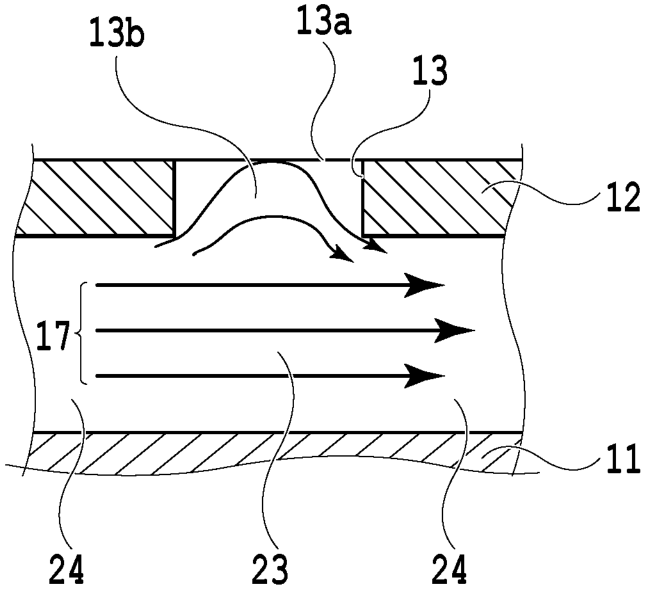
FIG. 23 is a diagram illustrating an aspect of a flow of an ink flow of ink flowing inside a liquid ejection head according to a second embodiment.

FIG. 23 is a diagram illustrating an aspect of a flow of ink flowing into a liquid ejection head according to a second embodiment of the invention. The same reference symbol will be assigned to the same portion as that in the above-described first embodiment, and a description thereof will be omitted.

The present embodiment is configured as below to further reduce an influence of thickening of ink due to evaporation of liquid from an ejection opening. FIG. 23 is a diagram illustrating an aspect of a flow of an ink flow 17 in an ejection opening 13, an ejection opening portion 13*b*, and a passage 24 when the ink flow 17 flowing inside the liquid ejection head is in a steady state similarly to FIG. 43. In this figure, a length of an arrow does not correspond to a magnitude of a velocity, and a certain length is indicated irrespective of a magnitude of a velocity. FIG. 23 illustrates a flow when ink flows into the passage 24 at a flow amount of $1.26\times10^{-4}$ ml/min from a liquid supply path 18 in the liquid ejection head in which H is 14 μm, P is 5 μm, and W is 12.4 μm.

The present embodiment has a relation in which the height H of the passage 24, the length P of the ejection opening portion 13*b*, and the length W of the ejection opening portion 13*b* in a flow direction of ink satisfy Expression (2) described below. Thereby, staying of ink at a vicinity of the ink boundary 13*a* of the ejection opening portion 13*b*, in which color material concentration of the ink changes and a viscosity of the ink increases due to ink evaporation through the ejection opening, can be inhibited in a more effective manner than the first embodiment. In more detail, in the liquid ejection head of the present embodiment, as illustrated in FIG. 23, the ink flow 17 flowing into the passage 24 flows into the ejection opening portion 13*b*, arrives at a position adjacent to the ink boundary 13*a* (a meniscus position), and then returns to the passage 24 again through the inside of the ejection opening portion 13*b*. Ink returning to the passage 24 flows to the common collection passage 212 described above through a liquid collection path 19. Such ink flow allows not only the ink inside the ejection opening portion 13*b* at which the influence of evaporation is easily received but also the ink near the ink boundary 13*a* at which an influence of evaporation is particularly remarkable to flow out to the passage 24 without staying inside the ejection opening portion 13*b*. As a result, ink around the ejection opening, particularly at a position at which an influence of evaporation of ink moisture, etc. is easily received, may be allowed to flow out without staying there, and it is possible to inhibit ink from thickening or ink color material concentration from increasing. The present embodiment may inhibit at least a portion of the ink boundary 13*a* from increasing in viscosity, and thus may further reduce an influence on ejection such as a change in ejection velocity, etc. when compared to a case in which the entire ink boundary 13*a* increases in viscosity.

The above-described ink flow 17 of the present embodiment has a velocity component in a flow direction of ink (a direction from a left side to a right side in FIG. 23) inside the passage 24 (hereinafter referred to as a positive velocity component) at least at a central portion around the ink boundary 13*a* (a central portion of the ejection opening). In the present specification, a flow mode in which the ink flow 17 has a positive velocity component at least at the central portion around the ink boundary 13*a* is referred to as a "flow mode A". In addition, a flow mode in which the ink flow 17 has a negative velocity component in an opposite direction to that of the positive velocity component at the central portion around the ink boundary 13*a* as in a comparative example described below is referred to as a "flow mode B".

Figure 24A:
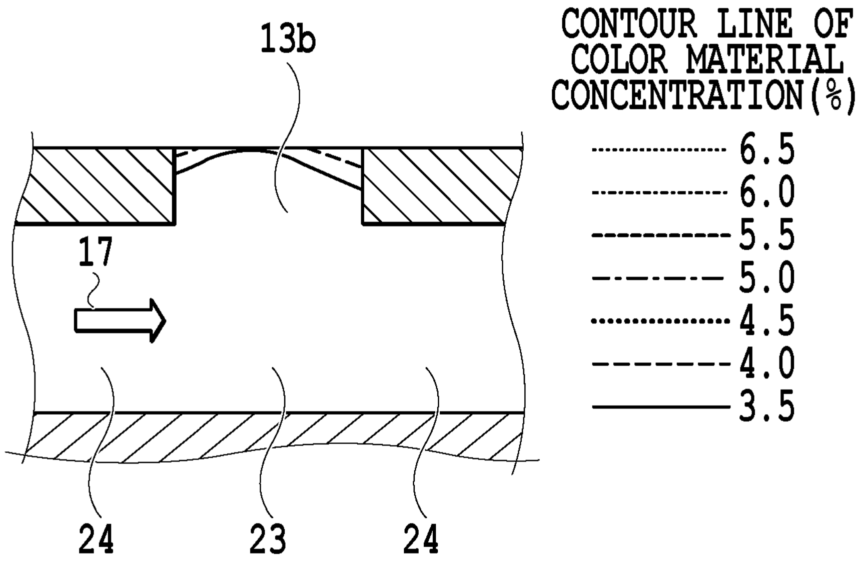
FIG. 24A and FIG. 24B are diagrams illustrating states of color material densities of ink inside ejection opening portions according to the second embodiment and a comparative example.
Figure 24B:
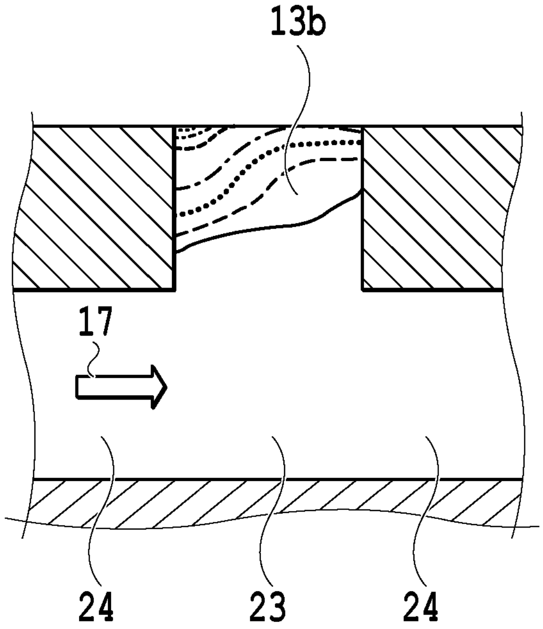

FIGS. 24A and 24B are diagrams illustrating a state of color material concentration of ink inside the ejection opening portion 13*b*. FIG. 24A illustrates a state of the present embodiment, and FIG. 24B illustrates a state of a comparative example. In more detail, FIG. 24A illustrates the case of the flow mode A, and FIG. 24B illustrates the case of the flow mode B related to the above-described comparative example in which a flow around the central portion of the ink boundary 13*a* inside the ejection opening portion 13*b* has a negative velocity component. Further, contour lines illustrated in FIGS. 24A and 24B indicate color material concentration distributions in ink inside the ejection opening portion 13*b*.

Flow modes A and B are determined based on values of P, W, and H indicating a structure of a passage, etc. FIG. 24A illustrates a state of the flow mode A when ink flows in at $1.26\times10^{-4}$ ml/min from the liquid supply path 18 to the passage 24 of the liquid ejection head which has a shape in which H is 14 μm, P is 5 μm, and W is 12.4 μm. Meanwhile, FIG. 24B illustrates a state of the flow mode B when ink flows in at $1.26\times10^{-4}$ ml/min from the liquid supply path 18 to the passage 24 of the liquid ejection head which has a shape in which H is 14 μm, P is 11 μm, and W is 12.4 μm. Color material concentration of ink inside the ejection opening portion 13*b* is higher in the flow mode B illustrated in FIG. 24B than in the flow mode A illustrated in FIG. 24A. In other words, in the flow mode A illustrated in FIG. 24A, ink inside the ejection opening portion 13*b* may be replaced (allowed to flow out) up to the passage 24 by the ink flow 17 arriving at a portion around the ink boundary 13*a* with a positive velocity component. In this way, ink inside the ejection opening portion 13*b* may be inhibited from staying. As a result, it is possible to suppress an increase in color material concentration and viscosity.

Figure 25:
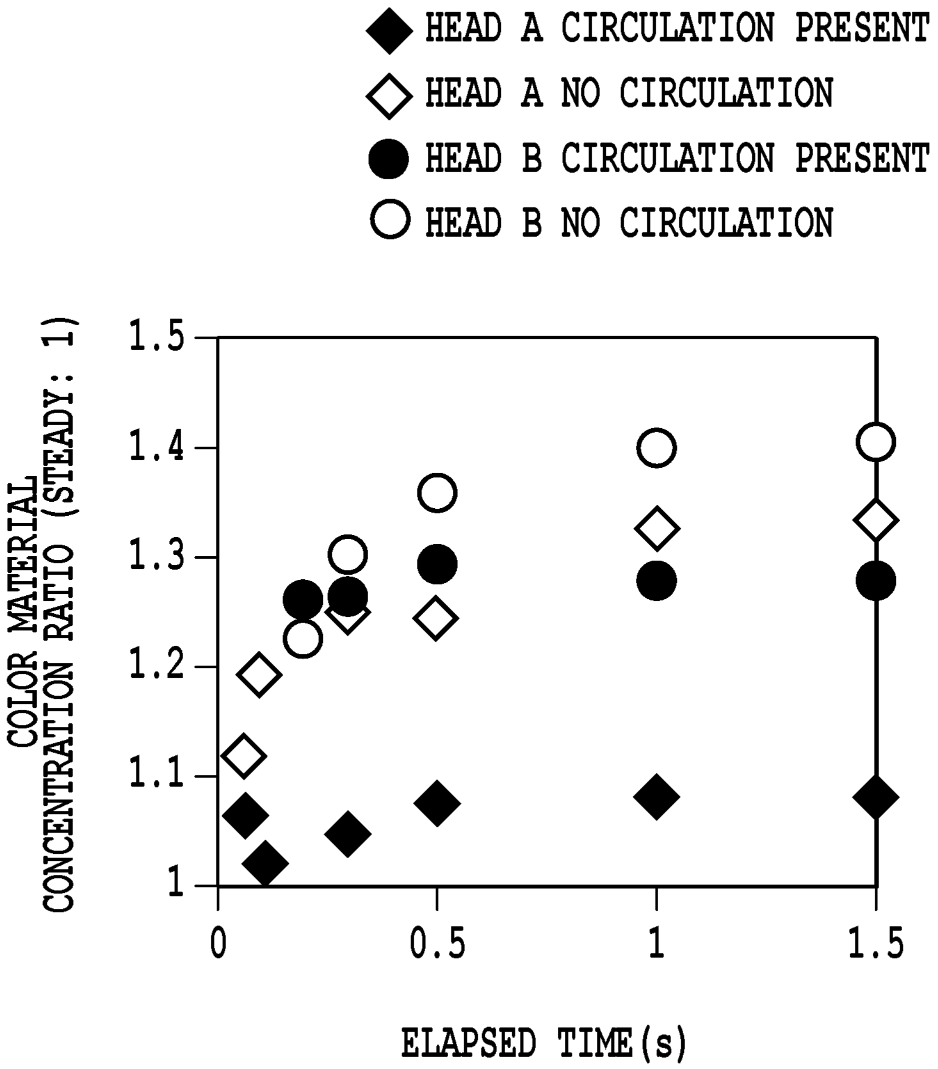
FIG. 25 is a diagram for description of a comparison between color material densities of ink ejected from respective liquid ejection heads of the second embodiment and the comparative example.

FIG. 25 is a diagram for description of a comparison between color material concentration of ink ejected from a liquid ejection head (head A) that generates the flow mode A and color material concentration of ink ejected from a liquid ejection head (head B) that generates the flow mode B. This figure illustrates data corresponding to a case in which ink is ejected while the ink flow 17 is generated in the passage 24 and a case in which ink is ejected while the ink flow 17 is not generated and no ink flow is present inside the passage in each of head A and head B. In addition, in this figure, a horizontal axis indicates elapsed time after ink is ejected from the ejection opening, and a vertical axis indicates a color material concentration ratio of a dot formed on a printing medium by ejected ink. This density ratio is a ratio of density of a dot formed by ink ejected after each elapsed time when density of a dot formed by ink ejected at an ejection frequency of 100 Hz is set to 1.

As illustrated in FIG. 25, when the ink flow 17 is not generated, a density ratio becomes 1.3 or more after an elapsed time of 1 second or more in both the heads A and B, and color material concentration of ink rises in a relatively short time. In addition, when the ink flow 17 is generated in the head B, a density ratio is in a range up to about 1.3, and an increase in color material concentration may be suppressed when compared to a case in which any ink flow is not generated. However, ink having increased color material concentration, which corresponds to a density ratio of up to 1.3, stays in the ejection opening portion. On the other hand, when an ink flow is generated in the head A, a range of a color material concentration ratio is 1.1 or less. It is understood from an examination that a human has difficulty in visually recognizing color unevenness when a change in color material concentration is about 1.2 or less. In other words, the head A suppresses a change in color material concentration which causes color unevenness to be visually recognized, even when an elapsed time is about 1.5 second and therefore is much desirable than the head B. FIG. 25 illustrates a case in which color material concentration increases with evaporation. However, the liquid ejection head of the present embodiment may similarly suppress a change in color material concentration when color material concentration decreases with evaporation.

From an examination of the inventors, etc., it is understood that, in the liquid ejection head generating the flow mode A in the present embodiment, a relation among the height H of the passage 24, the thickness P of the orifice plate (passing forming member 12), and the length (diameter) W of the ejection opening satisfies Expression (2) below.

$$H^{-0.34}\times P^{-0.66}\times W>1.7 \quad \text{Expression (2)}$$

Hereinafter, a value of a right side of the above Expression (2) will be referred to as a determination value J. From the examination of the inventors, etc., it is understood that a liquid ejection head satisfying Expression (2) is in the flow mode A illustrated in FIG. 23, and a liquid ejection head generating the flow mode B does not satisfy Expression (2).

Hereinafter, Expression (2) will be described.

Figure 26:
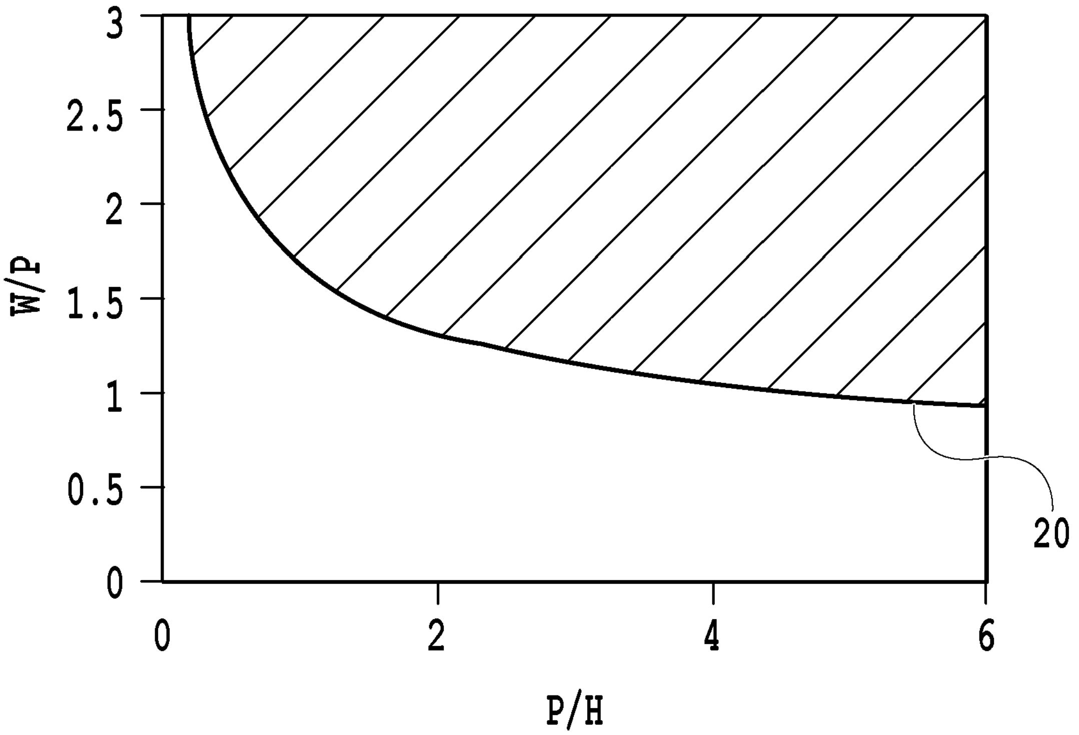
FIG. 26 is a diagram illustrating a relation between the liquid ejection head that generates a flow mode of the second embodiment and the liquid ejection head that generates a flow mode of the comparative example.

FIG. 26 is a diagram illustrating a relation between the liquid ejection head that generates the flow mode A of the second embodiment and the liquid ejection head that generates the flow mode B of the comparative example. A horizontal axis of FIG. 26 indicates a ratio of P to H (P/H), and a vertical axis thereof indicates a ratio of W to P (W/P). A threshold line 20 is a line that satisfies Expression (3) below.

$$(W/P)=1.7\times(P/H)^{-0.34} \quad \text{Expression (3)}$$

In FIG. 26, a relation among H, P, and W corresponds to the flow mode A in a liquid ejection head present in a region indicated by diagonal lines above the threshold line 20, and corresponds to the flow mode B in a liquid ejection head present in a region below and on the threshold line 20. In other words, the relation corresponds to the flow mode A in a liquid ejection head that satisfies Expression (4) below.

$$(W/P)>1.7\times(P/H)^{-0.34} \quad \text{Expression (4)}$$

When Expression (4) is transformed, Expression (2) is obtained. Thus, a head in which the relation among H, P, and W satisfies Expression (2) (a head whose determination value J is 1.7 or more) corresponds to the flow mode A.

The relation will be further described with reference to FIGS. 27A to 27D and FIG. 28. FIGS. 27A to 27D are diagrams for description of an aspect of the ink flow 17 around the ejection opening portion 13*b* in the liquid ejection head corresponding to each of the regions above and below the threshold line 20 illustrated in FIG. 26. FIG. 28 is a diagram for description of whether a flow corresponds to the flow mode A or the flow mode B with regard to various shapes of liquid ejection heads. In FIG. 28, a black round mark indicates a liquid ejection head corresponding to the flow mode A, and an x mark indicates a liquid ejection head corresponding to the flow mode B.

Figure 27A:
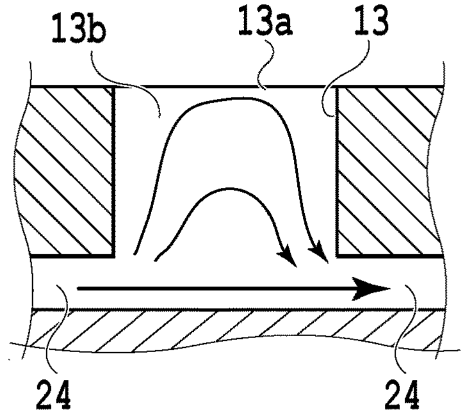
FIGS. 27A, 27B, 27C, and 27D are diagrams for description of aspects of ink flows around ejection opening portions in liquid ejection heads corresponding to respective regions above and below a threshold line illustrated in FIG. 26.
Figure 28:
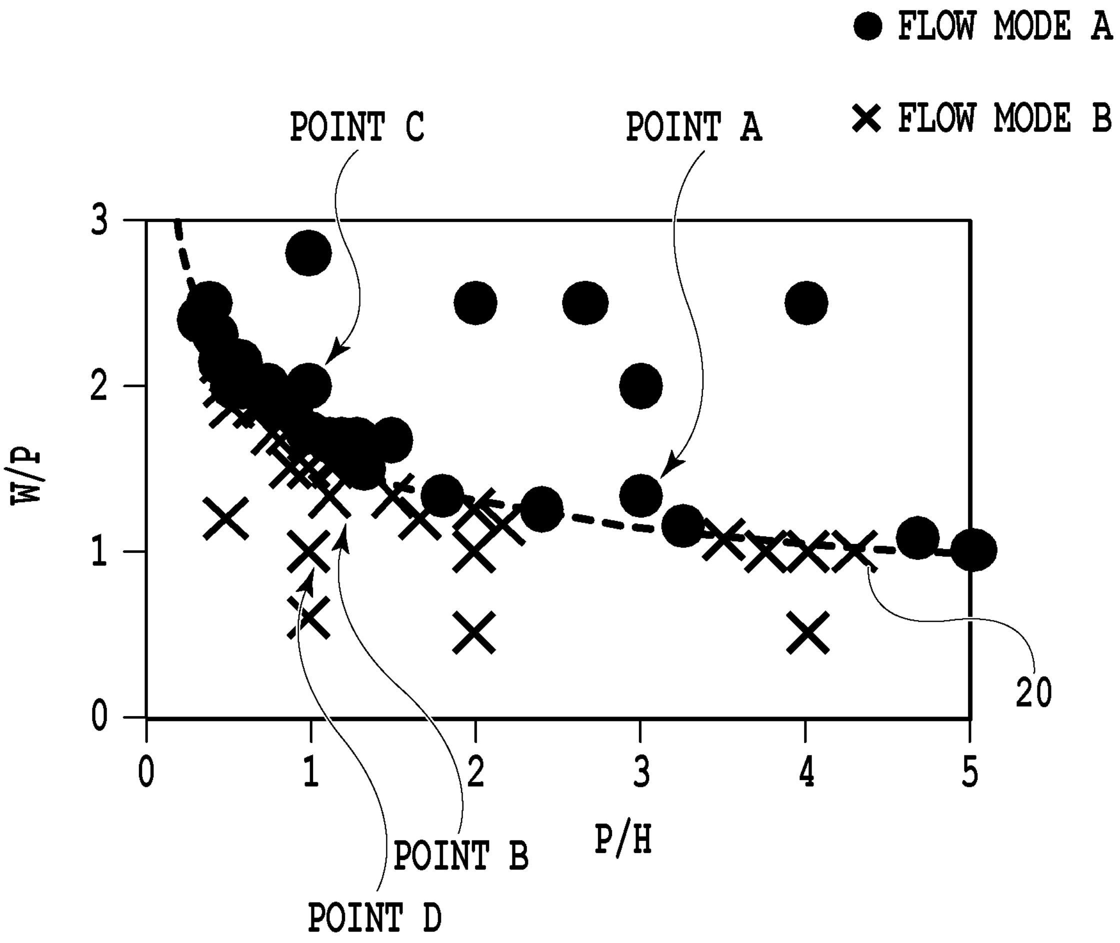
FIG. 28 is a diagram for description of whether a flow corresponds to a flow mode A or a flow mode B with regard to various shapes of liquid ejection heads.

FIG. 27A illustrates an ink flow in a liquid ejection head having a shape in which H is 3 μm, P is 9 μm, and W is 12 μm, and having a determination value J of 1.93, which is larger than 1.7. In other words, an example illustrated in FIG. 27A corresponds to the flow mode A. This head corresponds to a point A in FIG. 28.

Figure 27B:
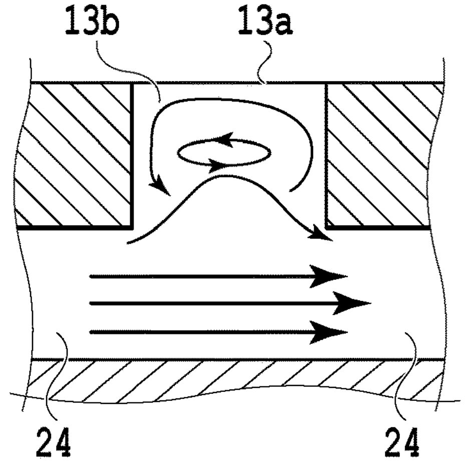

FIG. 27B illustrates an ink flow in a liquid ejection head having a shape in which H is 8 μm, P is 9 μm, and W is 12 μm, and having a determination value of 1.39, which is smaller than 1.7. In other words, this flow corresponds to the flow mode B. This head corresponds to a point B in FIG. 28.

Figure 27C:
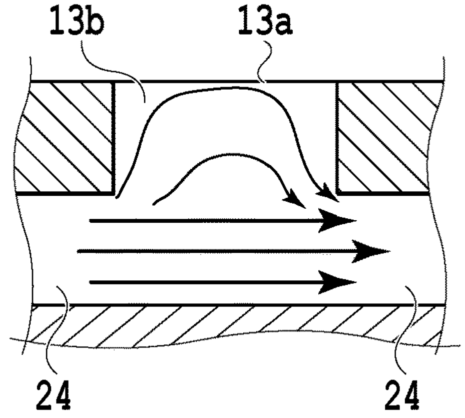

FIG. 27C illustrates an ink flow in a liquid ejection head having a shape in which H is 6 μm, P is 6 μm, and W is 12 μm, and having a determination value of 2.0, which is larger than 1.7. In other words, this flow corresponds to the flow mode A. In addition, this head corresponds to a point C in FIG. 28.

Figure 27D:
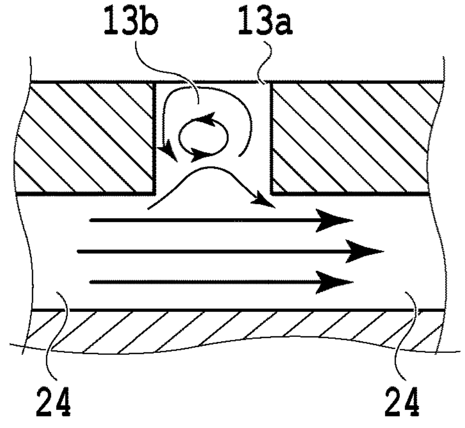

Finally, FIG. 27D illustrates an ink flow in a liquid ejection head having a shape in which H is 6 μm, P is 6 μm, and W is 6 μm, and having a determination value of 1.0, which is smaller than 1.7. In other words, this flow corresponds to the flow mode B. In addition, this head corresponds to a point D in FIG. 28.

As described above, liquid ejection heads may be classified into liquid ejection heads corresponding to the flow mode A and liquid ejection heads corresponding to the flow mode B using the threshold line 20 of FIG. 26 as a boundary. In other words, a liquid ejection head, in which the determination value J of Expression (2) is larger than 1.7, corresponds to the flow mode A, and the ink flow 17 has a positive velocity component at least at the central portion of the ink boundary 13*a*.

Next, a description will be given of a comparison of ejection velocities of ink drops ejected from the liquid ejection head (head A) that generates the flow mode A and the liquid ejection head (head B) that generates the flow mode B, respectively.

Figure 29A:
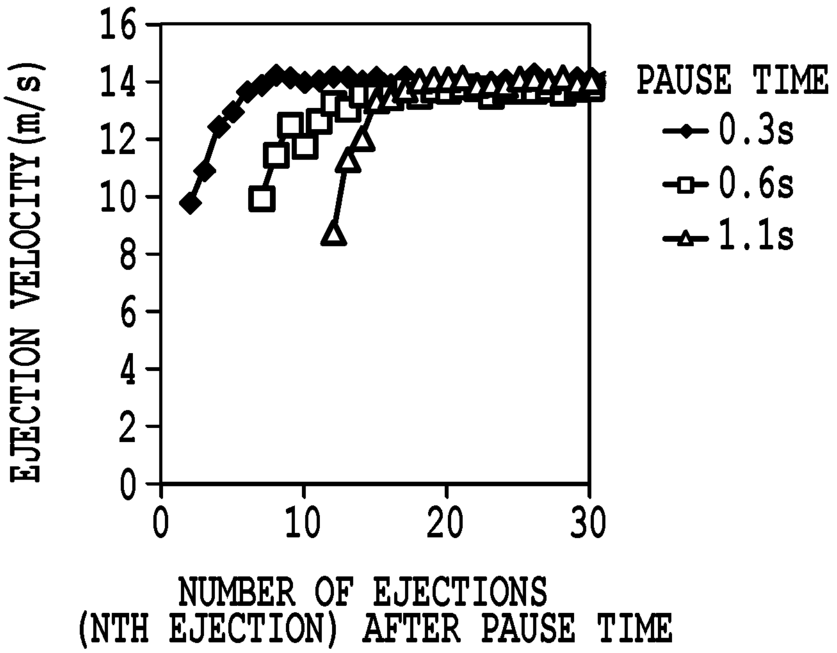
FIGS. 29A and 29B are diagrams illustrating a relation between the number of ejections (the number of ejections) after pausing for a certain time after ejection from a liquid ejection head in each flow mode and an ejection velocity corresponding thereto.
Figure 29B:
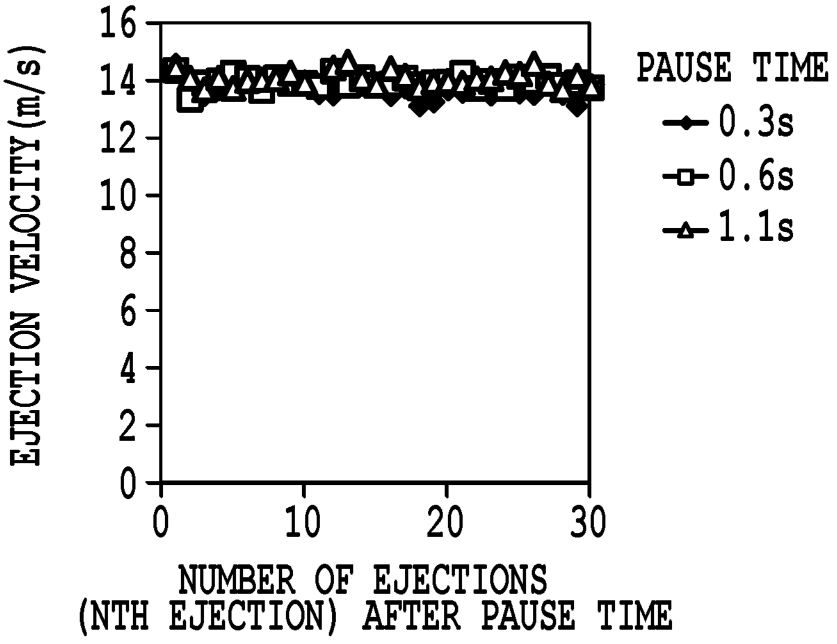

FIGS. 29A and 29B are diagrams illustrating a relation between the number of ejections (the number of ejections) after pausing for a certain time after ejection from a liquid ejection head in each flow mode and an ejection velocity corresponding thereto.

FIG. 29A illustrates a relation between the number of ejections and an ejection velocity when pigment ink containing 20 wt. % or more of solid content, ink viscosity of which is about 4 cP at an ejection temperature, is ejected using the head B. As shown in FIG. 29A, the ejection velocity decreases until about a $20^{th}$ ejection depending on the pause time even when the ink flow 17 is present. FIG. 29B illustrates a relation between the number of ejections and an ejection velocity when the same pigment ink as that of FIG. 29A is ejected using the head A, and the ejection velocity does not decrease from a first ejection after a pause. In this experiment, ink containing wt. % or more of solid content is used. However, concentration does not restrict the invention. Even though easiness of dispersion of solid content in ink is involved, an effect of the mode A is clearly exhibited when ink containing approximately 8 wt. % or more of solid content is ejected.

As described above, in the head that generates the flow mode A, a decrease in ejection velocity of an ink droplet may be suppressed even when ink, an ejection velocity of which easily decreases due to thickening of ink resulting from evaporation of ink from the ejection opening, is used.

As described in the foregoing, a relation among P, W, and H associated with a shape of a passage, etc. has a dominant influence on whether a flow of the ink flow 7 inside the ejection opening corresponds to the flow mode A or the flow mode B in a case of a normal environment. Besides these conditions, for example, conditions such as a velocity of the ink flow 17, viscosity of ink, and a width of the ejection opening 13 in a direction perpendicular to a direction of the flow of the ink flow 7 (a length of the ejection opening in a direction intersecting W) have an extremely small influence when compared to P, W, and H. Therefore, a flow velocity of ink or viscosity of ink may be appropriately set based on a required specification of the liquid ejection head (inkjet printing apparatus) or a condition of a used environment. For example, the flow velocity of the ink flow 17 in the passage 24 may be set to 0.1 to 100 mm/s, and 30 cP or less of ink at an ejection temperature may be applied to viscosity of ink. In addition, when the amount of evaporation from the ejection opening increases due to a change in environment at the time of use, etc., the flow mode A may be obtained by appropriately increasing a flow amount of the ink flow 17. In the liquid ejection head in the flow mode B, the flow mode A is not obtained even when the flow amount is increased. In other words, the relation among H, P, and W associated with the shape of the liquid ejection head described above rather than the condition of the flow velocity of ink or viscosity of ink has a dominant influence on whether the mode A or the mode B is obtained. In addition, among various liquid ejection heads corresponding to the flow mode A, in particular, a liquid ejection head in which H is 20 μm or less, P is 20 μm or less, and W is 30 μm or less can perform high-resolution printing, and thus is preferable.

As described in the foregoing, the liquid ejection head that generates the flow mode A allows ink inside the ejection opening portion 13*b*, in particular, ink around the ink boundary to flow out to the passage 24 by the ink flow 17 that arrives at a portion around the ink boundary 13*a* with a positive velocity component. Therefore, ink is inhibited from staying inside the ejection opening portion 13*b*. In this way, with regard to evaporation of ink from the ejection opening, an increase in color material concentration, etc. of ink inside the ejection opening portion may be reduced. In addition, in the present embodiment, an ink ejection operation is performed while ink inside the passage 24 flows as described above. Thus ink is ejected while a flow of ink, which enters the inside of the ejection opening portion 13*b* from the passage 24 (pressure chamber 23), arrives at the ink boundary, and then returns to the ink passage, is present. As a result, even in a printing operation pause state, an increase in color material concentration inside the ejection opening portion 13*b* is reduced at all times. Thus, ejection of a first ejection may be favorably performed after a pause in a printing operation, and occurrence of color unevenness, etc. may be reduced. However, the invention is applicable to a liquid ejection head that performs an ink ejection operation while an ink flow in the ink passage 24 is suspended. Thickening of ink inside the ejection opening portion 13*b* may be reduced by generating a circulation flow inside the ink passage after the pause in the printing operation, and ink may be ejected after suspending the circulation flow.

Third Embodiment

Figure 30:
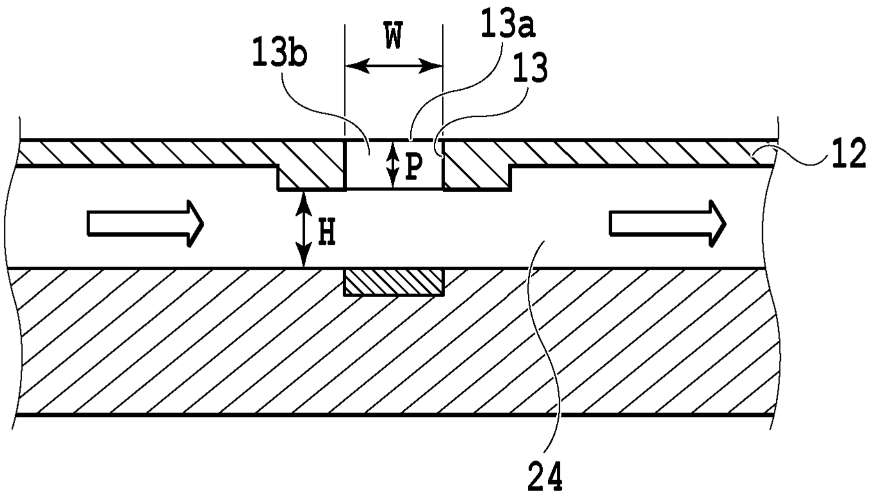
FIG. 30 is a diagram illustrating an aspect of a flow of an ink flow of ink flowing inside a liquid ejection head according to a third embodiment of the invention.

FIG. 30 is a diagram illustrating an aspect of a flow of an ink flow of ink flowing inside a liquid ejection head according to a third embodiment of the invention. The same reference symbol will be assigned to the same portion as that in the above-described embodiments, and a description thereof will be omitted. As illustrated in FIG. 30, in the present embodiment, a height of a passage 24 adjacent to an ejection opening 13 (an ejection opening portion 13*b*) is lower than a height of the passage 24 in another portion. Specifically, a height H of the passage 24 at an upstream side of a communication portion between the passage 24 and the ejection opening portion 13*b* in a flow direction of liquid inside the passage is lower than a height of the passage 24 in the communication portion between the passage 24 and the liquid supply path 18 (see FIGS. 22A to 22C). Also in the present embodiment, setting of sizes of H, P and W so that satisfy the expression (1) allows at least a part of the ink flow 17 to arrive at a position corresponding to half or more of the ejection opening portion 13*b* in a direction from the pressure chamber 23 to the ink boundary 13*a* and then return to passage 24. Further, also in the configuration of the present embodiment, setting the size of each H, P and W so as to satisfy the expression (2) generates the flow mode A.

In the present embodiment, when a height of a passage from the communication portion between the passage 24 and the liquid supply path 18 to a portion adjacent to the ejection opening portion, and a height of a passage from the portion adjacent to the ejection opening portion to a liquid collection path 19 are set to be relatively high, a passage resistance of the part may be set to be low. In addition, when a height H of a passage around the ejection opening portion 13*b* is set to be relatively small, the liquid ejection head of the flow mode A described in the first embodiment may be obtained. Normally, when the height of the passage 24 is set to be low as a whole in order to satisfy Expression (2), a passage resistance from the liquid supply path 18 or the liquid collection path 19 to the ejection opening 13 increases, and a speed (refilling speed) of refilling with ink, which is insufficient due to ejection, decreases in some cases. Therefore, as a configuration of the present embodiment, setting a height of the passage near the ejection opening to be smaller than that of other passage allows a necessary refilling speed to be ensured while satisfying Expressions (1) and (2). Thereby, both of suppressing increase of ink viscosity at the ejection opening and a high speed printing (improving of throughput) can be achieved.

Fourth Embodiment

Figure 31:
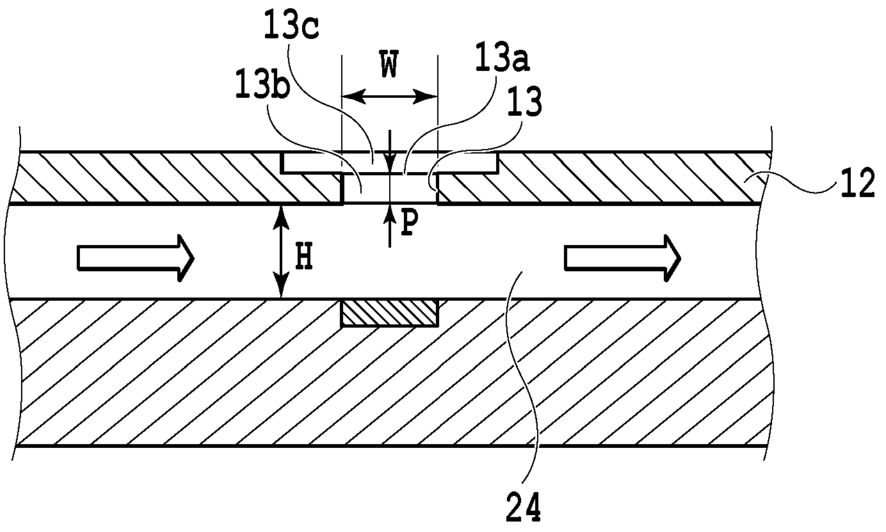
FIG. 31 is a diagram illustrating an aspect of a flow of an ink flow of ink flowing inside a liquid ejection head according to a fourth embodiment of the invention.

FIG. 31 is a diagram illustrating an aspect of a flow of an ink flow of ink flowing inside a liquid ejection head according to a fourth embodiment of the invention. In FIG. 31, a concave portion 13*c* is formed around an ejection opening 13 on a surface of an orifice plate 12. In other words, the ejection opening 13 is formed inside the concave portion 13*c* (a bottom surface of the concave portion 13*c*) which is formed on the orifice plate. In a normal state and a steady state in which a circulation flow exists, a meniscus of ink (an ink boundary 13*a*) is formed on a boundary surface between the ejection opening 13 and the bottom surface of the concave portion 13*c*. Also in the present embodiment, setting of sizes of H, P and W so that satisfy the expression (1) allows at least a part of the ink flow 17 to arrive at a position corresponding to half or more of the ejection opening portion 13*b* in a direction from the pressure chamber 23 to the ink boundary 13*a* and then return to passage 24. Further, also in the configuration of the present embodiment, setting of sizes of H, P and W so that satisfy the expression (2) generates the flow mode A. In the present embodiment, P of Expressions (1) and (2) corresponds to a length of an ejection opening portion, that is, a length from a portion in which the meniscus of ink is formed to a passage 24 as illustrated in FIG. 31. That is, a thickness of the orifice plate 12 around a place coming into contact with the ejection opening 13 is thinner than another place. Specifically, the thickness of the orifice plate 12 around the ejection opening 13 is thinner than the thickness of the orifice plate in the communication portion between the passage 24 and the liquid supply path 18 (see FIGS. 22A to 22C).

In the present embodiment, the thickness P of the orifice plate around the ejection opening portion 13*b* may be set to be small while the thickness of the orifice plate 12 is kept thick to a certain extent as the whole head. Normally, when the length P of the ejection opening portion is set to be short in order to satisfy Expressions (1) and (2), the thickness of the whole orifice plate becomes thin, and strength of the orifice plate decreases. However, according to a configuration of the present embodiment, it is possible to ensure strength of the orifice plate 12 as a whole in addition to effects of the first embodiment and the second embodiment.

Fifth Embodiment

FIG. 32 is a diagram illustrating an aspect of a flow of an ink flow of ink flowing inside a liquid ejection head according to a fifth embodiment of the invention. As illustrated in FIG. 32, a height of a passage 24 around a portion connected to an ejection opening 13 is lower than another place. In addition, a concave portion 13*c* is formed around the ejection opening 13 on a surface of an orifice plate 12. As a specific configuration, a height H of the passage 24 at an upstream side of a communication portion between the passage 24 and an ejection opening portion 13*b* in a flow direction of liquid inside the passage is lower than a height of the passage 24 near the communication portion between the passage 24 and the liquid supply path 18 (see FIGS. 22A to 22C). Also in the configuration of the present embodiment, similarly to the fourth embodiment, in a normal state and a steady state in which a circulation flow exists, a meniscus of ink (an ink boundary 13*a*) is formed on a boundary surface between the ejection opening 13 and the bottom surface of the concave portion 13*c*.

The present embodiment may set the height H of the passage around the ejection opening to be low while a passage resistance from a liquid supply path 18 or a liquid collection path 19 to the ejection opening 13 is kept low. Further, present embodiment may set a length P of the ejection opening portion 13*b* to be short. Normally, when the height of the passage 24 around the portion connected to the ejection opening 13 is set to be lower than another place, a thickness of the orifice plate 12 around the ejection opening 13 becomes thick accordingly, and a length P of the ejection opening 13 becomes long. On the other hand, according to a configuration of the present embodiment, it is possible to ensure a necessary refilling speed in addition to the effects of the first embodiment and the second embodiment.

Sixth Embodiment

Figure 33:
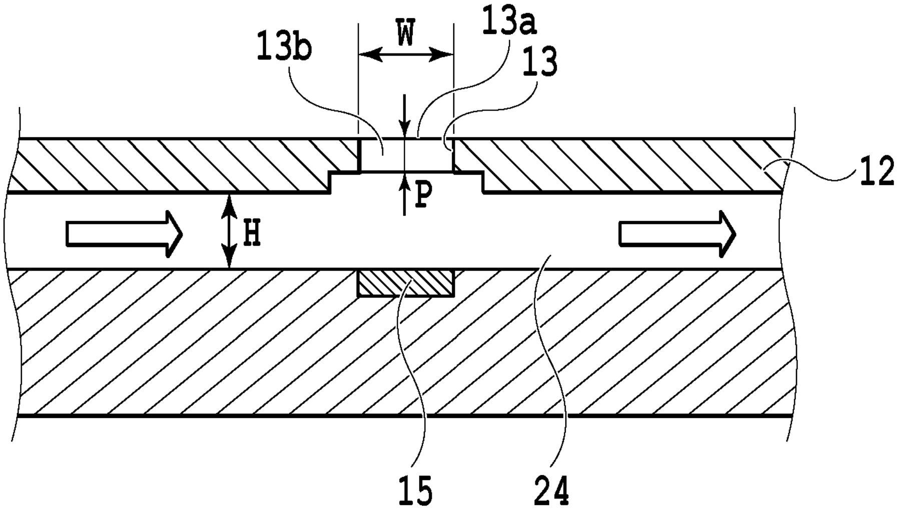
FIG. 33 is a diagram illustrating an aspect of a flow of an ink flow of ink flowing inside a liquid ejection head according to a sixth embodiment of the invention.

FIG. 33 is a diagram illustrating an aspect of a flow of an ink flow of ink flowing inside a liquid ejection head according to a sixth embodiment of the invention. As illustrated in FIG. 33, the liquid ejection head of the present embodiment has a stepped portion in a communication portion between a passage 24 and an ejection opening portion 13*b*. In the present embodiment, a portion from an ejection opening 13 to a part in which the stepped portion is formed corresponds to the ejection opening portion 13*b*, and the ejection opening portion 13*b* is connected to the passage 24 through a part (a portion of the passage) having a lager diameter than that of the ejection opening portion 13*b*. Therefore, P, W, and H in the present embodiment are defined as illustrated in the figure. Also in the liquid ejection head, setting of sizes of H, P and W so that satisfy the expression (1) allows at least a part of the ink flow 17 to arrive at a position corresponding to half or more of the ejection opening portion 13*b* in a direction from the pressure chamber 23 to the ink boundary 13*a* and then return to passage 24. Further, setting of sizes of H, P and W so that satisfy the expression (2) generates the flow mode A.

In this way, when a part from the passage toward the ejection opening has a multi-step structure, a flow resistance in a direction from an energy generation element toward the ejection opening 13 may be set to be relatively small. In this way, a configuration of the present embodiment allows an ejection efficiency to be improved and therefore in addition to the effects of the first embodiment and the second embodiment, for example, the configuration of the present embodiment is preferable when a small liquid droplet of 5 pl or less is ejected.

Seventh Embodiment

Figure 34:
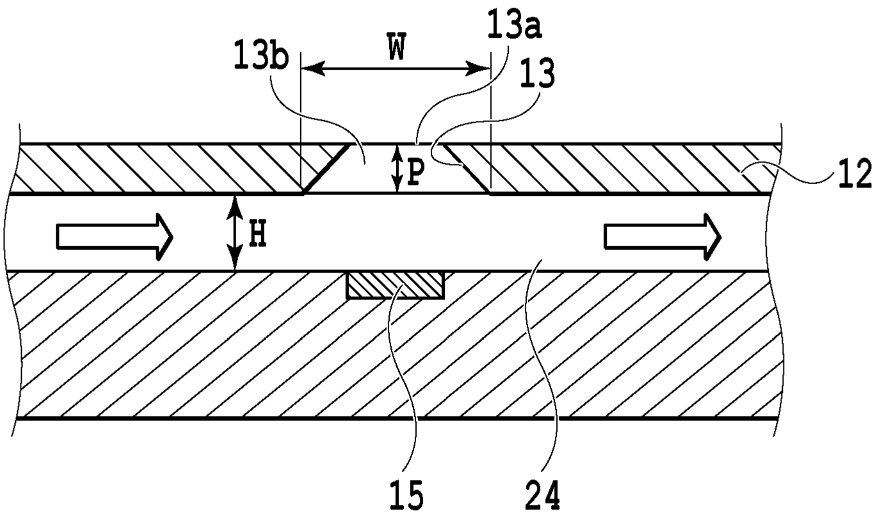
FIG. 34 is a diagram illustrating an aspect of a flow of an ink flow of ink flowing inside a liquid ejection head according to a seventh embodiment of the invention.

FIG. 34 is a diagram illustrating an aspect of a flow of an ink flow of ink flowing inside a liquid ejection head according to a seventh embodiment of the invention. As illustrated in FIG. 34, an ejection opening portion 13*b* that allows communication between an ejection opening 13 and a passage 24 has a shape of a truncated cone. Specifically, an opening size of the ejection opening portion 13*b* on the passage side is larger than an opening size of the ejection opening portion 13*b* on the ejection opening 13 side, and a side wall has a tapered shape. According to this configuration, a flow resistance in a direction from an energy generation element 15 toward the ejection opening 13 can be set to be relatively small and thus the ejection efficiency can be improved. Also in the present embodiment, setting of sizes of H, P and W so that satisfy the expression (1) allows at least a part of the ink flow 17 to arrive at a position corresponding to half or more of the ejection opening portion 13*b* in a direction from the pressure chamber 23 to the ink boundary 13*a* and then return to passage 24. Further, also in the present embodiment, setting of sizes of H, P and W so that satisfy the expression (2) generates the flow mode A. In the present embodiment, referring to W of Expressions (1) and (2), as illustrated in FIG. 34, a length of a communication portion between the ejection opening portion 13*b* and the passage 24 is defined as W. In addition to the effect of the first embodiment, for example, a configuration of the present embodiment is a preferable configuration when a small liquid droplet of 5 pl or less is ejected.

Eighth Embodiment

Figure 35A:
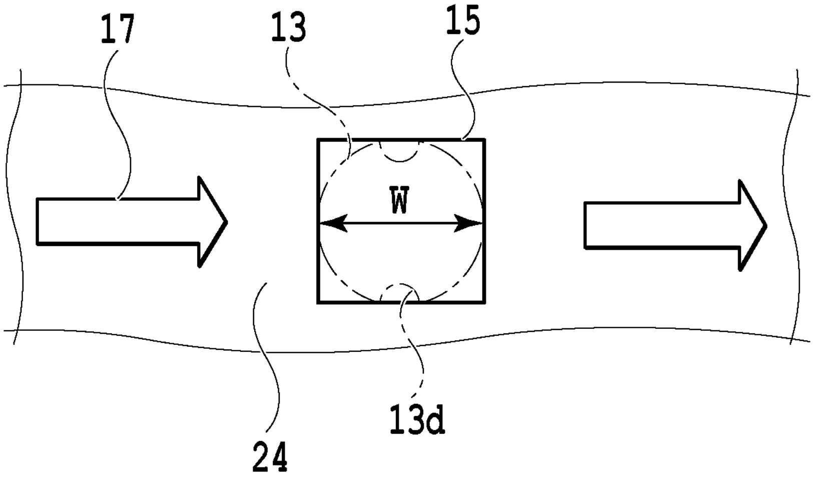
FIGS. 35A and 35B are diagrams illustrating a shape of a liquid ejection head, in particular, an ejection opening according to an eighth embodiment of the invention.
Figure 35B:
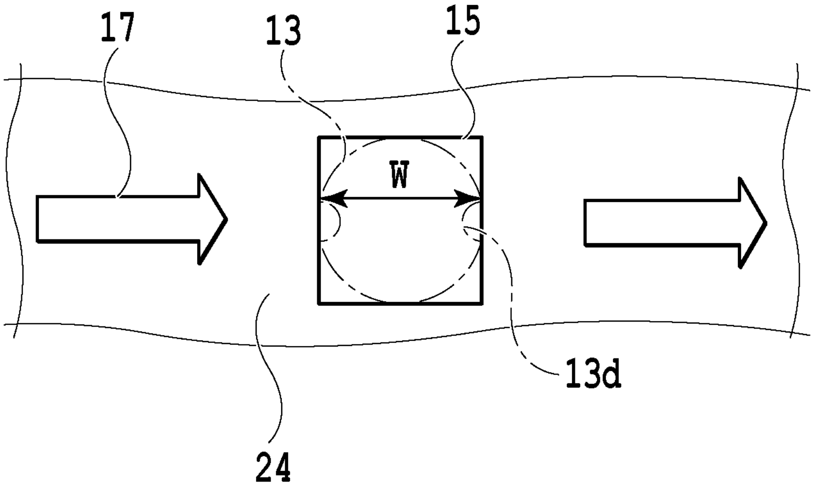

FIGS. 35A and 35B are diagrams illustrating two examples of a shape of a liquid ejection head, in particular, an ejection opening according to an eighth embodiment of the invention, and show plan views (schematic views) of the liquid ejection head looked from a direction in which a liquid is ejected from the ejection opening 13. The ejection opening 13 of the present embodiment has a shape in which protrusions 13*d*, each of which elongates toward the center of the ejection opening, are formed at opposite positions to each other. The protrusions 13*d* continuously extend from an outer surface of the ejection opening 13 up to an inside of an ejection opening portion 13*b*. Also in the shape having the protrusions, setting of sizes of H, P and W so that satisfy the expression (1) allows at least a part of the ink flow 17 to arrive at a position corresponding to half or more of the ejection opening portion 13*b* in a direction from the pressure chamber 23 to the ink boundary 13*a* and then return to passage 24. Further, setting of sizes of H, P and W so that satisfy the expression (2) generates the flow mode A.

In the ejection opening of the example illustrated in FIG. 35A, the protrusions 13*d* protruding in a direction intersecting a flow of liquid inside a passage are formed. In the ejection opening of the example illustrated in FIG. 35B, the protrusions 13*d* protruding in a direction of an ink flow are formed. When the protrusions are formed in the ejection opening 13, a meniscus formed between the protrusions 13*d* may be more easily maintained than a meniscus in another portion inside the ejection opening, and tailing of an ink droplet extending from the ejection opening may be cut at an earlier time. In this way, it is possible to suppress occurrence of mist corresponding to a minute liquid droplet concomitant with a main droplet.

FIGS. 44A to 45B are diagrams illustrating more specific configurations of the liquid ejection head shown in FIG. 35B. Specific sizes of respective portions in the present embodiment are H=16 μm, P=6 μm, W=22 μm and a determination value J=2.6 in a configuration of FIGS. 44A, 44B and H=5 μm, P=5 μm, W=20 μm and a determination value J=4.3 in a configuration of FIGS. 45A, 45B.

Ninth Embodiment

Figure 36A:
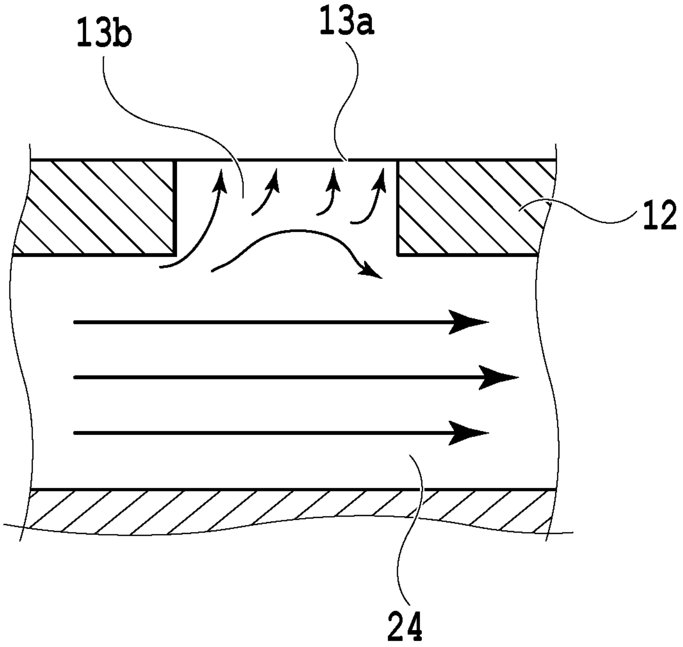
FIGS. 36A and 36B are diagrams illustrating an aspect of a flow in each flow mode of ink flowing inside a liquid ejection head according to a ninth embodiment of the invention.
Figure 36B:
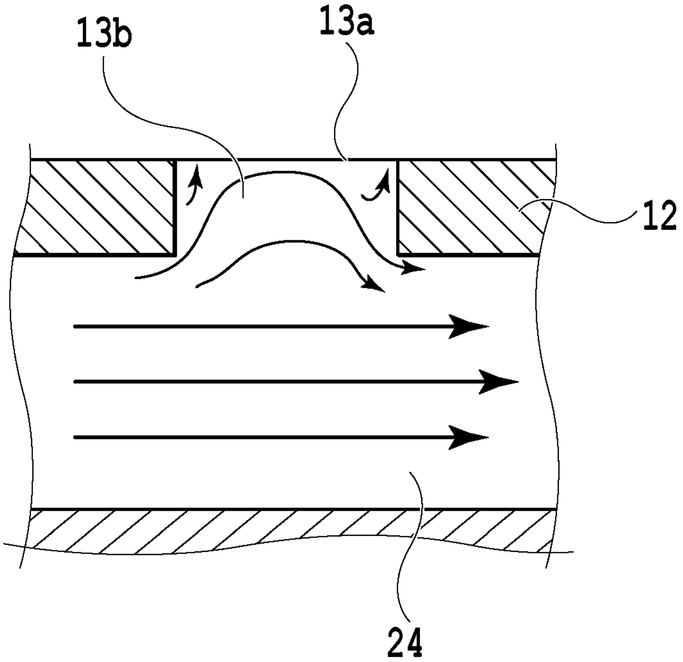
Figure 37A:
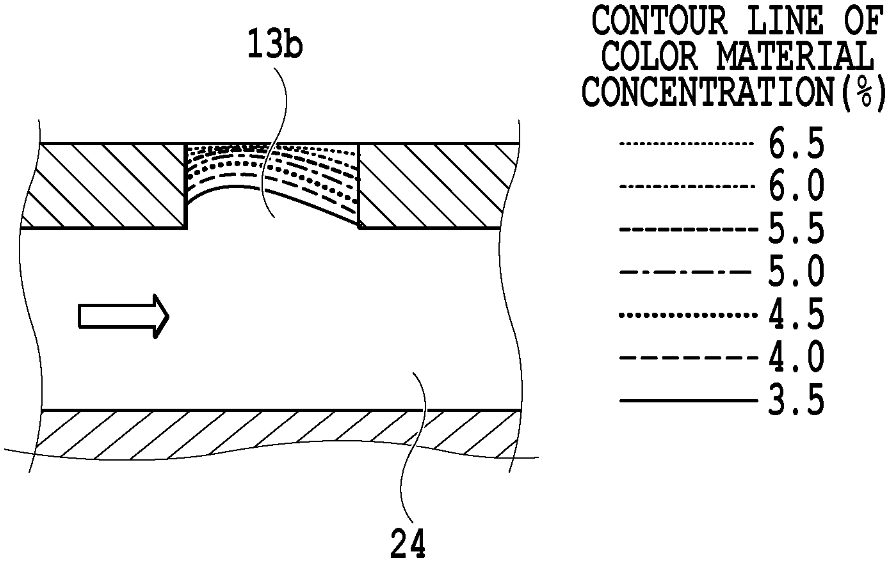
FIGS. 37A and 37B are diagrams illustrating a state of color material concentration of ink inside an ejection opening portion according to the ninth embodiment.
Figure 37B:
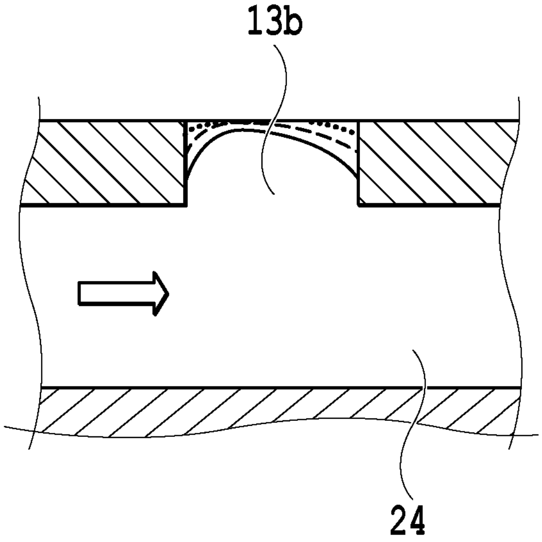

FIGS. 36A to 38 are diagrams illustrating a liquid ejection head according to a ninth embodiment of the invention. The present embodiment improves the second to eighth embodiments, and does not restrict the above-described embodiments. A description will be given of a relation between the amount of evaporation of ink water, etc. from an ink boundary 13*a* formed in an ejection opening 13 and a flow amount of an ink flow 17 with reference to FIGS. 36A and 36B and FIGS. 37A and 37B. When the amount of evaporation from the ink boundary 13*a* is relatively large, and the flow rate of the ink flow 17 is small with respect to the amount of evaporation according to an environmental condition, etc., a flow directed toward the ink boundary 13*a* is dominant in a flow of ink inside an ejection opening portion 13*b* as illustrated in FIG. 36A. Hereinafter, a state in which the flow directed toward the ink boundary 13*a* is dominant in the flow of ink in the ejection opening portion 13*b* as described above will be referred to as a state D. In the case of the state D, color material concentration inside the ejection opening portion becomes relatively high due to evaporation as illustrated in FIG. 37A. In contrast, when the ink flow 17 is sufficient with respect to the amount of evaporation even when the amount of evaporation is large, the ink flow is dominant over the flow directed toward the ink boundary 13*a* in a flow of ink inside an ejection opening portion 13*b* as illustrated in FIG. 36B. Hereinafter, a state in which the ink flow 17 is dominant over the flow directed toward the ink boundary 13*a* in the flow of ink in the ejection opening portion 13*b* as described above will be referred to as a state C. In this way, as illustrated in FIG. 37B, color material concentration inside the ejection opening portion becomes relatively low. In other words, in liquid ejection heads that satisfy Expressions (1) and (2) described in the first and second embodiments, the state C can exist. More specifically, the state C can be obtained by sufficiently increasing the flow amount of the ink flow even when the amount of evaporation from the ink boundary 13*a* increases due to an environmental condition, etc. at the time of using the liquid ejection head. Thereby, ink having changed color material concentration due to evaporation of ink from the ejection opening may be further inhibited from staying in the ejection opening portion 13*b*.

A description will be given of the case of a liquid ejection head that does not satisfy Expression (2) as a comparative example. In this example, the flow mode A is not obtained even when the flow amount of the ink flow 17 is increased. In other words, Expression (2) needs to be satisfied to obtain the flow mode A.

Herein, even in the case of the liquid ejection head that satisfies Expression (2), pressure loss increases as the amount of the ink flow 17 is increased. For this reason, a pressure difference between the common supply path 211 and the common collection passage (see FIG. 2 and FIG. 3) needs to be increased. In addition, a pressure difference up to each ejection opening inside the liquid ejection head increases, and there is difficulty in making an ejection characteristic uniform. Therefore, from these points of view, it is desirable that the flow amount of the ink flow 17 be set to be as small as possible.

In this regard, an example of a condition of flow velocity of the ink flow 17 for obtaining the state C in the liquid ejection head that generates the flow mode A will be described below.

The present embodiment sets a condition below to inhibit ink having changing color material concentration due to evaporation from staying inside the ejection opening portion 13*b* in the liquid ejection head in which H is in a range of 3 to 6 μm, P is in a range of 3 to 6 μm, and W is in a range of 17 to 25 μm. In other words, a relation between an average flow velocity V17 of the ink flow 17 and an average evaporation flow velocity V12 from the ink boundary 13*a* is set to Expression (5) below.

$$V17 \geq 27 \times V12 \quad \text{Expression (5)}$$

From an examination of the inventors, etc., it is understood that a liquid ejection head satisfying Expression (5) corresponds to the flow mode A. Since a liquid ejection head in which H is in a range of 3 to 6 μm, P is in a range of 3 to 6 μm, and W is greater than or equal to 17 μm satisfies Expression (2), the state C can be obtained by circulating a sufficient amount of ink with respect to the amount of evaporation. The above Expression (5) is an expression that indicates a circulation flow velocity necessary to obtain the state C. Expression (5) will be described with reference to FIG. 38.

Figure 38:
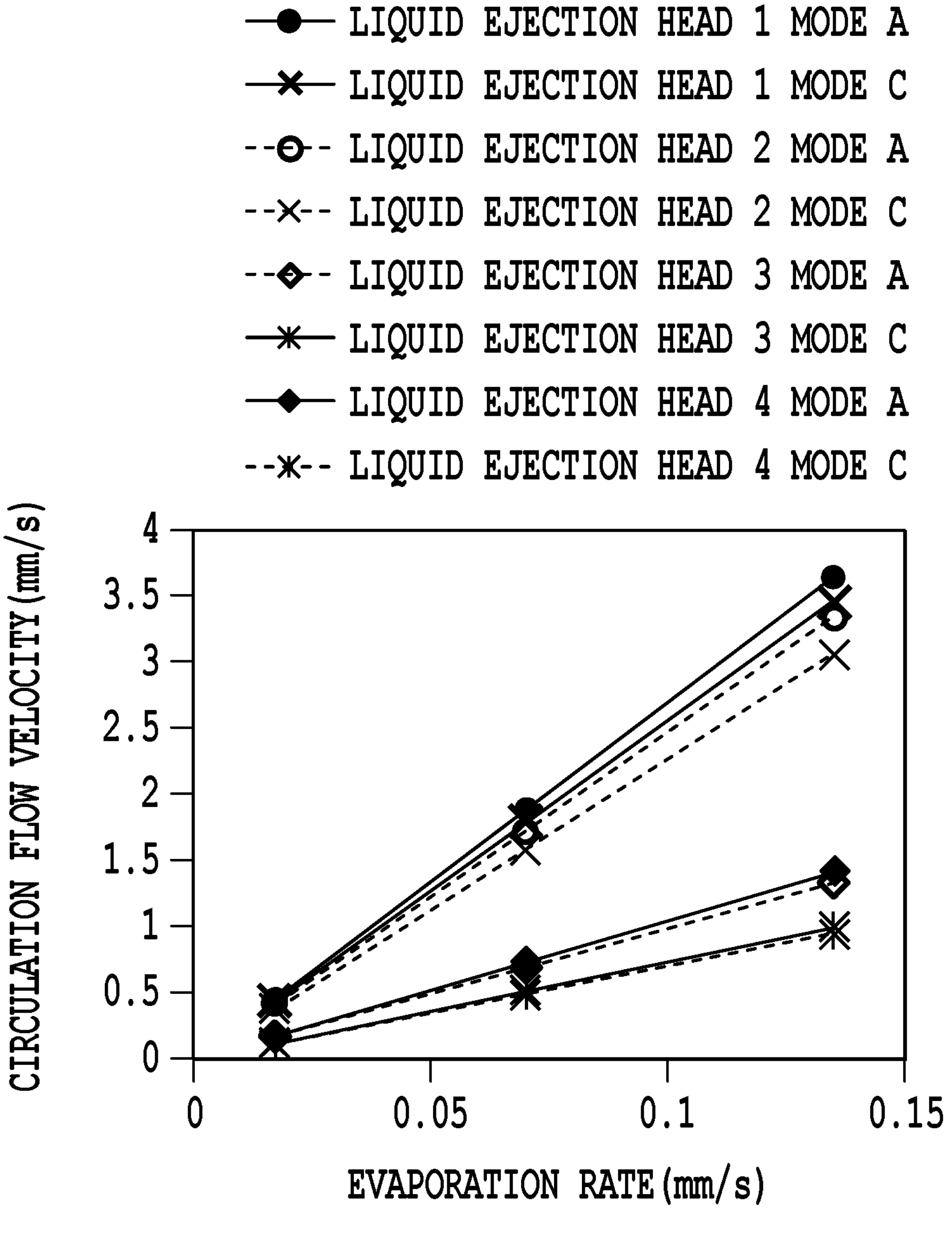
FIG. 38 is a diagram illustrating a relation between an evaporation rate in each flow mode and a circulation flow velocity in the ninth embodiment.

FIG. 38 is a diagram illustrating a relation between an evaporation rate at which the state C is obtained and a circulation flow velocity, and a relation between an evaporation rate at which the state D is obtained and a circulation flow velocity. A horizontal axis of FIG. 38 indicates an evaporation rate V12, and a vertical axis of FIG. 38 indicates a flow velocity V17 of an ink flow resulting from circulation. Data for each flow mode is indicated with respect to respective liquid ejection heads 1 to 4 corresponding to four shapes. In the liquid ejection head 1, H is 6 μm, P is 6 μm, W is 17 μm, and the determination value J is 2.83. In the liquid ejection head 2, H is 6 μm, P is 6 μm, W is 21 μm, and the determination value J is 3.5. In the liquid ejection head 3, H is 5 μm, P is 3 μm, W is 21 μm, and the determination value J is 5.88. In the liquid ejection head 4, H is 5 μm, P is 3 μm, W is 25 μm, and the determination value J is 7.0.

It can be understood from FIG. 38 that a circulation flow velocity V17 necessary to obtain the state C rather than the state D is proportional to an evaporation flow velocity V12 in one liquid ejection head. In addition, it can be understood that the circulation flow velocity necessary to obtain the state C increases as the determination value J decreases. Further, in the case in which the liquid ejection head having H is in the range of 3 to 6 μm, P in the range of 3 to 6 μm, and W in the range of 17 to 25 μm is used, and the determination value J is 2.83 corresponding to a smallest value (the liquid ejection head 1), the state C is obtained when the circulation flow velocity is set to be 27 times or more the evaporation flow velocity. Therefore, in the liquid ejection head in which H is in the range of 3 to 6 μm, P is in the range of 3 to 6 μm, and W is greater than or equal to 17 μm, the state C is obtained when Expression (5) is satisfied, and ink having changed color material concentration due to evaporation may be inhibited from staying in the ejection opening portion 13*b*. In other words, it is possible to reduce occurrence of color unevenness of an image resulting from liquid evaporation from the ejection opening 13. For example, in an experiment of the inventors, etc., the amount of evaporation from a circular ejection opening having W of 18 μm is about 140 pl/s, and an average evaporation flow velocity is about $1.35\times10^{-4}$ m/s. Thus, in this case, a circulation flow velocity, an average of which is 0.0036 m/s or more, is necessary. Herein, the amount of evaporation indicates the amount of evaporation when concentration of ink in the ejection opening portion 13*b* does not change.

Similarly, in the case in which the liquid ejection head having H of 8 μm, P of 8 μm, and W of 17 μm is used, and the determination value J is 2.13, the state C is obtained when the average flow velocity V17 of the ink flow 17 is set to 50 times or more the average evaporation flow velocity V12 from the ink boundary 13*a*. Therefore, in a liquid ejection head having H of 8 μm or less, P of 8 μm or less, and W of 17 μm or more, the state C can be obtained when the average flow velocity V17 of the ink flow 17 is set to 50 times or more the average evaporation flow velocity V12 from the ink boundary 13*a*. Thereby, ink having changed color material concentration due to evaporation may be inhibited from staying inside the ejection opening portion 13*b*. As a result, it is possible to reduce occurrence of color unevenness of an image resulting from liquid evaporation from the ejection opening 13. Similarly to the above description, when the amount of evaporation from the circular ejection opening having W of 18 μm is about 140 pl/s, a circulation flow velocity, an average of which is 0.0067 m/s or more, is necessary.

Similarly, in a liquid ejection head in which H is 15 μm, P is 7 μm, W is 17 μm, and the determination value J is 1.87, the state C can be generated when the average flow velocity V17 of the ink flow 17 is set to 50 times or more the average evaporation flow velocity V12 from the ink boundary 13*a*. Therefore, in a liquid ejection head having H of 15 μm or less, P of 7 μm or less, and W of 17 μm or more, the state C can be obtained when the average flow velocity V17 of the ink flow 17 is set to 100 times or more the average evaporation flow velocity V12 from the ink boundary 13*a*. Similarly to the above description, when the amount of evaporation from the circular ejection opening having W of 18 μm is about 140 pl/s, a circulation flow velocity, an average of which is 0.0135 m/s or more, is necessary.

Next, a description will be given of a configuration of a different liquid ejection head. The present liquid ejection head is a liquid ejection head having H of 14 μm or less, P of 12 μm or less, and W of 17 μm or more, and H, P, and W satisfy Expression (2). This liquid ejection head satisfies Expression (6) below such that ink having changed color material concentration due to evaporation of ink from the ejection opening is inhibited from staying in the ejection opening portion 13*b*. In other words, the average flow velocity V17 of the ink flow 17 and the average evaporation flow velocity V12 from the ink boundary 13*a* satisfy Expression (6) below.

$$V17 \geq 900 \times V12 \qquad \text{Expression (6)}$$

In a liquid ejection head having H of 12.3 μm, P of 9 μm, and W of 17 μm (the determination value J is 1.7), the state C may be obtained by setting the average flow velocity V17 of the ink flow 17 to 900 times the average evaporation flow velocity V12 from the ink boundary 13*a*. Similarly, in a liquid ejection head having H of 10 μm, P of 10 μm, and W of 17 μm (the determination value J is 1.7), the state C may be obtained by setting the average flow velocity V17 of the ink flow 17 to 900 times the average evaporation flow velocity V12 from the ink boundary 13*a*. Similarly, in a liquid ejection head having H of 8.3 μm, P of 11 μm, and W of 17 μm (the determination value J is 1.7), the state C may be obtained by setting the average flow velocity V17 of the ink flow 17 to 900 times the average evaporation flow velocity V12 from the ink boundary 13*a*. Similarly, in a liquid ejection head having H of 7 μm, P of 12 μm, and W of 17 μm (the determination value J is 1.7), the state C may be obtained by setting the average flow velocity V17 of the ink flow 17 to 900 times the average evaporation flow velocity V12 from the ink boundary 13*a*.

Therefore, a liquid ejection head having H of 14 or less, P of 12 μm or less, and W of 17 μm or more, in which H, P, and W satisfy Expression (2), obtains the state C by satisfying Expression (6).

With regard to the above ninth embodiment, a condition of obtaining the state C is summarized as below.

H is 14 μm or less, P is 12 μm or less, and W is 17 μm or more and 30 μm or less. Further, a flow velocity of liquid in a passage is 900 times or more a rate of evaporation from an ejection opening.

Alternatively, H is 15 μm or less, P is 7 μm or less, and W is 17 μm or more and 30 μm or less. Further, a flow velocity of liquid in a passage is 100 times or more a rate of evaporation from an ejection opening.

Alternatively, H is 8 μm or less, P is 8 μm or less, and W is 17 μm or more and 30 μm or less. Further, a flow velocity of liquid in a passage is 50 times or more a rate of evaporation from an ejection opening.

Alternatively, H is 3 μm or more and 6 μm or less, P is 3 μm or more and 6 μm or less, and W is 17 μm or more and 30 μm or less. Further, a flow velocity of liquid in a passage is 27 times or more a rate of evaporation from an ejection opening.

Herein, the above regulation of the flow velocity of liquid corresponds to a range in which the state C is obtained even when a most difficult shape to obtain the state C in each head shape range is used. When another shape in each head shape range is used, the state C may be obtained at a smaller flow velocity.

Tenth Embodiment

FIG. 39A to FIG. 42 are diagrams for description of a liquid ejection head according to a tenth embodiment of the invention, and the present embodiment relates to a relation between two types of characteristics below and a passage shape including an ejection opening.

Characteristic 1) Flow mode of ink flow

Characteristic 2) Ejected liquid droplet ejected from ejection opening

In particular, the relation with the characteristics will be described using three types of ejection opening shapes below, in which an ejection amount Vd is 5 pl, as an example.

Passage shape A) H=14 μm, P=11 μm, W=16 μm (J=1.34)

Passage shape B) H=09 μm, P=11 W=18 μm (J=1.79)

Passage shape C) H=14 μm, P=06 μm, W=18 μm (J=2.30)

Herein,

H: Height of passage 24 at upstream side in flow direction of liquid inside passage 24 (see FIGS. 22A to 22C)

P: Length of ejection opening portion 13*b* in direction in which liquid is ejected from ejection opening 13 (see FIGS. 22A to 22C)

W: Length of ejection opening portion 13*b* in flow direction of liquid inside passage 24 (see FIGS. 22A to 22C)

Z: Effective length of inscribed circle of ejection opening 13

However, since the ejection opening 13 has a circular shape (see FIGS. 22A to 22C), an effective diameter Z of the inscribed circle of the ejection opening 13 is equal to W.

In addition, the example in which Vd is 5 pl is used since a plurality of main droplets and sub-droplets (hereinafter also referred to as satellites) are easily generated when the ejection amount is large, and the droplets cause deterioration of image quality.

Figure 39A:
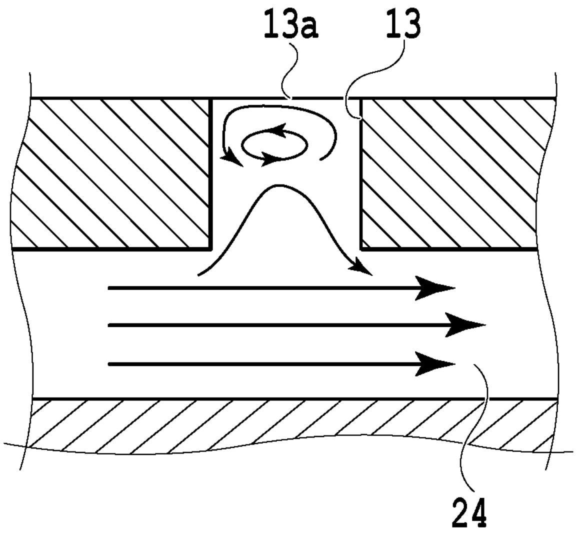
FIGS. 39A, 39B, and 39C are diagrams illustrating flow modes of three passage shapes according to a tenth embodiment of the invention.
Figure 39B:
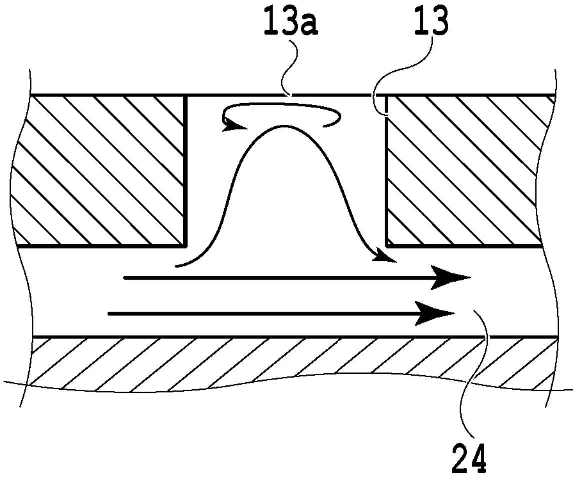
Figure 39C:
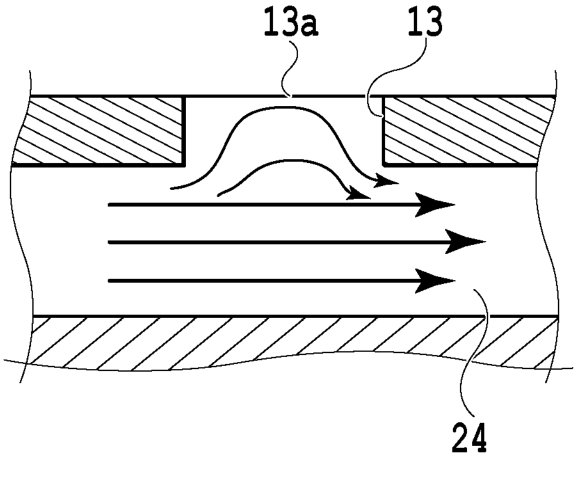
Figure 40:
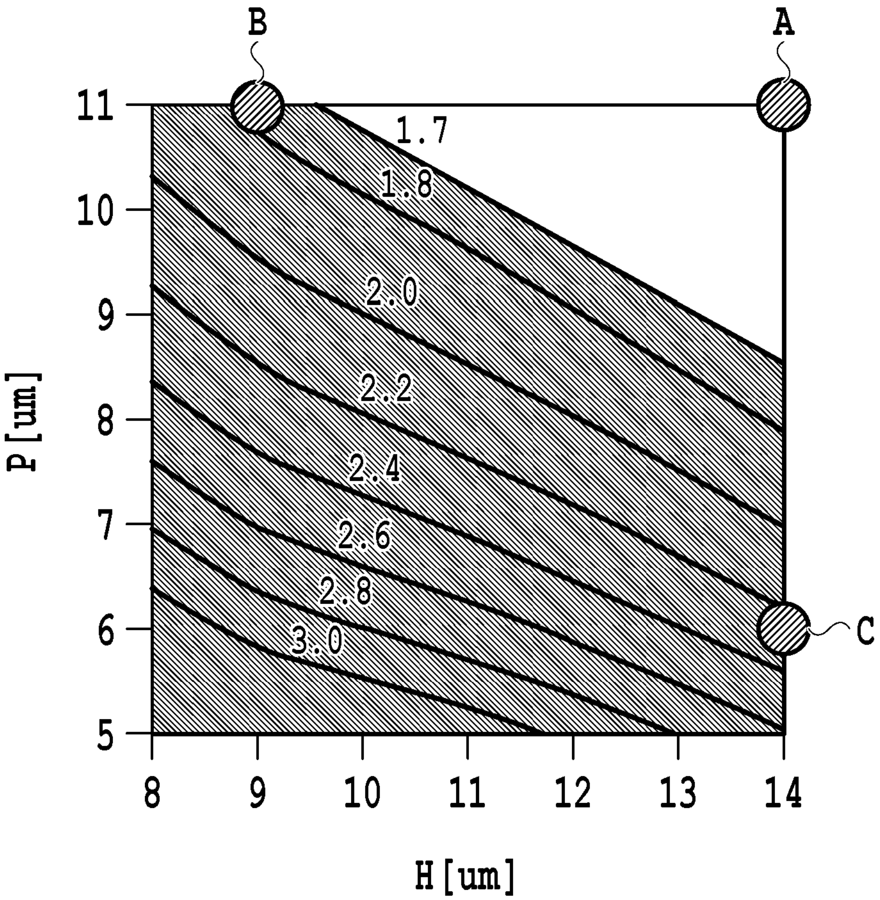
FIG. 40 is a contour line diagram illustrating a value of a flow mode determination value when a diameter of an ejection opening is changed according to the tenth embodiment.

FIGS. 39A to 39C are diagrams illustrating flow modes of three passage shapes A to C. FIG. 40 is a contour line diagram illustrating a value of the determination value J when a diameter of an ejection opening is changed such that the ejection amount Vd corresponds to about 5 pl. In FIG. 40, a horizontal axis indicates H, and a vertical axis indicates P.

The passage shape A has the determination value J of 1.34, and generates the flow mode B as illustrated in FIG. 39A. A size obtained by adding H to P of the passage shape A (hereinafter also referred to as OH) is 25 μm. However, H or P needs to be set to be small, and OH needs to be decreased to increase the determination value J. When OH equals 20 μm, the passage shape B in which only H is set to be small has the determination value J of 1.79, and generates the flow mode A as illustrated in FIG. 39B. In addition, the passage shape C in which only P is set to be small has the determination value J of 2.30, and similarly corresponds to the flow mode A as illustrated in FIG. 39C. Additionally, in the passage shape C, a flow of an ink flow easily enters an inside of the ejection opening when compared to the passage shape B, and ink may be further inhibited from staying inside the ejection opening portion 13*b*. Therefore, shapes below are given with regard to flow modes of an ink flow.

Shape characteristic (1): For the same OH, P is preferably set to be small (see FIG. 40)

Shape characteristic (2): OH is preferably decreased (see FIG. 40)

Figure 41A:
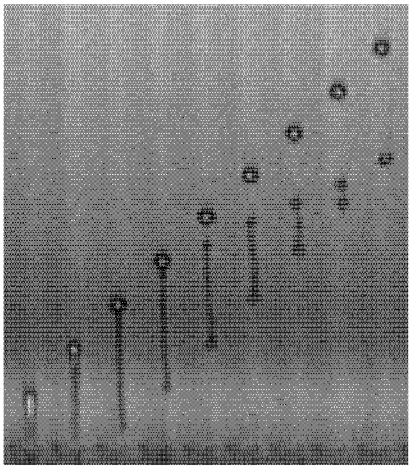
FIGS. 41A, 41B, and 41C are diagrams illustrating results of observing ejected liquid droplets of ejection openings of respective passage shapes according to the tenth embodiment.
Figure 41B:
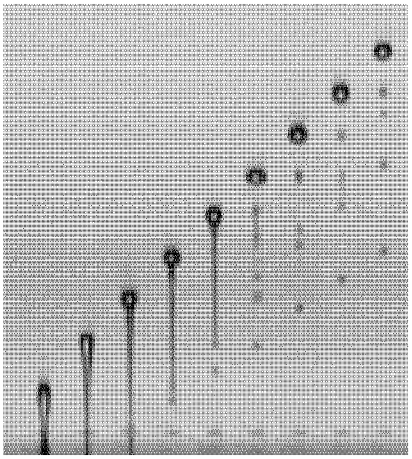
Figure 41C:
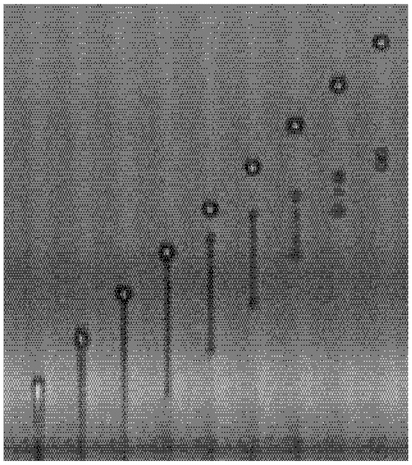
Figure 42:
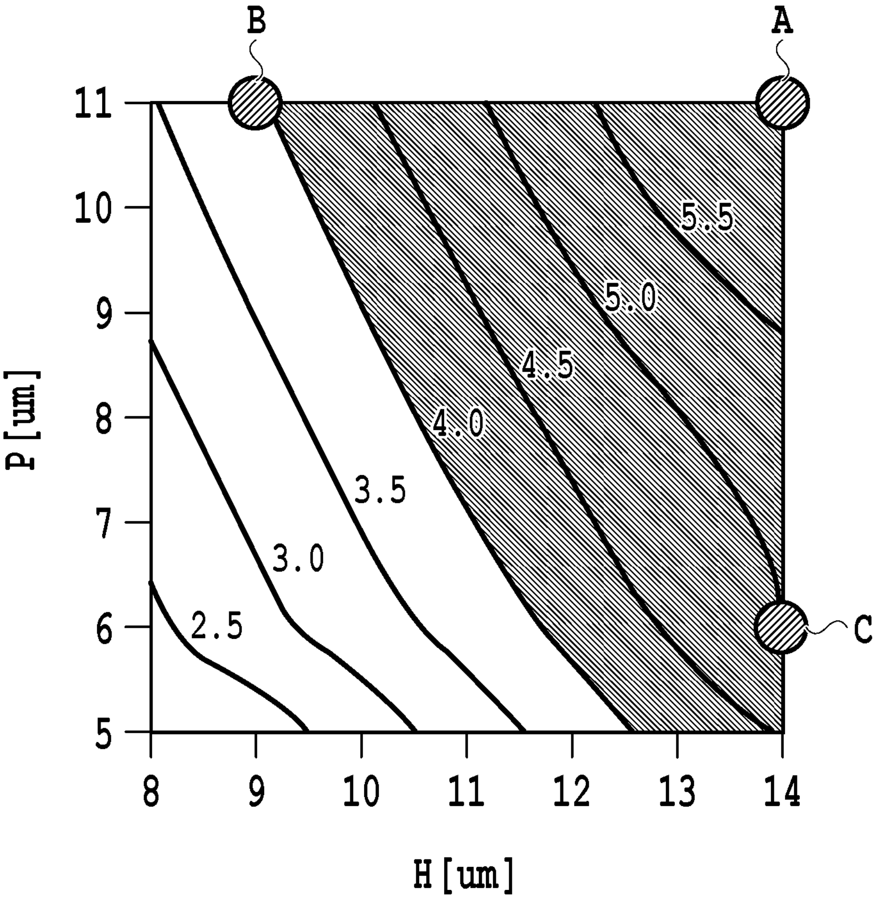
FIG. 42 is a contour line diagram illustrating a time at which bubbles communicate with the atmosphere when the diameter of the ejection opening is changed according to the tenth embodiment.

Meanwhile, FIGS. 41A to 41C are diagrams illustrating results of observing ejected liquid droplets of the respective three types of passage shapes A to C. FIG. 42 is a contour line diagram illustrating a value obtained by calculating a time at which bubbles communicate with the atmosphere (hereinafter also referred to as Tth) when a diameter of an ejection opening is changed such that the ejection amount Vd corresponds to about 5 pl. In FIG. 42, a horizontal axis indicates H, and a vertical axis indicates P.

FIGS. 41A and 41C illustrate a case in which two types of ejected liquid droplets corresponding to a main droplet and a satellite are generated. Meanwhile, FIG. 41B illustrates a case in which a main droplet and a plurality of satellites are generated. In the passage shape A, Tth equals 5.8 us. In the passage shape C, Tth equals 4.5 us. On the other hand, in the passage shape B, Tth equals 3.8 us, and Tth becomes small (see FIG. 42). In general, a plurality of satellites are generated when the ejection amount Vd is large as in the present embodiment, and when Tth is small since an elongated tail (tailing) is easily generated, and a lot of nodes resulting from the unstable tail are generated when Tth is small, that is, communication with the atmosphere is facilitated. As a result, the number of elongated tails may not be reduced to one, and a plurality of satellites are generated as illustrated in FIG. 41B. Therefore, restraints below may be imposed with regard to the satellites.

Shape characteristic (3): For the same OH, P is preferably set to be small (see FIG. 42)

Shape characteristic (4): OH is preferably increased (see FIG. 42)

Accordingly, to increase the determination value J necessary to inhibit ink from staying inside the ejection opening portion 13*b*, Shape characteristic A) OH is decreased, and Shape characteristic B) P is set to be smaller than H for the same OH.

In addition, to increase the determination value Tth necessary to suppress the main droplet and the satellite, Shape characteristic C) OH is increased, and Shape characteristic D) P is set to be smaller than H for the same OH. Since Shape characteristic A) and Shape characteristic C) indicate conflicting characteristics, it is desirable to satisfy a condition below as a compatible solution.

Determination value J of flow mode>1.7, and determination value Tth of time at which communication with atmosphere is performed>4.0 μs.

Therefore, a range illustrated in FIG. 42 is preferably adopted. Herein, when the determination value Tth satisfies the above condition, the determination value Tth approximates to $$Tth=0.350\times H+0.227\times P-0.100\times Z$$

in the diagram illustrated in FIG. 42. The above equation indicates that Tth decreases and a plurality of satellites are easily generated when H or P decreases or Z increases. In particular, H has sensitivity which is about 1.5 times as high as sensitivity of P. Thus, for the same OH, a decrease in Tth may be suppressed, and generation of satellites may be suppressed when P is set to be small. Therefore, the above condition may be represented by the following expression.

$$0.350\times H+0.227\times P-0.100\times Z>4 \quad \text{Expression (7)}$$

When a shape characteristic of an ejection opening falling within the above range is adopted, it is possible to achieve suppression of occurrence of satellites and circulation effect (inhibiting ink from staying inside the ejection opening portion 13*b*) when the ejection amount Vd is 5 ng.

According to the embodiments described above, a change in a quality of a liquid near an ejection opening can be suppressed and thus it is possible for example to suppress increase in ink viscosity due to liquid evaporation through the ejection opening and to reduce color unevenness in an image. Specifically, when Expression (2) described in the second embodiment is satisfied, it is possible to obtain the flow mode A, and to inhibit ink from staying inside the ejection opening portion 13*b*. In this way, it is possible to reduce an increase in color material concentration. A flow velocity of ink flowing through the passage 24 may be appropriately set depending on the condition, the environment, etc. in which the liquid ejection head is used according to approaches described in the present embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid ejection head comprising:

an ejection opening row in which a plurality of ejection openings for ejecting a liquid are arranged; and a passage member having a passage communicating with the ejection openings, wherein the liquid is circulated between an inside and an outside of the liquid ejection head, the passage member is formed by laminating a plurality of substrates including a first substrate and a second substrate, the passage member has a longitudinal direction and a lateral direction as the passage member is viewed from a position facing a main surface of the substrates, the passage formed in the first substrate includes a flow-in-port for flowing the liquid into the passage and a flow-out-port for flowing the liquid out from the passage, the passage formed in the second substrate includes a first passage for flowing the liquid flowed from the flow-in-port into the plurality of ejection openings and a second passage for flowing the liquid flowed from the first passage into the flow-out port, the first passage, the second passage, and the ejection opening row extend from one end to the other end in the longitudinal direction, the first passage and the second passage are provided at least from one end to the other end of the ejection opening row as the liquid ejection head is viewed from a position facing a surface on which the ejection opening row is formed, the flow-in port is positioned at least at one end in the longitudinal direction of the first passage, the flow-out-port is positioned at least at one end in the longitudinal direction of the second passage, the passage forms a passage row including a plurality of the first passages and a plurality of the second passages disposed in parallel in the lateral direction, the first passage being formed at one endmost side of the passage row in the lateral direction, and the second passage being formed at the other endmost side opposite to one endmost side of the passage row in the lateral direction, and the flow-in port and the flow-out port are located on the same side of the passage member with respect to the longitudinal direction.

2. The liquid ejection head according to claim 1, wherein the first passage and the second passage are substantially parallel to each other as the substrates are viewed from the position facing the main surface of the substrates.

3. The liquid ejection head according to claim 1, wherein the flow-in port is formed at a most upstream position in at least one of the passages as the substrates are viewed from the position facing the main surface of the substrates.

4. The liquid ejection head according to claim 1, wherein in the passage member, a plurality of supply openings are formed for supplying the liquid to the ejection openings, respectively, and at least one of the passages is in communication with the plurality of supply openings.

5. The liquid ejection head according to claim 1, wherein the flow-in port and the flow-out port are disposed outside the end of the ejection opening row as the substrates are viewed from the position facing the main surface of the substrates.

6. The liquid ejection head according to claim 1, wherein the passages are formed by aligning a first hole formed on the first substrate and a second hole formed on the second substrate.

7. The liquid ejection head according to claim 1, wherein at least one of the first passages and at least one of the second passages are disposed adjacent to each other.

8. The liquid ejection head according to claim 1, wherein the liquid ejection head includes a pressure chamber through which pressure is applied to the liquid to be ejected from the ejection openings, and at least a portion of the liquid circulated by flowing from the flow-in port flows through the first passage and the second passage and out from the flow-out port without passing through the pressure chamber.

9. The liquid ejection head according to claim 1, wherein a direction in which the liquid flows through the first passage is a direction opposite to a direction in which the liquid flows through the second passage.

10. The liquid ejection head according to claim 1, wherein the liquid ejection head further comprises a filter, and the filter filters the liquid flowing through the first passage.

11. A liquid ejection apparatus having a liquid ejection head comprising:

an ejection opening row in which a plurality of ejection openings for ejecting a liquid are arranged, and a passage member having a passage communicating with the ejection openings and collecting the liquid, wherein the liquid is circulated between an inside and an outside of the liquid ejection head, the passage member is formed by laminating a plurality of substrates including a first substrate and a second substrate, the passage member has a longitudinal direction and a lateral direction as the passage member is viewed from a position facing a main surface of the substrates, the passage formed in the first substrate includes a flow-in port for flowing the liquid into the passage and a flow-out-port for flowing the liquid out from the passage, the passage formed in the second substrate includes a first passage for flowing the liquid flowed from the flow-in-port into the plurality of ejection openings and a second passage for flowing the liquid flowed from the first passage into the flow-out port, the first passage, the second passage, and the ejection opening row extend from one end to the other end in the longitudinal direction, the first passage and the second passage are provided at least from one end to the other end of the ejection opening row as the liquid ejection head is viewed from a position facing a surface on which the ejection opening row is formed, the flow-in-port is positioned at least at one end in the longitudinal direction of the first passage, the flow-out-port is positioned at least at one end in the longitudinal direction of the second passage, the passage forms a passage row including a plurality of the first passages and a plurality of the second passages disposed in parallel in the lateral direction, the first passage being formed at one endmost side of the passage row in the lateral direction, and the second passage being formed at the other endmost side opposite to one endmost side of the passage row in the lateral direction, the flow-in port and the flow-out port are located on the same side of the passage member with respect to the longitudinal direction, and the liquid ejection apparatus comprises a pump for circulating the liquid between the inside and the outside of the liquid ejection head.

12. The liquid ejection apparatus according to claim 11, wherein the liquid ejection head has a pressure chamber through which pressure is applied to the liquid to be ejected from the ejection openings, and at least a portion of the liquid circulated by flowing from the flow-in port flows through the first passage and the second passage and out from the flow-out port without passing through the pressure chamber.

13. The liquid ejection apparatus according to claim 11, wherein a direction in which the liquid flows through the first passage is a direction opposite to a direction in which the liquid flows through the second passage.

14. The liquid ejection apparatus according to claim 11, wherein the liquid ejection head further comprises a filter, and the filter filters the liquid flowing through the first passage.

* * * * *